(12) United States Patent
Li et al.

(10) Patent No.: US 8,053,040 B2
(45) Date of Patent: *Nov. 8, 2011

(54) LIQUID CRYSTAL COMPOSITION, RETARDATION PLATE, LIQUID CRYSTAL DISPLAY DEVICE, AND PROCESS FOR PRODUCING RETARDATION PLATE

(75) Inventors: Yi Li, Minami-ashigara (JP); Hideyuki Nishikawa, Minami-ashigara (JP); Yuta Takahashi, Minami-ashigara (JP); Masataka Yoshizawa, Minami-ashigara (JP); Takafumi Hosokawa, Ashigarakami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 12/529,841

(22) PCT Filed: Mar. 13, 2008

(86) PCT No.: PCT/JP2008/055155
§ 371 (c)(1),
(2), (4) Date: Sep. 3, 2009

(87) PCT Pub. No.: WO2008/111685
PCT Pub. Date: Sep. 18, 2008

(65) Prior Publication Data
US 2010/0078592 A1    Apr. 1, 2010

(30) Foreign Application Priority Data

Mar. 14, 2007   (JP) .................. 2007-064952
Feb. 25, 2008   (JP) .................. 2008-042759

(51) Int. Cl.
*C09K 19/38* (2006.01)
*C09K 19/56* (2006.01)
*C09K 19/32* (2006.01)
*C09K 19/34* (2006.01)

(52) U.S. Cl. .. 428/1.1; 428/1.2; 252/299.4; 252/299.61; 252/299.62

(58) Field of Classification Search .................. 428/1.1, 428/1.2; 252/299.01, 299.5, 299.62, 299.4; 349/117
See application file for complete search history.

(56) References Cited

U.S. PATENT DOCUMENTS

| | | | |
|---|---|---|---|
| 4,909,806 A | 3/1990 | Garbe | |
| 5,030,701 A | 7/1991 | Garbe | |
| 2004/0024100 A1 | 2/2004 | Parent et al. | |
| 2006/0165919 A1 | 7/2006 | Suzuki et al. | |
| 2008/0090027 A1* | 4/2008 | Li et al. ........... | 428/1.31 |

FOREIGN PATENT DOCUMENTS

| JP | 63-205306 A | 8/1988 |
|---|---|---|
| JP | 2-3407 A | 1/1990 |
| JP | 2002-129162 A | 5/2002 |
| JP | 2005-225990 A | 8/2005 |
| JP | 2005-533902 A | 11/2005 |
| JP | 2006-16599 A | 1/2006 |
| JP | 2006-126768 A | 5/2006 |
| JP | 2006-233191 A | 9/2006 |
| JP | 2007-217656 A | 8/2007 |
| JP | 2007-272185 A | 10/2007 |

OTHER PUBLICATIONS

Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2008/055155, Sep. 24, 2009, The International Bureau of WIPO, Geneva, CH.
International Search Report for PCT/JP2008/055155 completed May 14, 2008.
Written Opinion for PCT/JP2008/055155 completed May 14, 2008.

* cited by examiner

*Primary Examiner* — Shean Wu
(74) *Attorney, Agent, or Firm* — Buchanan Ingersoll & Rooney PC

(57) ABSTRACT

A composition comprising at least one liquid crystal compound, and at least one polymer is disclosed. The polymer comprises a constitutional unit represented by a following formula (A) and a constitutional unit derived from a monomer having a fluoroaliphatic group(s):

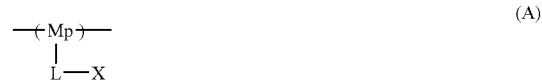

(A)

wherein Mp represents a trivalent group constituting fully or partially a polymer main chain; L represents a single bond or a divalent linking group; and X represents a substituted or non-substituted aromatic condensed ring group.

16 Claims, 1 Drawing Sheet

LIQUID CRYSTAL COMPOSITION, RETARDATION PLATE, LIQUID CRYSTAL DISPLAY DEVICE, AND PROCESS FOR PRODUCING RETARDATION PLATE

BACKGROUND OF THE INVENTION

1. Technical Field of the Invention

The present invention relates to a composition, a polymer and a tilt angle controlling agent that are useful for producing an optically anisotropic layer, a retardation plate produced by using the same, and a process for producing the retardation plate. The invention also relates to a liquid crystal display device having the retardation plate.

2. Related Art

A liquid crystal display device generally comprises a first polarizing plate and a second polarizing plate provided with a liquid crystal cell intervening therebetween, and the liquid crystal cell has a pair of substrates and a liquid crystal layer containing a rod-like liquid crystal compound intervening therebetween. It has been known in the art that birefringence occurring in the liquid crystal cell employing a rod-like liquid crystal compound is compensated with an optical compensation sheet having an optically anisotropic layer formed with a discotic liquid crystal compound (such as 2,3,6,7,10,11-hexa (4-(4-acryloyloxyhexyloxy)benzoyloxy)-triphenylene). In this case, there are some cases where the phase difference cannot be compensated over the entire wavelength range of light due to difference in wavelength dispersibility between the rod-like liquid crystal compound and the discotic liquid crystal compound to cause discoloration (such as failure in black color).

A trisubstituted benzene compound substituted with a heterocyclic group has also been reported as the discotic liquid crystal compound (in Macromolecular Crystals and Liquid Crystals, vol. 370, p. 391 (2001). However, it is difficult to attain low wavelength dispersibility, i.e., making the wavelength dispersion close to constant, by using the compound, and such a compound is demanded that has smaller wavelength dispersibility (i.e., a small value of (Re of short wavelength (e.g., 450 nm))/(Re of long wavelength (e.g., 650 nm))).

While the difference in wavelength dispersibility has been mainly discussed herein, the retardation value Re(λ) of the retardation plate is also important. It is necessary to determine the retardation Re(λ) of the retardation plate corresponding to the optical property of the liquid crystal cell to be compensated. The retardation (Δn·d) is the product of the refractive index anisotropy (Δn) of the optically anisotropic layer and the thickness (d) of the optically anisotropic layer. In the case where the optically anisotropic layer has a larger refractive index anisotropy (Δn), the liquid crystal cell can be compensated even with the layer having a smaller thickness (d). In a retardation plate produced by fixing the orientation of liquid crystals, the retardation (Re) varies depending on the orientation angle (i.e., the tilt angle and the mean tilt angle) of the oriented liquid crystal, and it is therefore necessary to control the orientation angle.

JPA No. 2002-129162 proposes a compound having a ring structure represented by the specific formula as a liquid crystal orientation accelerator. JPA No. 2006-16599 proposes a polymerizable liquid crystal composition containing a (meth) acrylate copolymer (H) having a side chain containing a fluorine group and a side chain having a group containing a ring structure represented by the specific formula.

However, these conventional orientation controlling agents do not exhibit orientation controlling capability to any liquid crystal compound, and are insufficient as an orientation controlling agent, for example, for the aforementioned tri-substituted benzene type discotic liquid crystal compound substituted with a heterocyclic group. In particular, it is difficult to subject the tri-substituted benzene type discotic liquid crystal compound substituted with a heterocyclic group to hybrid orientation with a low mean tilt angle (for example, 40° or less), and an orientation controlling agent capable of controlling such an orientation state is demanded.

In the case where an optically anisotropic film or the like is produced by curing a liquid crystal molecule through polymerization or the like, it is demanded that the tilt angle is not changed upon fluctuation in temperature on curing, from the standpoint of production stability of the optically anisotropic film or the like. However, although the tilt angle of the liquid crystal molecule can be controlled with the conventional orientation controlling agent, the temperature dependency of the tilt angle thereof is large to deteriorate the production stability, and improvement thereof is demanded.

SUMMARY OF THE INVENTION

One object of the invention is to provide a composition, a polymer and a tilt angle controlling agent that are useful for producing stably an optically anisotropic layer contributing to optical compensation of a liquid crystal display device. More specifically, an object of the invention is to provide a composition, a polymer and a tilt angle controlling agent that are useful for producing an optically anisotropic layer exhibiting optical anisotropy owing to hybrid orientation of a liquid crystal compound, in a stable manner with no defect (or reduced defects) caused by orientation failure and the like of the optical characteristic values.

The invention is also to provide a retardation plate that is useful for optical compensation of a liquid crystal display device, and a process for producing the retardation plate.

The invention is further to provide a liquid crystal display device that contains the retardation plate and exhibits favorable display characteristics.

In one aspect, the invention provides a composition comprising:

at least one liquid crystal compound, and at least one polymer comprising a constitutional unit represented by a following formula (A) and a constitutional unit derived from a monomer having a fluoroaliphatic group(s):

wherein Mp represents a trivalent group constituting fully or partially a polymer main chain; L represents a single bond or a divalent linking group; and X represents a substituted or non-substituted aromatic condensed ring group.

In the formula, X may represent a substituted or non substituted $C_{5-30}$ aromatic condensed-ring group, or may be a substituted or non-substituted $C_{10-20}$ naphthyl group.

In the formula, Mp may be a group represented by formula Mp-1 or Mp-2; and L may represent a divalent linking group selected from the group consisting of —O—, (where $R^{a11}$ is a hydrogen atom or $C_{1-10}$ aliphatic hydrocarbon group), —S—, —C(=O)—, —S(=O)$_2$— and a $C_{1-20}$ substituted or non-substituted alkylene group, or the group consisting of any groups formed by linking at least two or more selected from the former group with each other;

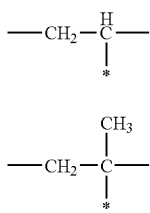
Mp-1

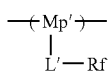
Mp-2 where "*" indicates the position at which the group bonds to L in formula (A).

The unit derived from the monomer having a fluoroaliphatic group(s) may be a unit represented by formula (B) shown below:

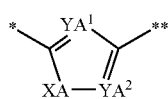
(B)

where Mp' represents a trivalent group forming a main chain partially; L' represents a single bond or a bivalent linking group; and Rf represents a substituent having at least one fluorine atom therein.

The at least one liquid crystal compound may be a discotic liquid crystal compound; and may be a compound represented by formula (DI) shown below:

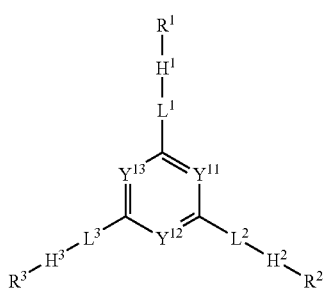
(DI)

where $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent following formula (DI-A) or (DI-B); and $R^1$, $R^2$ and $R^3$ each independently represent following formula (DI-R):

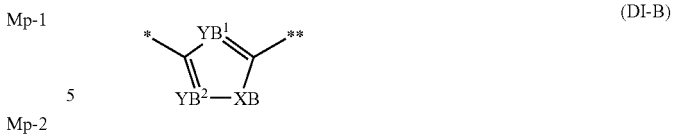
(DI-A)

where, in formula (DI-A), $YA^1$ and $YA^2$ each independently represent a methine group or a nitrogen atom; XA represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$:

(DI-B)

where, in formula (DI-B), $YB^1$ and $YB^2$ each independently represent a methine group or a nitrogen atom; XB represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$:

(DI-R)

where, in formula (DI-R), * indicates the position at which the formula bonds to $H^1$, $H^2$ or $H^3$ in formula (DI); $F^1$ represents a bivalent linking group having at least one cyclic structure; $L^{21}$ represents a single bond or a bivalent linking group; n1 indicates an integer of from 0 to 4; $L^{22}$ represents —O—, —O—CO—, —CO—O—, —O—CO—O—, —S—, —NH—, —SO$_2$—, —CH$_2$—, —CH=CH— or provided that, when the group has a hydrogen atom, the hydrogen atom may be substituted with a substituent; $L^{23}$ represents a bivalent linking group selected from —O—, —S—, —C(=O)—, —SO$_2$—, —NH—, —CH$_2$—, —CH=CH— and —C≡C—, a group formed by linking two or more of these, provided that, when the group has a hydrogen atom, the hydrogen atom may be substituted with a substituent; and $Q^1$ represents a polymerizing group or a hydrogen atom.

The at least one liquid crystal compound may be a compound represented by formula (DII) or (DIII) shown below:

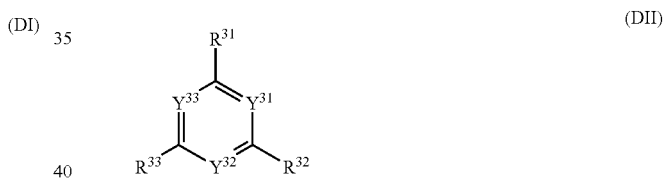
(DII)

where, in formula (DII), $Y^{31}$, $Y^{32}$ and $Y^{33}$ each independently represent a methine group or a nitrogen atom; $R^{31}$, $R^{32}$ and $R^{33}$ each independently represent following formula (DII-R):

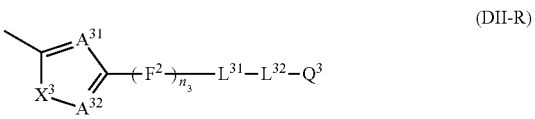
(DII-R)

where, in formula (DII-R), $A^{31}$ and $A^{32}$ each independently represent a methine group or a nitrogen atom; $X^3$ represents an oxygen atom, a sulfur atom, a methylene group or an imino group; $F^2$ represents a bivalent cyclic linking group having a 6-membered cyclic structure; n3 indicates an integer of from 1 to 3; $L^{31}$ represents —O—, —O—CO—, —CO—O—, —O—CO—O—, —S—, —NH—, —SO$_2$—, —CH$_2$—, —CH=CH— or —C≡C—, provided that, when the group has a hydrogen atom, the hydrogen atom may be substituted with a substituent; $L^{32}$ represents a bivalent linking group selected from —O—, —S—, —C(=O)—, —SO$_2$—, —NH—, —CH$_2$—, —CH=CH— and —C≡C—, a group formed by linking two or more of these, provided that, when the group has a hydrogen atom, the hydrogen atom may be substituted with a substituent; and $Q^3$ represents a polymerizing group or a hydrogen atom;

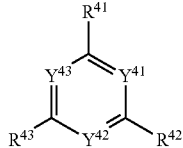
(DIII)

where, in formula (DIII), $Y^{41}$, $Y^{42}$ and $Y^{43}$ each independently represent a methine group or a nitrogen atom; $R^{41}$, $R^{42}$ and $R^{43}$ each independently represent following formula (DIII-A), (DIII-B) or (DIII-C):

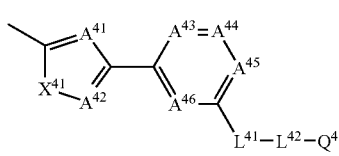
(DIII-A)

where, in formula (DIII-A), $A^{41}$, $A^{42}$, $A^{43}$, $A^{44}$, $A^{45}$ and $A^{46}$ each independently represent a methine group or a nitrogen atom; $X^{41}$ represents an oxygen atom, a sulfur atom, a methylene group or an imino group; $L^{41}$ represents —O—, —O—CO—, —CO—O—, —O—CO—O—, —S—, —NH—, —SO$_2$—, —CH$_2$—, —CH=CH— or —C≡C—, provided that, when the group has a hydrogen atom, then the hydrogen atom may be substituted with a substituent; $L^{42}$ represents a bivalent linking group selected from —O—, —S—, —C(=O)—, —SO$_2$—, —NH—, —CH$_2$—, —CH=CH— and —C≡C—, and a group formed by linking two or more of these, provided that, when the group has a hydrogen atom, then the hydrogen atom may be substituted with a substituent; and $Q^4$ represents polymerizing group or a hydrogen atom:

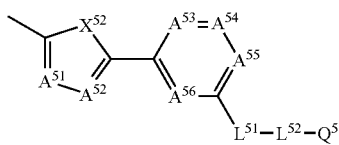
(DIII-B)

where, in formula (DIII-B), $A^{51}$, $A^{52}$, $A^{53}$, $A^{54}$, $A^{55}$ and $A^{56}$ each independently represent a methine group or a nitrogen atom; $X^{52}$ represents an oxygen atom, a sulfur atom, a methylene group or an imino group; $L^{51}$ represents —O—, —O—CO—, —CO—O—, —O—CO—O—, —S—, —NH—, —SO$_2$—, —CH$_2$—, —CH=CH— or —C≡C—, provided that, when the group has a hydrogen atom, then the hydrogen atom may be substituted with a substituent; $L^{52}$ represents a bivalent linking group selected from —O—, —S—, —C(=O)—, —SO$_2$—, —NH—, —CH$_2$—, —CH=CH— and —C≡C—, and a group formed by linking two or more of these, provided that, when the group has a hydrogen atom, then the hydrogen atom may be substituted with a substituent; and $Q^5$ represents a polymerizing group or a hydrogen atom:

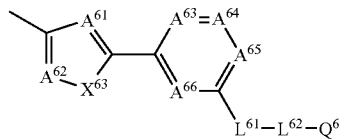
(DIII-C)

where, in formula (DIII-C), $A^{61}$, $A^{62}$, $A^{63}$, $A^{64}$, $A^{65}$ and $A^{66}$ each independently represent a methine group or a nitrogen atom; $X^{63}$ represents an oxygen atom, a sulfur atom, a methylene group or an imino group; $L^{61}$ represents —O—, —O—CO—, —CO—O—, —O—CO—O—, —S—, —NH—, —SO$_2$—, —CH$_2$—, —CH=CH— or —C≡C—, provided that, when the group has a hydrogen atom, then the hydrogen atom may be substituted with a substituent; $L^{62}$ represents a bivalent linking group selected from —O—, —S—, —C(=O)—, —SO$_2$—, —NH—, —CH$_2$—, —CH=CH— and —C≡C—, a group formed by linking two or more of these, provided that, when the group has a hydrogen atom, then the hydrogen atom may be substituted with a substituent; and $Q^6$ represents a polymerizing group or a hydrogen atom.

As one embodiment, there is provided the composition comprising a first liquid crystal compound represented by formula (DI), (DII) or (DIII) and a second liquid crystal compound other than that represented by formulae (DI), (DII) and (DIII). According this embodiment, the second compound may be selected form formula (T) shown below:

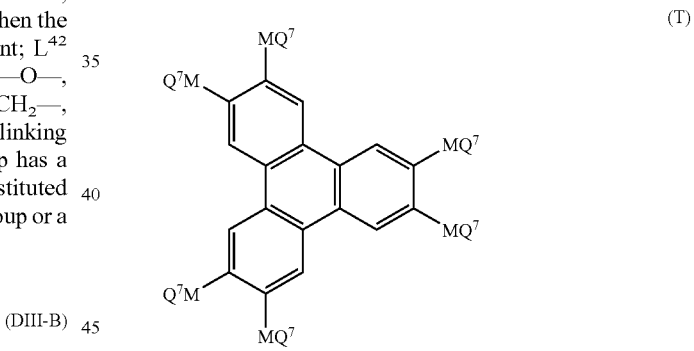
(T)

where M represents a bivalent linking group, which may be the same or different; and $Q^7$ represents a polymerizable group or a hydrogen atom, which may be the same or different.

In another aspect, the invention provides a retardation plate comprising an optically anisotropic layer formed of the composition; a liquid crystal display device comprising the retardation plate; a method of producing a retardation plate comprising forming an optically anisotropic layer by using the composition; a polymer comprising a unit represented by formula (A) and a unit represented by formula (B):

(A)

where Mp represents a trivalent group forming a main chain partially; L represents a single bond or a bivalent linking group; and X represents a substituted or non-substituted aromatic condensed-ring group;

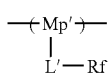
(B)

where Mp' represents a trivalent group forming a main chain partially; L' represents a single bond or a bivalent linking group; and Rf represents a substituent having at least one fluorine atom therein; and an agent for controlling tilt angles, which is a polymer comprising a unit represented by formula (A) and a unit derived from a monomer having a fluoroaliphatic group(s):

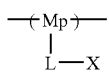
(A)

where Mp represents a trivalent group forming a main chain fully or partially; L represents a single bond or a bivalent linking group; and X represents a substituted or non-substituted aromatic condensed-ring group.

Figure 1:
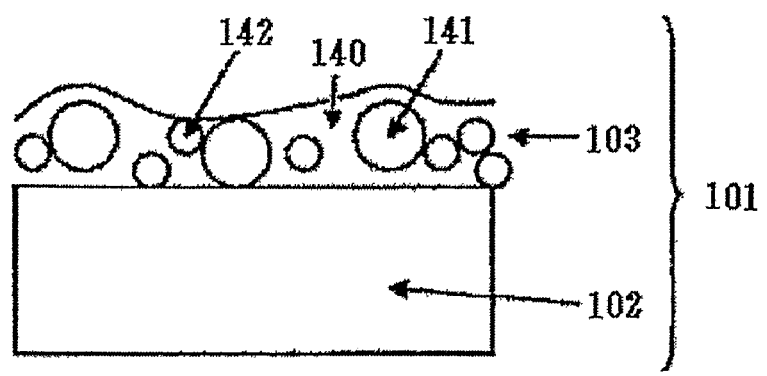
FIG. 1 is a schematic cross sectional view showing a representative embodiment of a light diffusion film.
In the drawing, reference numerals mean as follows.

| | |
|---|---|
| 101 | light diffusion film |
| 102 | transparent base film |
| 103 | light diffusion layer |
| 104 | translucent resin |
| 140 | translucent resin |
| 141 | first translucent fine particle |
| 142 | second translucent fine particle |

PREFERRED EMBODIMENT OF THE INVENTION

The invention will be described in detail below. The expression "from a lower value to an upper value" referred herein means that the range intended by the expression includes both the lower value and the upper value.

At first, the definitions of "Re($\lambda$)", "Rth($\lambda$)" and "tilt angle" are explained.
(Measure of Re($\lambda$) and Rth($\lambda$))

In the description, Re($\lambda$) and Rth($\lambda$) each indicate the in-plane retardation and the thickness direction retardation of the film at a wavelength $\lambda$. Re($\lambda$) is measured by applying a light having a wavelength of $\lambda$ nm in the normal direction of the film, using KOBRA-21ADH or WR (by Oji Scientific Instruments). The selectivity of the measurement wavelength $\lambda$ nm may be conducted by a manual exchange of a wavelength-filter, a program conversion of a measurement wavelength value or the like.

When the film tested is represented by an uniaxial or biaxial refractive index ellipsoid, then its Rth($\lambda$) is calculate according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), Re($\lambda$) of the film is measured at 6 points in all thereof, up to +50° relative to the normal direction of the film at intervals of 10°, by applying a light having a wavelength of $\lambda$ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (1) and (2):

$$(1): Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

$$(2): Rth = ((nx + ny)/2 - nz) \times d$$

wherein Re($\theta$) means the retardation value of the film in the direction inclined by an angle $\theta$ from the normal direction; nx means the in-plane refractive index of the film in the slow axis direction; ny means the in-plane refractive index of the film in the direction vertical to nx; nz means the refractive index of the film vertical to nx and ny; and d is a thickness of the film.

When the film to be tested could not be represented by a monoaxial or biaxial index ellipsoid, or that is, when the film does not have an optical axis, then its Rth($\lambda$) may be calculated according to the method mentioned below.

With the in-plane slow axis (determined by KOBRA 21ADH or WR) taken as the inclination axis (rotation axis) of the film, Re($\lambda$) of the film is measured at 11 points in all thereof, from −50° to +50° relative to the normal direction of the film at intervals of 10°, by applying a light having a wavelength of $\lambda$ nm from the inclined direction of the film. Based on the thus-determined retardation data of Re(7), the mean refractive index and the inputted film thickness, Rth($\lambda$) of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59). The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.
(Measurement of Tilt Angle)

It is difficult to accurately and directly measure $\theta 1$, which is a tilt angle at a surface of an optically-anisotropic film (an angle between the physical symmetric axis of a discotic or rod-like liquid-crystal molecule in the optically-anisotropic film and an interface of the layer), and $\theta 2$, which is a tilt angle at another surface of the optically-anisotropic film. Therefore, in this description, θ1 and θ2 are calculated as follows: This method could not accurately express the actual alignment state, but may be helpful as a means for indicating the relative relationship of some optical characteristics of an optical film.

In this method, the following two points are assumed for facilitating the calculation, and the tilt angles at two interfaces of an optically-anisotropic film are determined.

1. It is assumed that an optically-anisotropic film is a multi-layered structure that comprises a layer containing discotic or rod-like compound(s). It is further assumed that the minimum unit layer constituting the structure (on the assumption that the tilt angle of the discotic or rod-like molecule is uniform inside the layer) is an optically-monoaxial layer.

2. It is assumed that the tilt angle in each layer varies monotonously as a linear function in the direction of the thickness of an optically-anisotropic layer.

A concrete method for calculation is as follows:

(1) In a plane in which the tilt angle in each layer monotonously varies as a linear function in the direction of the thickness of an optically-anisotropic film, the incident angle of light to be applied to the optically-anisotropic film is varied, and the retardation is measured at three or more angles. For simplifying the measurement and the calculation, it is desirable that the retardation is measured at three angles of −40°, 0° and +40° relative to the normal direction to the optically-anisotropic film of being at an angle of 0°. For the measurement, for example, used are KOBRA-21ADH and KOBRA-WR (by Oji Scientific Instruments), and transmission ellipsometers AEP-100 (by Shimadzu), M150 and M520 (by Nippon Bunko) and ABR10A (by Uniopto).

(2) In the above model, the refractive index of each layer for normal light is represented by n0; the refractive index thereof for abnormal light is by ne (ne is the same in all layers as well as n0); and the overall thickness of the multi-layer structure is represented by d. On the assumption that the tilting direction in each layer and the monoaxial optical axis direction of the layer are the same, the tilt angle θ1 in one face of the optically-anisotropic layer and the tilt angle θ2 in the other face thereof are fitted as variables in order that the calculated data of the angle dependence of the retardation of the optically-anisotropic layer could be the same as the found data thereof, and θ1 and θ2 are thus calculated.

In this, n0 and ne may be those known in literature and catalogues. When they are unknown, they may be measured with an Abbe's refractometer. The thickness of the optically-anisotropic film may be measured with an optical interference thickness gauge or on a photograph showing the cross section of the layer taken by a scanning electronic microscope.

It is also noted that, in the description, the expression of "the number of carbon atoms in a group" means the number of all carbon atoms in the group if there is no negative notation, and if the group has any substituent, carbon atoms in the substituent are also counted.

It is also noted that, in the description, the term "group" means may have any substituent if there is no negative notation.

[Composition]

The composition of the invention comprises at least one liquid crystal compound and at least one polymer comprising a constitutional unit represented by the following formula (A) and a constitutional unit derived from a monomer having a fluoroaliphatic group. Hereinafter, the polymer may be referred to as "polymer used in the invention".

The polymer used in the invention and the liquid crystalline compound favorably used will be described below.

The polymer comprising a constitutional unit represented by the following formula (A) and a constitutional unit derived from a monomer having a fluoroaliphatic group contributes to aligning liquid crystal molecules, particularly discotic liquid crystal molecules, in a hybrid alignment state with a low mean tilt angle. Furthermore, the mean tilt angle is hard to change on fluctuation in temperature, and therefore, an optically anisotropic film and the like having intended optical characteristics can be produced stably by using the polymer.

(1) Constitutional Unit Represented by Formula (A)

In the formula (A), Mp represents a trivalent group constituting a polymer main chain fully or partially, L represents a single bond or a divalent linking group, and X represents a substituted or non-substituted aromatic condensed ring group.

In the formula (A), Mp represents a trivalent group, which constitutes the main chain of the polymer fully or partially. Preferred examples of the trivalent group represented by Mp in the formula (A) include a substituted or non-substituted and linear or branched alkylene group having from 2 to 20 carbon atoms (without carbon atoms in the substituent, hereinafter the same for the carbon numbers in Mp) (such as an ethylene group, a propylene group, a methylethylene group, a butylene group and a hexylene group), a substituted or non-substituted cyclic alkylene group having from 3 to 10 carbon atoms (such as a cyclopropylene group, a cyclobutylene group and a cyclohexylene group), a substituted or non-substituted vinylene group, a substituted or non-substituted cyclic vinylene group, a substituted or non-substituted phenylene group, a group containing an oxygen atom (such as groups containing an ether group, an acetal group, an ester group, a carbonate group or the like), a group containing a nitrogen atom (such as groups containing an amino group, an imino group, an amide group, a urethane group, a ureido group, an imide group, an imidazole group, an oxazole group, a pyrrole group, an anilide group, a maleimide group or the like), a group containing a sulfur atom (such as groups containing a sulfide group, a sulfone group, a thiophene group or the like), a group containing a phosphorous atom (such as groups containing a phosphine group, a phosphate ester group or the like), a group containing a silicon atom (such as groups containing a siloxane group or the like), and a group formed by bonding two or more of these groups, in which a hydrogen atom contained in the group is substituted with a group represented by -L-X, more preferred examples of the group represented by Mp include a substituted or non-substituted ethylene group, a substituted or non-substituted methylethylene group, a substituted or non-substituted cyclohexylene group and a substituted or non-substituted vinylene group, in which a hydrogen atom contained in the group is substituted with a group represented by -L-X, further preferred examples of the group represented by Mp include a substituted or non-substituted ethylene group, a substituted or non-substituted methylethylene group and a substituted or non-substituted vinylene group, in which a hydrogen atom contained in the group is substituted with a group represented by -L-X, and particularly preferred examples of the group represented by Mp include a substituted or non-substituted ethylene group and a substituted or non-substituted methylethylene group, in which a hydrogen atom contained in the group is substituted with a group represented by -L-X. Specifically, the groups (Mp-1) and (Mp-2) shown below are preferred as the group represented by Mp.

Specific examples of the group represented by Mp include the groups (Mp-1) to (Mp-19) shown below, but Mp is not limited to these groups. In the formulae of (Mp-1) to (Mp-19), the symbol * shows the position, to which the group L is bonded.

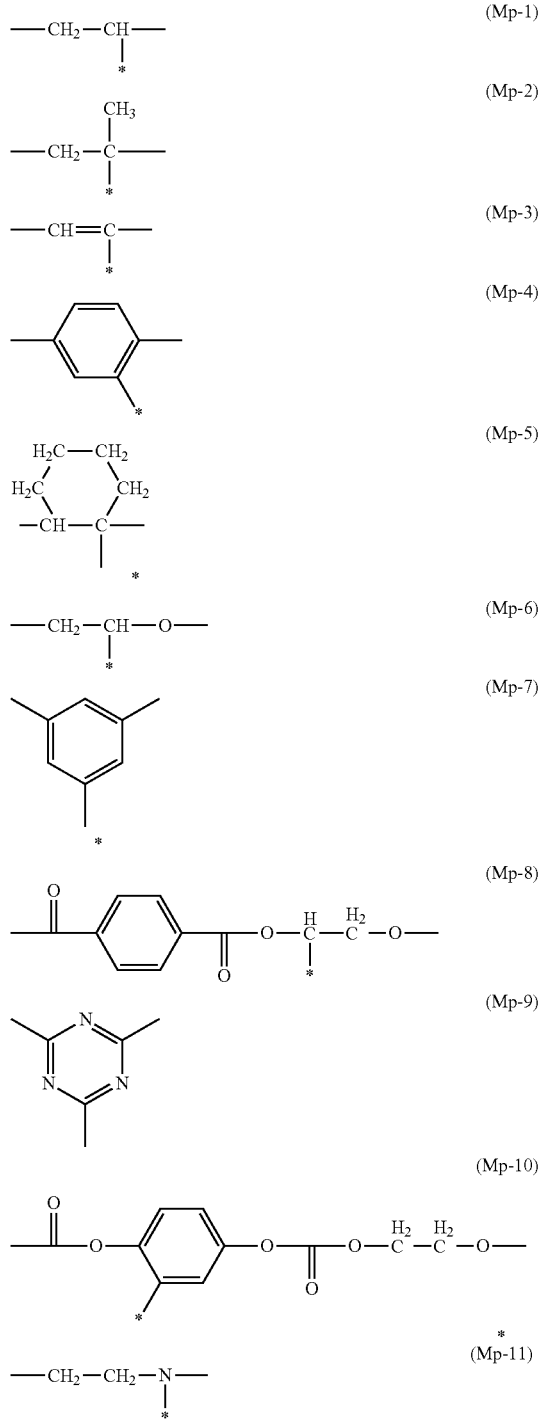

Preferred examples of the divalent linking group represented by L in the formula (A) include an alkylene group having from 1 to 20 carbon atoms (such as a methylene group, an ethylene group, a propylene group, a butylene group and an isopropylene group), an alkenylene group having from 2 to 20 carbon atoms (such as a vinylene group and a butene group), —O—, —NR$^{a1}$—, —S—, —PR$^{a2}$—, —Si(R$^{a3}$)(R$^{a4}$)—, —C(=O)—, —C(=O)O—, —C(=O)NR$^{a5}$—, —OC(=O)O—, —OC(=O)NR$^{a6}$—, —NR$^{a7}$C(=O)NR$^{a8}$—, —(—O)$_2$CH— and a group formed by bonding two or more of these groups.

$R^{a1}$ to $R^{a8}$ each represents a substituent, which may be substituted, and examples thereof include a hydrogen atom, a halogen atom, an alkyl group (including a cycloalkyl group having one or more cyclic structure, such as a monocycloalkyl group and a bicycloalkyl group), an alkenyl group (including a cycloalkenyl group and a bicycloalkenyl group), an alkynyl group, a cyano group, a hydroxyl group, a nitro group, a carboxyl group, an alkoxy group, a silyloxy group, an acyloxy group, an alkoxycarbonyloxy group, an amino group (except for an anilino group), an acylamino group, an aminocarbonylamino group, an alkoxycarbonylamino group, a mercapto group, an alkylthio group, a sulfamoyl group, a sulfo group, an alkylsulfinyl group, an alkylsulfonyl group, an acyl group, an alkoxycarbonyl group, an imide group, a phosphino group, a phosphinyl group, a phosphinyloxy group, a phosphinylamino group and a silyl group, and a hydrogen atom and an alkyl group are preferred.

More preferred examples of the divalent linking group represented by L in the formula (A) include —O—, $NR^{a11}$— (wherein $R^{a11}$ represents a hydrogen atom or an aliphatic hydrocarbon group having from 1 to 10 carbon atoms), —S—, —C(=O)—, —S(=O)$_2$—, a substituted or non-substituted alkylene group having from 1 to 20 carbon atoms and a group formed by bonding two or more of these groups. Particularly preferred examples of the divalent linking group represented by L include —C(=O)O—, —OC(=O)—, —O—, —OC(=O)O—, —C(=O)NH—, —NHC(=O)—, —C(=O)O(CH$_2$)$_m$O—, —(CH$_2$)$_m$— and a group formed by bonding two or more of these groups.

The number m represents an integer of from 1 to 20. The number m is preferably from 1 to 16, more preferably from 2 to 12, and further preferably from 2 to 6, for controlling properly the degree of freedom of X. By properly controlling the degree of freedom of X, the mutual interaction with the liquid crystal to be oriented is increased, and the orientation of X can be properly controlled, whereby the mean tilt angle can be controlled more effectively.

The linking groups (L-1) to (L-7) shown below are also preferred as the divalent linking group represented by L. In the formulae of (L-1) to (L-7), the symbol * shows the position, to which the group Mp is bonded, and m represents an integer of from 1 to 20 and has the same meaning as m mentioned above with the same preferred ranges.

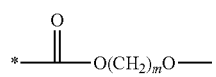

(L-1)

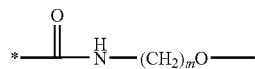

(L-2)

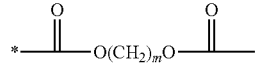

(L-3)

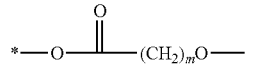

(L-4)

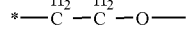

(L-5)

(L-6)

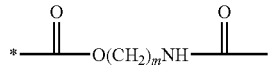

(L-7)

In the case where Mp in the formula (A) represents (Mp-1) or (Mp-2), preferred examples of the divalent linking group L include —O—, —$NR^{a11}$— (wherein $R^{a11}$ represents a hydrogen atom or an aliphatic hydrocarbon group having from 1 to 10 carbon atoms), —S—, —C(=O)—, —S(=O)$_2$—, a substituted or non-substituted alkylene group having from 1 to 20 carbon atoms and a group formed by bonding two or more of these groups, and more preferred examples thereof include —O—, —C(=O)O—, —C(=O)NH— and a divalent group formed by bonding one or more of these groups and an alkylene group, for example, the groups (L-1), (L-2) and (L-3), (L-6) above.

The number of rings in the substituted or non-substituted aromatic condensed ring group represented by X in the formula (A) is not particularly limited, and a group formed by condensing from 2 to 5 rings is preferred. The group includes not only a hydrocarbon aromatic condensed ring containing only carbon atoms as the atoms constituting the ring, but also an aromatic condensed ring formed by condensing heterocyclic rings containing heteroatoms as the atoms constituting the ring. Preferred examples of the group represented by X include a substituted or non-substituted indenyl group having from 5 to 30 carbon atoms (such as a methylindenyl group, a methoxyindenyl group and an indenyl group substituted with a hetero atom, e.g., a benzofuranyl group, a thionaphthenyl group, an indolenyl group, an indazolenyl group, a benzimidazolenyl group, a benzotriazolenyl group and a 1-pyrazolepyrazinyl group), a substituted or non-substituted naphthyl group having from 6 to 30 carbon atoms (such as a methylnaphthyl group, a cyanonaphthyl group, a fluoronaphthyl group, a bromonaphthyl group and a naphthyl group substituted with a hetero atom, e.g., a quinolyl group, an isoquinolyl group, a quinozolyl group, a quinoxalyl group, a 6,7-pyridopyridazinyl group, a benzotetrazinyl group and a pteryl group), a substituted or non-substituted fluorenyl group having from 12 to 30 carbon atoms (such as a 2,7-dimethylfluorenyl group and a fluorenyl group substituted with a hetero atom, e.g., a carbazolyl group, a dibenzofuranyl group and a dibenzothiophenyl group), an anthryl group (such as a 5-methylanthryl group and an anthryl group substituted with a hetero atom, e.g., a xanthenyl group, an acridinyl group and a phenadinyl group), a pyrenyl group, a perylenyl group and a phenanthrenyl group.

More preferred examples of the group represented by X in the formula (A) include a substituted or non-substituted indenyl group having from 5 to 30 carbon atoms and a substituted or non-substituted naphthyl group having from 6 to 30 carbon atoms, further preferred examples thereof include a substituted or non-substituted naphthyl group having from 10 to 30 carbon atoms, and particularly preferred examples thereof include a substituted or non-substituted naphthyl group having from 10 to 20 carbon atoms.

For the compounds where L represents a single bond, —O—, $NR^{a11}$— (wherein $R^{a11}$ represents a hydrogen atom or an aliphatic hydrocarbon group having from 1 to 10 carbon atoms), —S—, —C(=O)—, —S(=O)$_2$— or a group formed by bonding two or more of these groups, X preferably represents a substituted or non-substituted naphthyl group.

Specific preferred examples of the constituting unit represented by the formula (A) include, but are not limited to, constitutional units A-1 to A-34 below.

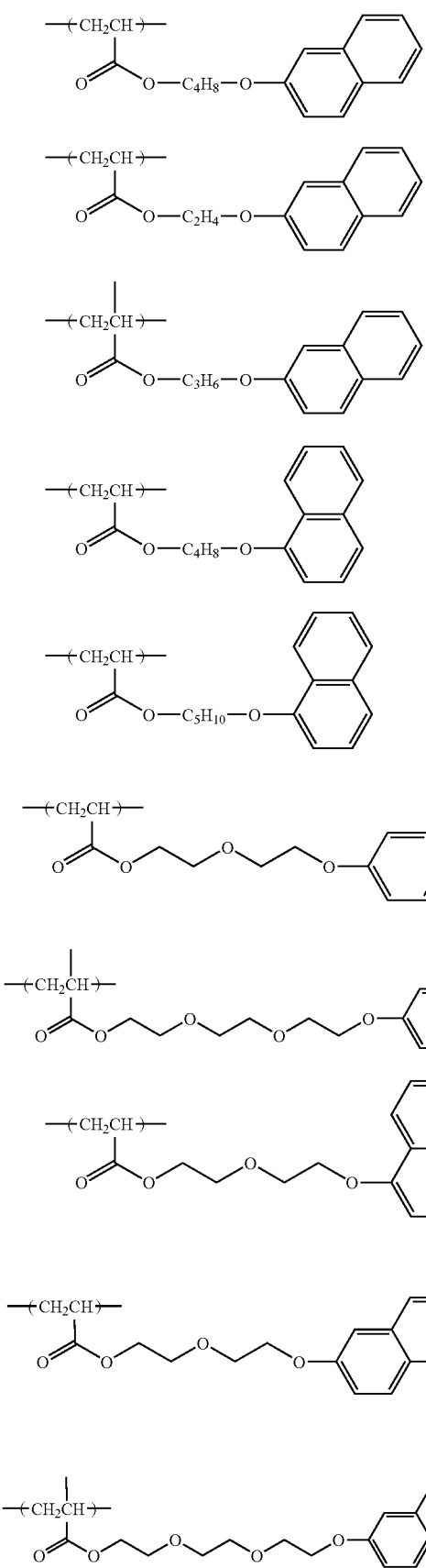
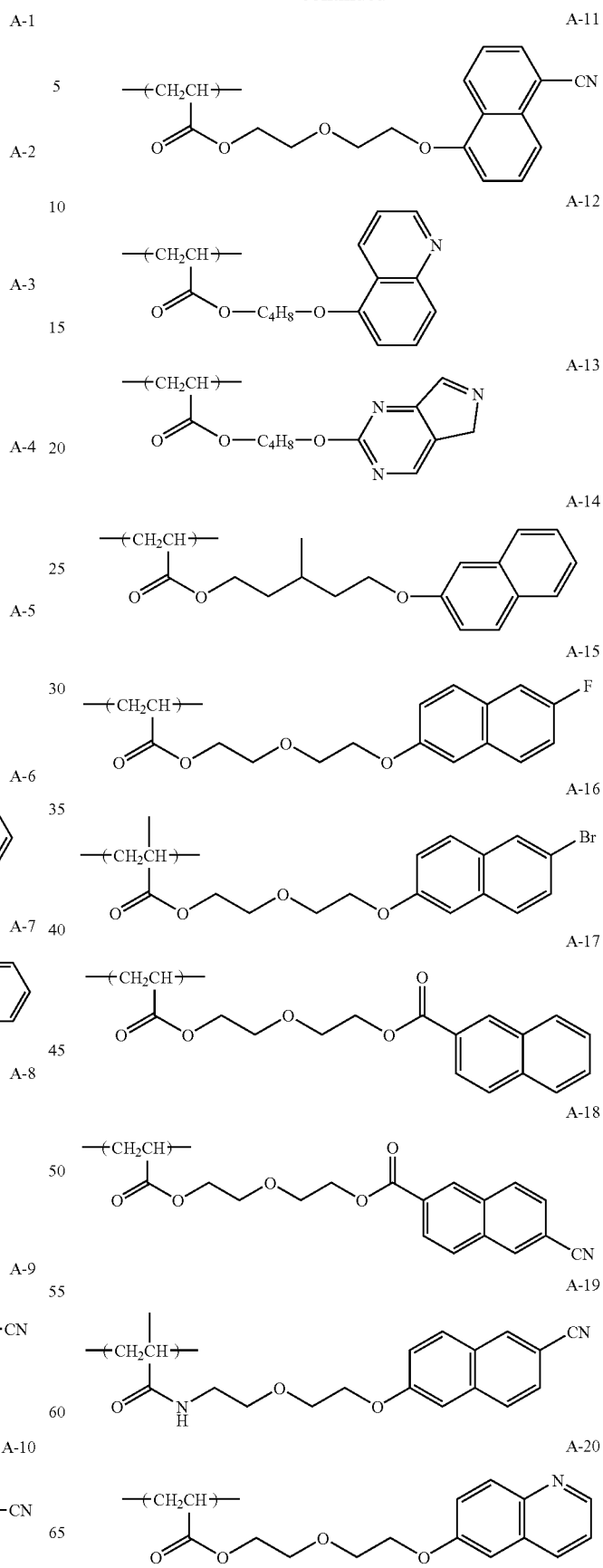

(2) Constitutional Unit Derived from Monomer Having Fluoroaliphatic Group(s)

The polymer used in the invention has a constitutional unit derived from a monomer having a fluoroaliphatic group(s) with the constitutional unit represented by the formula (A). The unit is preferably a unit represented by a formula (B) below. The formula will be described in detail.

$$-(Mp')- \\ | \\ L'-Rf$$

Formula (B)

In formula (B), Mp' represents a trivalent group forming a main chain partially; L' represents a single bond or a bivalent linking group; and Rf represents a substituent having at least one fluorine atom therein.

In the formula, Mp' has the same meaning as that of Mp in formula (A), and its preferred range is also same as that therein.

In the formula, L' preferably represents —O—, —NR$^{a11}$— (where R$^{a11}$ represents a hydrogen atom, an aliphatic hydrocarbon group having from 1 to 10 carbon atoms, or an aryl group having from 6 to 20 carbon atoms), —S—, —C(=O)—, —S(=O)$_2$, and a substituted or non-substituted alkylene group having from 1 to 20 carbon atoms, and a group formed by linking at least two of these.

Examples of the bivalent linking group formed by linking at least two or the above groups include —C(=O)—, —OC(=O)—, —OC(=O)O—, —C(=O)NH—, —NHC(=O)—, and —C(=O)O(CH$_2$)$_{ma}$O— (where ma indicates an integer of from 1 to 20).

In the unit of formula (B) wherein Mp' is (Mp-1) or (Mp-2), L' is preferably a bivalent linking group selected from —O—, —NR$^{a11}$— (where R$^{a11}$ represents a hydrogen atom, or an aliphatic hydrocarbon group having from 1 to 10 carbon atoms), —S—, —C(=O)—, —S(=O)$_2$, and a substituted or non-substituted alkylene group having from 1 to 20 carbon atoms, and a group formed by linking at least two of these; more preferably a bivalent linking group selected from —O—, —C(=O)O—, and —C(=O)NH—, and a group of a combination of at least one of these groups with an alkylene group (e.g., (L-1), (L-2), (L-3)).

Preferred examples of Rf include an aliphatic hydrocarbon group having from 1 to 30 carbon atoms and substituted with at least one fluorine atom (e.g., trifluoroethyl, perfluorohexylethyl, perfluorohexylpropyl, perfluorobutylethyl, and perfluorooctylethyl). Also preferably, Rf has a group CF$_3$ or CF$_2$H, more preferably a group CF$_3$, at its terminal.

More preferably, Rf is an alkyl group having a group CF$_3$ at its terminal, or an alkyl group having CF$_2$H at its terminal. The alkyl group having CF$_3$ at its terminal is an alkyl group in which a part or all of the hydrogen atoms constituting the alkyl group are substituted with a fluorine atom. Preferably, at least 50% of hydrogen atoms constituting the alkyl group having CF$_3$ at its terminal are substituted with a fluorine atom; more preferably at least 60% thereof are substituted; and even more preferably at least 70% thereof are substituted. The remaining hydrogen atoms may be substituted with the substituent in the substituent group D given hereinunder.

The alkyl group having a group CF$_2$H at its terminal is an alkyl group in which a part or all of the hydrogen atoms constituting the alkyl group are substituted with a fluorine atom. Preferably, at least 50% of the hydrogen atoms constituting the alkyl group having CF$_2$H at its terminal are substituted with a fluorine atom; more preferably at least 60% thereof are substituted; and even more preferably at least 70% thereof are substituted. The remaining hydrogen atoms may be substituted with the substituent in the substituent group D given hereinunder.

Substituent Group D:

In this description, Substituent Group D includes an alkyl group (preferably having from 1 to 20 carbon atoms, more preferably from 1 to 12 carbon atoms, even more preferably from 1 to 8 carbon atoms, such as methyl group, ethyl group, isopropyl group, tert-butyl group, n-octyl group, n-decyl group, n-hexadecyl group, cyclopropyl group, cyclopentyl group, cyclohexyl group), an alkenyl group (preferably having from 2 to 20 carbon atoms, more preferably from 2 to 12 carbon atoms, even more preferably from 2 to 8 carbon atoms, such as vinyl group, allyl group, 2-butenyl group, 3-pentenyl group), an alkynyl group (preferably having from 2 to 20 carbon atom, more preferably from 2 to 12 carbon atoms, even more preferably from 2 to 8 carbon atoms, such as propargyl group, 3-pentynyl group), an aryl group (preferably having from 6 to 30 carbon atoms, more preferably 6 to 20 carbon atoms, even more preferably from 6 to 12 carbon atoms, such as phenyl group, p-methylphenyl group, naphthyl group), a substituted or non-substituted amino group (preferably having from 0 to 20 carbon atoms, more preferably from 0 to 10 carbon atoms, even more preferably from 0 to 6 carbon atoms, such as non-substituted amino group, methylamino group, dimethylamino group, diethylamino group, dibenzylamino group), an alkoxy group (preferably having from 1 to 20 carbon atoms, more preferably from 1 to 12 carbon atoms, even more preferably from 1 to 8 carbon atoms, such as methoxy group, ethoxy group, butoxy group), an aryloxy group (preferably having from 6 to 20 carbon atoms, more preferably from 6 to 16 carbon atoms, even more preferably from 6 to 12 carbon atoms, such as phenyloxy group, 2-naphthyloxy group), an acyl group (preferably having from 1 to 20 carbon atoms, more preferably from 1 to 16 carbon atoms, even more preferably from 1 to 12 carbon atoms, such as acetyl group, benzoyl group, formyl group, pivaloyl group), an alkoxycarbonyl group (preferably having from 2 to 20 carbon atoms, more preferably from 2 to 16 carbon atoms, even more preferably from 2 to 12 carbon atoms, such as methoxycarbonyl group, ethoxycarbonyl group), an aryloxycarbonyl group (preferably having from 7 to 20 carbon atoms, more preferably from 7 to 16 carbon atoms, even more preferably from 7 to 10 carbon atoms, such as phenyloxycarbonyl group), an acyloxy group (preferably having from 2 to 20 carbon atoms, more preferably from 2 to 16 carbon atoms, even more preferably from 2 to 10 carbon atoms, such as acetoxy group, benzoyloxy group), an acylamino group (preferably having from 2 to 20 carbon atoms, more preferably from 2 to 16 carbon atoms, even more preferably from 2 to 10 carbon atoms, such as acetylamino group, benzoylamino group), an alkoxycarbonylamino group (preferably having from 2 to 20 carbon atoms, more preferably from 2 to 16 carbon atoms, even more preferably from 2 to 12 carbon atoms, such as methoxycarbonylamino group), an aryloxycarbonylamino group (preferably having from 7 to 20 carbon atoms, more preferably from 7 to 16 carbon atoms, even more preferably from 7 to 12 carbon atoms, such as phenyloxycarbonylamino group), a sulfonylamino group (preferably having from 1 to 20 carbon atoms, more preferably from 1 to 16 carbon atoms, even more preferably from 1 to 12 carbon atoms, such as methanesulfonylamino group, benzenesulfonylamino group), a sulfamoyl group (preferably having from 0 to 20 carbon atoms, more preferably from 0 to 16 carbon atoms, even more preferably from 0 to 12 carbon atoms, such as sulfamoyl group, methylsulfamoyl group, dimethylsulfamoyl group, phenylsulfamoyl group), a carbamoyl group (preferably having from 1 to 20 carbon atoms, more preferably from 1 to 16 carbon atoms, even more preferably from 1 to 12 carbon atoms, such as non-substituted carbamoyl group, methylcarbamoyl group, diethylcarbamoyl group, phenylcarbamoyl group), an alkylthio group (preferably having from 1 to 20 carbon atoms, more preferably from 1 to 16 carbon atoms, even more preferably from 1 to 12 carbon atoms, such as methylthio group, ethylthio group), an arylthio group (preferably having from 6 to 20 carbon atoms, more preferably from 6 to 16 carbon atoms, even more preferably from 6 to 12 carbon atoms, such as phenylthio group), a sulfonyl group (preferably having from 1 to 20 carbon atoms, more preferably from 1 to 16 carbon atoms, even more preferably from 1 to 12 carbon atoms, such as mesyl group, tosyl group), a sulfinyl group (preferably having from 1 to 20 carbon atoms, more preferably from 1 to 16 carbon atoms, even more preferably from 1 to 12 carbon atoms, such as methanesulfinyl group, benzenesulfinyl group), an ureido group (preferably having from 1 to 20 carbon atoms, more preferably from 1 to 16 carbon atoms, even more preferably from 1 to 12 carbon atoms, such as non-substituted ureido group, methylureido group, phenylureido group), a phosphoramido group (preferably having from 1 to 20 carbon atoms, more preferably from 1 to 16 carbon atoms, even more preferably from 1 to 12 carbon atoms, such as diethylphosphoramido group, phenylphosphoramido group), hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and having a hetero atom such as a nitrogen atom, an oxygen atom or a sulfur atom, for example, imidazolyl group, pyridyl group, quinolyl group, furyl group, piperidyl group, morpholino group, benzoxazolyl group, benzimidazolyl group, benzothiazolyl group), a silyl group (preferably having from 3 to 40 carbon atoms, more preferably from 3 to 30 carbon atoms, even more preferably from 3 to 24 carbon atoms, such as trimethylsilyl group, triphenylsilyl group). These substituents may be further substituted with any of these substituents. When the substituent has two or more substituents, then they may be the same or different. If possible, the substituents may bond to each other to form a ring.

Examples of the alkyl group having a group $CF_3$ at its terminal and the alkyl group having a group $CF_2H$ at its terminal are shown below.

| | |
|---|---|
| $n\text{-}C_8F_{17}\text{—}$ | R1 |
| $n\text{-}C_6F_{13}\text{—}$ | R2 |
| $n\text{-}C_4F_9\text{—}$ | R3 |
| $n\text{-}C_8F_{17}\text{—}(CH_2)_2\text{—}$ | R4 |
| $n\text{-}C_6F_{13}\text{—}(CH_2)_2\text{—}$ | R5 |
| $n\text{-}C_4F_9\text{—}(CH_2)_2\text{—}$ | R6 |
| $H\text{—}(CF_2)_8\text{—}$ | R7 |
| $H\text{—}(CF_2)_6\text{—}$ | R8 |
| $H\text{—}(CF_2)_4\text{—}$ | R9 |
| $H\text{—}(CF_2)_8\text{—}(CH_2)\text{—}$ | R10 |
| $H\text{—}(CF_2)_6\text{—}(CH_2)\text{—}$ | R11 |
| $H\text{—}(CF_2)_4\text{—}(CH_2)\text{—}$ | R12 |
| $n\text{-}C_4F_9\text{—}(CH_2)_2\text{—}O\text{—}(CH_2)_3\text{—}O\text{—}$ | R13 |
| $n\text{-}C_5F_{13}\text{—}(CH_2)_2\text{—}O\text{—}$ | R14 |
| $n\text{-}C_4F_9\text{—}(CH_2)_2\text{—}O\text{—}$ | R15 |

Specific examples of preferred repetitive units derived from the monomer having a fluoroaliphatic group(s) include, but are not limited to, those shown below.

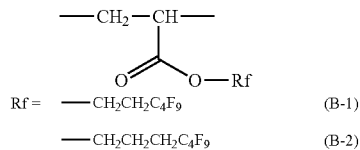

| | | |
|---|---|---|
| Rf = | $\text{—}CH_2CH_2C_4F_9$ | (B-1) |
| | $\text{—}CH_2CH_2CH_2C_4F_9$ | (B-2) |
| | $\text{—}CH_2CH_2C_6F_{13}$ | (B-3) |
| | $\text{—}CH_2CH_2C_8F_{17}$ | (B-4) |
| | $\text{—}CH_2CH_2OCH_2CH_2C_4F_9$ | (B-5) |
| | $\text{—}CH_2CH_2OCH_2CH_2CH_2C_4F_9$ | (B-6) |
| | $\text{—}CH_2CH_2OCH_2CH_2C_6F_{13}$ | (B-7) |
| | $\text{—}CH_2CH_2OCH_2CH_2C_8F_{17}$ | (B-8) |
| | $\text{—}CH_2CH_2C_4F_8H$ | (B-9) |
| | $\text{—}CH_2CH_2CH_2C_4F_8H$ | (B-10) |
| | $\text{—}CH_2CH_2C_6F_{12}H$ | (B-11) |
| | $\text{—}CH_2CH_2C_8F_{16}H$ | (B-12) |
| | $\text{—}CH_2CH_2OCH_2CH_2C_4F_8H$ | (B-13) |
| | $\text{—}CH_2CH_2OCH_2CH_2CH_2C_4F_8H$ | (B-14) |
| | $\text{—}CH_2CH_2OCH_2CH_2C_6F_{12}H$ | (B-15) |
| | $\text{—}CH_2CH_2OCH_2CH_2C_8F_{16}H$ | (B-16) |
| | $\text{—}CH_2CH_2OCH_2CH_2C_5F_{10}H$ | (B-17) |

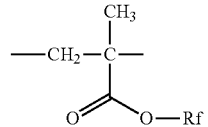

| | | |
|---|---|---|
| Rf = | $\text{—}CH_2CH_2C_4F_9$ | (B-18) |
| | $\text{—}CH_2CH_2CH_2C_4F_9$ | (B-19) |
| | $\text{—}CH_2CH_2C_6F_{13}$ | (B-20) |
| | $\text{—}CH_2CH_2C_8F_{17}$ | (B-21) |
| | $\text{—}CH_2CH_2OCH_2CH_2C_4F_9$ | (B-22) |
| | $\text{—}CH_2CH_2OCH_2CH_2CH_2C_4F_9$ | (B-23) |
| | $\text{—}CH_2CH_2OCH_2CH_2C_6F_{13}$ | (B-24) |
| | $\text{—}CH_2CH_2OCH_2CH_2C_8F_{17}$ | (B-25) |
| | $\text{—}CH_2CH_2C_4F_8H$ | (B-26) |
| | $\text{—}CH_2CH_2CH_2C_4F_8H$ | (B-27) |
| | $\text{—}CH_2CH_2C_6F_{12}H$ | (B-28) |
| | $\text{—}CH_2CH_2C_8F_{16}H$ | (B-29) |
| | $\text{—}CH_2CH_2OCH_2CH_2C_4F_8H$ | (B-30) |
| | $\text{—}CH_2CH_2OCH_2CH_2CH_2C_4F_8H$ | (B-31) |
| | $\text{—}CH_2CH_2OCH_2CH_2C_6F_{12}H$ | (B-32) |
| | $\text{—}CH_2CH_2OCH_2CH_2C_8F_{16}H$ | (B-33) |
| | $\text{—}CH_2CH_2OCH_2CH_2C_5F_{10}H$ | (B-34) |

The polymer for use in the invention may comprise a repetitive unit having a structure of formula (A), and repetitive unit derived from a monomer having a fluoroaliphatic group(s), and in addition to these, may further comprise any other constitutive unit derived from a monomer copolymerizable with the monomers to form these constitutive units.

The copolymerizable monomer is not specifically defined. Preferred monomers are, for example, monomers to constitute hydrocarbon polymers (e.g., polyethylene, polypropylene, polystyrene, polymaleinimide, polyacrylic acid, polyacrylate, polyacrylamide, polyacrylanilide), polyethers, polyesters, polycarbonates, polyamides, polyamic acids, polyimides, polyurethanes and polyureides. These may be in the polymer for improving the solubility of the polymer in solvent and for preventing aggregation of the polymer.

Preferably, the backbone chain structure of the comonomer is the same as the group of formula (A).

Specific examples of the copolymerizable constitutive units are mentioned below, to which, however, the invention should not be limited. Especially preferred are (C-2), (C-3), (C-10), (C-11), (C-12) and (C-19); and more preferred are (C-11) and (C-19).

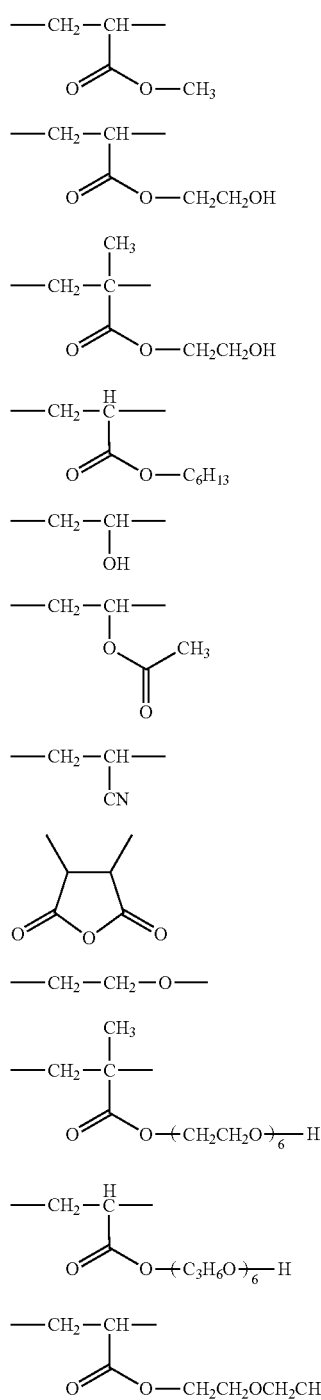

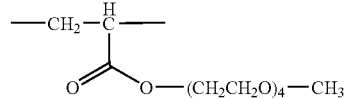

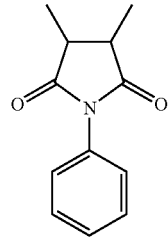

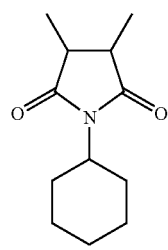

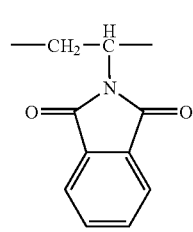

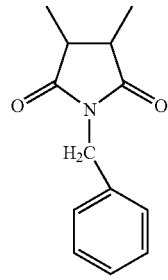

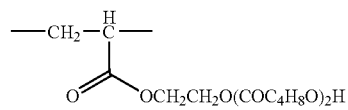

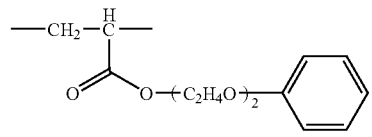

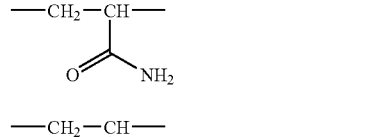

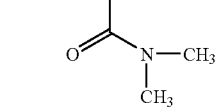

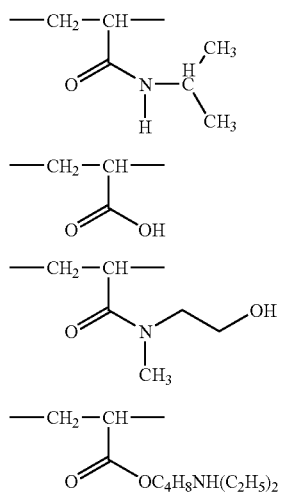

The content of the group of formula (A) in the polymer for use in the invention is preferably from 1 to 90% by mass, more preferably from 3 to 80% by mass.

The content of the repetitive unit derived from a monomer having a fluoroaliphatic group(s) (preferably the group of formula (B)) in the polymer for use in the invention is from 5 to 90% by mass, more preferably from 10 to 80% by mass.

The content of the other constitutive unit than the above-mentioned two in the polymer is preferably at most 60% by mass, more preferably at most 50% by mass.

The copolymer may be a random copolymer where the constitutive units are irregularly ordered, or a block copolymer where they are regularly ordered. In the block copolymer, the constitutive units may be ordered in any manner, and the same constitutive component may be ordered twice or more.

One or more different types of the group of formula (A) and the group of formula (B) may constitute the copolymer. For the polymers comprising two or more units represented by formula (A), it is preferred that the units are same as each other in terms of the condensed ring framework and are different from each other in terms of the substituent of the condensed ring (for example, one may have a non-substituted condensed ring group, and another may have a substituted same condensed ring group). In the copolymer that comprises two or more different types of the groups, the content of the constitutive groups is the overall content thereof.

Regarding the molecular weight range of the polymer for use in the invention, the number-average molecular weight (Mn) of the polymer is preferably from 1000 to 1,000,000, more preferably from 3000 to 200,000, even more preferably from 5000 to 100,000. The molecular weight distribution (Mw/Mn, Mw is weight-average molecular weight) of the polymer for use in the invention is preferably from 1 to 4, more preferably from 1.5 to 4.

The amount of the polymer to be in the composition of the invention is preferably from 0.001 to 10% by mass of the liquid-crystal compound therein, more preferably from 0.1 to 5.0% by mass, even more preferably from 0.5 to 2.5% by mass.

Preferred examples of the polymer to be used in the composition of the invention are shown in Table 1 below.

TABLE 1

| Polymer | Constitution of Repetitive Units of Polymer | Copolymerization Ratio (% by mass) | Number-Average Molecular Weight (Mn) | Molecular Weight Distribution (Mw/Mn) |
|---|---|---|---|---|
| AD-1 | A-6/B-3 | 60/40 | 12000 | 2.25 |
| AD-2 | A-6/B-3 | 62.5/37.5 | 10100 | 2.01 |
| AD-3 | A-6/B-3 | 65/35 | 12400 | 2.22 |
| AD-4 | A-6/B-3 | 67.5/32.5 | 11100 | 2.03 |
| AD-5 | A-6/B-3 | 70/30 | 10800 | 2.14 |
| AD-6 | A-6/B-3/B-1 | 55/22.5/22.5 | 10000 | 2.01 |
| AD-7 | A-6/B-3/B-1 | 60/20/20 | 10900 | 2.04 |
| AD-8 | A-6/B-3/B-1 | 65/17.5/17.5 | 10400 | 2.09 |
| AD-9 | A-6/B-3/B-1 | 60/20/20 | 14300 | 2.22 |
| AD-10 | A-6/B-3/B-1 | 60/20/20 | 18400 | 2.41 |
| AD-11 | A-6/B-3/B-1 | 60/20/20 | 7400 | 1.87 |
| AD-12 | A-6/B-3/C-11 | 33.75/32.5/33.75 | 11000 | 2.14 |
| AD-13 | A-6/B-3/C-11 | 17.0/32.5/50.5 | 12700 | 2.18 |
| AD-14 | A-6/B-3/C-19 | 15/40/45 | 16700 | 3.00 |
| AD-15 | A-6/A-9/B-3 | 57/3/40 | 14700 | 2.98 |
| AD-16 | A-6/A-7/B-3 | 30/30/40 | 16300 | 2.93 |
| AD-17 | A-6/A-8/B-3 | 30/30/40 | 13000 | 2.30 |
| AD-18 | A-6/A-9/B-3 | 40/20/40 | 12500 | 2.40 |

The polymer for use in the invention may be produced according to any method. The polymer for use in the invention may be produced through addition, condensation or substitution or a combination of any of these. Not specifically defined, when the polymer for use in the invention has an ethylenic repetitive unit, then it is desirable that the polymer is produced through radical polymerization of an ethylenic unsaturated compound corresponding to the repetitive unit, as the method is simple.

Liquid Crystal Compound

The liquid crystal compound used in the invention is not particularly limited, a compound exhibiting discotic liquid crystallinity (a discotic liquid crystal compound) is preferred, and a compound exhibiting a discotic nematic phase is more preferred. Examples of the liquid crystal compound to be used in the invention include any compounds represented by formula (DI).

[Compound of Formula (DI)]

The compound represented by formula to be used in the invention is preferably a discotic liquid crystal compound, and more preferably, exhibits a discotic nematic phase.

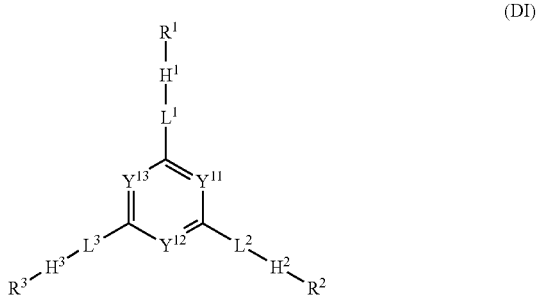

In formula (DI), $Y^{11}$, $Y^{12}$ and $Y^{13}$ each independently represent a methine group or a nitrogen atom. $L^1$, $L^2$ and $L^3$ each independently represent a single bond or a bivalent linking group. $H^1$, $H^2$ and $H^3$ each independently represent the following formula (DI-A) or (DI-B). $R^1$, $R^2$ and $R^3$ each independently represent the following formula (DI-R).

In formula (DI), $Y^{11}$, $Y^{12}$ and $Y^{13}$ each independently represent a methine group or a nitrogen atom. When each of $Y^{11}$, $Y^{12}$ and $Y^{13}$ each is a methine group, the hydrogen atom of the methine group may be substituted with a substituent. Examples of the substituent of the methine group include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, preferred are an alkyl group, an alkoxy group, an alkoxycarbonyl group, an acyloxy group, a halogen atom and a cyano group; more preferred are an alkyl group having from 1 to 12 carbon atoms (the term "carbon atoms" means hydrocarbons in a substituent, and the terms appearing in the description of the substituent of the discotic liquid crystal compound have the same meaning), an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^{11}$, $Y^{12}$ and $Y^{13}$ are all methine groups, more preferably non-substituted methine groups.

In formula (DI), $L^1$, $L^2$ and $L^3$ each independently represent a single bond or a bivalent linking group. The bivalent linking group is preferably selected from —O—, —S—, —C(=O)—, —NR$^7$—, —CH=CH—, —C≡C—, a bivalent cyclic group, and their combinations. $R^7$ represents an alkyl group having from 1 to 7 carbon atoms, or a hydrogen atom, preferably an alkyl group having from 1 to 4 carbon atoms, or a hydrogen atom, more preferably a methyl, an ethyl or a hydrogen atom, even more preferably a hydrogen atom.

The bivalent cyclic group for $L^1$, $L^2$ and $L^3$ is preferably a 5-membered, 6-membered or 7-membered group, more preferably a 5-membered or 6-membered group, even more preferably a 6-membered group. The ring in the cyclic group may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring and a naphthalene ring. An example of the aliphatic ring is a cyclohexane ring. Examples of the hetero ring are a pyridine ring and a pyrimidine ring. Preferably, the cyclic group contains an aromatic ring and a hetero ring.

Of the bivalent cyclic group, the benzene ring-having cyclic group is preferably a 1,4-phenylene group. The naphthalene ring-having cyclic group is preferably a naphthalene-1,5-diyl group or a naphthalene-2,6-diyl group. The pyridine ring-having cyclic group is preferably a pyridine-2,5-diyl group. The pyrimidine ring-having cyclic group is preferably a pyrimidin-2,5-diyl group.

The bivalent cyclic group for $L^1$, $L^2$ and $L^3$ may have a substituent. Examples of the substituent are a halogen atom, a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms.

In the formula, $L^1$, $L^2$ and $L^3$ are preferably a single bond, *—O—CO—, *—CO—O—, *—CH=CH—, *-"bivalent cyclic group"-, *—O—CO-"bivalent cyclic group"-, *—CO—O-"bivalent cyclic group"-, *—CH=CH-"bivalent cyclic group"-, "bivalent cyclic group"-CO—O—, *-"bivalent cyclic group"-O—CO—, *-"bivalent cyclic group"-CO—O—, *-"bivalent cyclic group"-CH=CH—, or *-"bivalent cyclic group"-C≡C—. More preferably, they are a single bond, *—CH=CH—, *—CH=CH-"bivalent cyclic group"— or *—C≡C-"bivalent cyclic group"-, even more preferably a single bond. In the examples, "*" indicates the position at which the group bonds to the 6-membered ring of formula (DI) that contains $Y^{11}$, $Y^{12}$ and $Y^{13}$.

In formula (DI), $H^1$, $H^2$ and $H^3$ each independently represent the following formula (DI-A) or (DI-B):

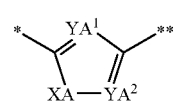
(DI-A)

In formula (DI-A), $YA^1$ and $YA^2$ each independently represent a methine group or a nitrogen atom. Preferably, at least one of $YA^1$ and $YA^2$ is a nitrogen atom, more preferably they are both nitrogen atoms. XA represents an oxygen atom, a sulfur atom, a methylene group or an imino group. XA is preferably an oxygen atom. * indicates the position at which the formula bonds to any of $L^1$ to $L^3$; and ** indicates the position at which the formula bonds to any of $R^1$ to $R^3$.

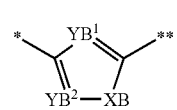
(DI-B)

In formula (DI-B), $YB^1$ and $YB^2$ each independently represent a methine group or a nitrogen atom. Preferably, at least one of $YB^1$ and $YB^2$ is a nitrogen atom, more preferably they are both nitrogen atoms. XB represents an oxygen atom, a sulfur atom, a methylene group or an imino group. XB is preferably an oxygen atom. * indicates the position at which the formula bonds to any of $L^1$ to $L^3$; and ** indicates the position at which the formula bonds to any of $R^1$ to $R^3$.

In the formula, $R^1$, $R^2$ and $R^3$ each independently represent the following formula (DI-R):

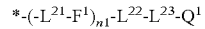
(DI-R)

In formula (DI-R), * indicates the position at which the formula bonds to $H^1$, $H^2$ or $H^3$ in formula (DI). $F^1$ represents a bivalent linking group having at least one cyclic structure. $L^{21}$ represents a single bond or a bivalent linking group. When $L^{21}$ is a bivalent linking group, it is preferably selected from a group consisting of —O—, —S—, —C(=O)—, —NR$^7$—, —CH=CH—, —C≡C—, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

In the formula, $L^{21}$ is preferably a single bond, —O—CO—, —CO—O—, —CH=CH— or —C≡C— (in which ** indicates the left side of $L^{21}$ in formula (DI-R)). More preferably it is a single bond.

In formula (DI-R), $F^1$ represents a bivalent cyclic linking group having at least one cyclic structure. The cyclic structure is preferably a 5-membered ring, a 6-membered ring, or a 7-membered ring, more preferably a 5-membered ring or a 6-membered ring, even more preferably a 6-membered ring. The cyclic structure may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring, a naphthalene ring, an anthracene ring, a phenanthrene ring. An example of the aliphatic ring is a cyclohexane ring. Examples of the hetero ring are a pyridine ring and a pyrimidine ring.

The benzene ring-having group for $F^1$ is preferably a 1,4-phenylene group or a 1,3-phenylene group. The naphthalene ring-having group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having group is preferably a 1,4-cyclohexylene group. The pyridine ring-having group is preferably a pyridine-2,5-diyl group. The pyrimidine ring-having group is preferably a pyrimidin-2,5-diyl group. More preferably, $F^1$ is a 1,4-phenylene group, a 1,3-phenylene group, a naphthalene-2,6-diyl group, or a 1,4-cyclohexylene group.

In the formula, $F^1$ may have a substituent. Examples of the substituent are a halogen atom (e.g., fluorine atom, chlorine atom, bromine atom, iodine atom), a cyano group, a nitro group, an alkyl group having from 1 to 16 carbon atoms, an alkenyl group having from 1 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent is preferably a halogen atom, a cyano group, an alkyl group having from 1 to 6 carbon atoms, a halogen atom-substituted alkyl group having from 1 to 6 carbon atoms, more preferably a halogen atom, an, alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

In the formula, n1 indicates an integer of from 0 to 4. n1 is preferably an integer of from 1 to 3, more preferably 1 or 2. When n1 is 0, then $L^{22}$ in formula (DI-R) directly bonds to any of $H^1$ to $H^3$. When n1 is 2 or more, then $(-L^{21}-F^1)$'s may be the same or different.

In the formula, $L^{22}$ represents —O—, —O—CO—, —CO—O—, —O—CO—O—, —S—, —NH—, —SO$_2$—, —CH$_2$—, —CH=CH— or —C≡C—, preferably —O—, —O—CO—, —CO—O—, —O—CO—O—, —CH$_2$—, —CH=CH— or more preferably —O—, —O—CO—, —CO—O—, —O—CO—O—, or —CH$_2$—.

When the above group has a hydrogen atom, then the hydrogen atom may be substituted with a substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

In the formula, $L^{23}$ represents a bivalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with any other substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms. The group substituted with the substituent improves the solubility of the compound of formula (DI) in solvent, and therefore the composition of the invention containing the compound can be readily prepared as a coating liquid.

In the formula, $L^{23}$ is preferably a linking group selected from a group consisting of —O—, —C(=O)—, —CH$_2$—, —CH=CH— and —C≡C—, and a group formed by linking two or more of these. $L^{23}$ preferably has from 1 to 20 carbon atoms, more preferably from 2 to 14 carbon atoms. Preferably, $L^{23}$ has from 1 to 16 (—CH$_2$—)'s, more preferably from 2 to 12 (—CH$_2$—)'s.

In the formula, $Q^1$ represents a polymerizing group or a hydrogen atom. In case where the compound of formula (DI) is used in producing optical films of which the retardation is required not to change by heat, such as optical compensatory films, $Q^1$ is preferably a polymerizing group. The polymerization for the group is preferably addition polymerization (including ring-cleavage polymerization) or polycondensation. In other words, the polymerizing group preferably has a functional group that enables addition polymerization or polycondensation. Examples of the polymerizing group are shown below.

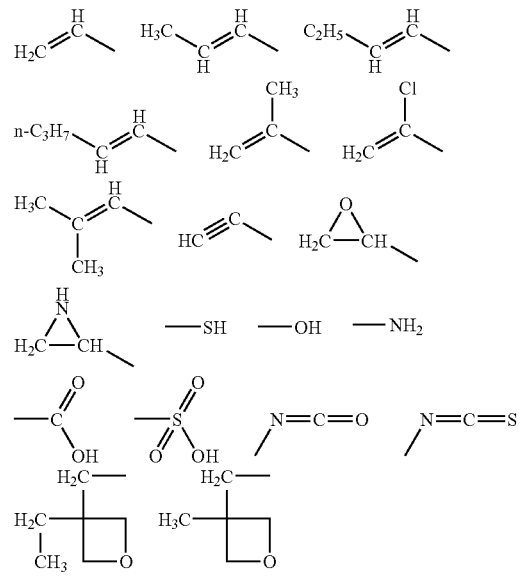

More preferably, the polymerizing group is addition-polymerizing functional group. The polymerizing group of the type is preferably a polymerizing ethylenic unsaturated group or a ring-cleavage polymerizing group.

Examples of the polymerizing ethylenic unsaturated group are the following (M-1) to (M-6):

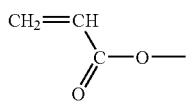
(M-1)

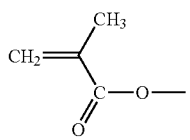
(M-2)

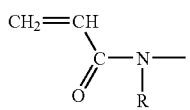
(M-3)

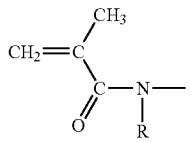
(M-4)

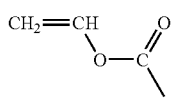
(M-5)

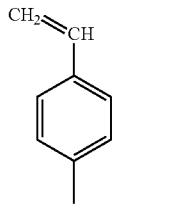
(M-6)

In formulae (M-3) and (M-4), R represents a hydrogen atom or an alkyl group. R is preferably a hydrogen atom or a methyl group. Of formulae (M-1) to (M-6), preferred are formulae (M-1) and (M-2), and more preferred is formula (M-1).

The ring-cleavage polymerizing group is preferably a cyclic ether group, more preferably an epoxy group or an oxetanyl group, most preferably an epoxy group.

A liquid-crystal compound of the following formula (DII) or a liquid-crystal compound of the following formula (DIII) is more preferred for the discotic liquid-crystal compound for use in the invention.

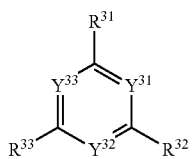
(DII)

In formula (DII), $Y^{31}$, $Y^{32}$ and $Y^{33}$ each independently represent a methine group or a nitrogen atom. $Y^{31}$, $Y^{32}$ and $Y^{33}$ have the same meaning as that of $Y^{11}$, $Y^{12}$ and $Y^{13}$ in formula (DI), and their preferred range is also the same as therein.

In the formula, $R^{31}$, $R^{32}$ and $R^{33}$ each independently represent the following formula (DII-R):

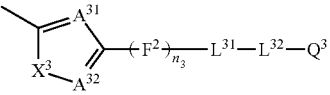
(DII-R)

In formula (DII-R), $A^{31}$ and $A^{32}$ each independently represent a methine group or a nitrogen atom. Preferably, at least one of $A^{31}$ and $A^{32}$ is a nitrogen atom; most preferably the two are both nitrogen atoms.

In the formula, $X^3$ represents an oxygen atom, a sulfur atom, a methylene group or an imino group. Preferably, $X^3$ is an oxygen atom.

In formula (DII-R), $F^2$ represents a bivalent cyclic linking group having a 6-membered cyclic structure. The 6-membered ring in $F^2$ may be a condensed ring. However, a monocyclic ring is preferred to a condensed ring for it. The 6-membered ring in $F^2$ may be any of an aromatic ring, an aliphatic ring, or a hetero ring. Examples of the aromatic ring are a benzene ring, a naphthalene ring, an anthracene ring and a phenanthrene ring. An example of the aliphatic ring is a cyclohexane ring. Examples of the hetero ring are a pyridine ring and a pyrimidine ring.

Of the bivalent cyclic ring, the benzene ring-having cyclic group is preferably a 1,4-phenylene group or a 1,3-phenylene group. The naphthalene ring-having cyclic group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having cyclic group is preferably a 1,4-cyclohexylene group. The pyridine ring-having cyclic group is preferably a pyridine-2,5-diyl group. The pyrimidine ring-having cyclic group is preferably a pyrimidin-2,5-diyl group. More preferably, the bivalent cyclic group is a 1,4-phenylene group, a 1,3-phenylene group, a naphthalene-2,6-diyl group, or a 1,4-cyclohexylene group.

In the formula, $F^2$ may have at lease one substituent. Examples of the substituent are a halogen atom (e.g., fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent of the bivalent cyclic group is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

In the formula, n3 indicates an integer of from 1 to 3. n3 is preferably 1 or 2. When n3 is 2 or more, then $F^2$'s may be the same or different.

In the formula, $L^{31}$ represents —O—, —O—CO—, —CO—O—, —O—CO—O—, —S—, —NH—, —SO$_2$—, —CH$_2$—, —CH=CH— or —C≡C—. When the above group has a hydrogen atom, then the hydrogen atom may be substituted with a substituent. The preferred range of $L^{31}$ may be the same as that of $L^{22}$ in formula (DI-R).

In the formula, $L^{32}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent. The preferred range of $L^{32}$ may be the same as that of $L^{23}$ in formula (DI-R).

In the formula, $Q^3$ represents a polymerizing group or a hydrogen atom, and its preferred range is the same as that of $Q^1$ in formula (DI-R).

Compounds of formula (DIII) will be described in detail.

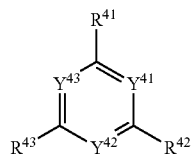

(DIII)

In formula (DIII), $Y^{41}$, $Y^{42}$ and $Y^{43}$ each independently represent a methine group or a nitrogen atom. When $Y^{41}$, $Y^{42}$ and $Y^{43}$ each are a methine group, the hydrogen atom of the methine group may be substituted with a substituent. Preferred examples of the substituent that the methine group may have are an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, more preferred are an alkyl group, an alkoxy group, an alkoxycarbonyl group, an acyloxy group, a halogen atom and a cyano group; even more preferred are an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^{41}$, $Y^{42}$ and $Y^{43}$ are all methine groups, more preferably non-substituted methine groups.

In the formula, $R^{41}$, $R^{42}$ and $R^{43}$ each independently represent the following formula (DIII-A), (DIII-B) or (DIII-C).

When retardation plates and the like having a small wavelength dispersion are produced, the compound in which $R^{41}$, $R^{42}$ and $R^{43}$ are represented by formula (DIII-A) or (DIII-C), more preferably formula (DIII-A), is preferably used.

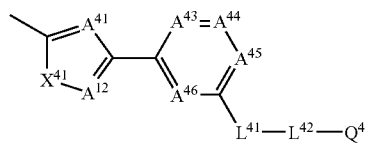

(DIII-A)

In formula (DIII-A), $A^{41}$, $A^{42}$, $A^{43}$, $A^{44}$, $A^{45}$ and $A^{46}$ each independently represent a methine group or a nitrogen atom. Preferably, at least one of $A^{41}$ and $A^{42}$ is a nitrogen atom; more preferably the two are both nitrogen atoms. Preferably, at least three of $A^{43}$, $A^{44}$, $A^{45}$ and $A^{46}$ are methine groups; more preferably, all of them are methine groups. When $A^{43}$, $A^{44}$, $A^{45}$ and $A^{46}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^{41}$ represents an oxygen atom, a sulfur atom, a methylene group or an imino group, but is preferably an oxygen atom.

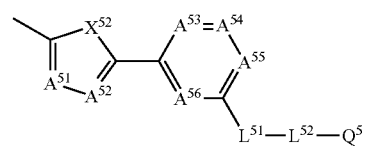

(DIII-B)

In formula (DIII-B), $A^{51}$, $A^{52}$, $A^{53}$, $A^{54}$, $A^{55}$ and $A^{56}$ each independently represent a methine group or a nitrogen atom. Preferably, at least one of $A^{51}$ and $A^{52}$ is a nitrogen atom; more preferably the two are both nitrogen atoms. Preferably, at least three of $A^{53}$, $A^{54}$, $A^{55}$ and $A^{56}$ are methine groups; more preferably, all of them are methine groups. When $A^{53}$, $A^{54}$, $A^{55}$ and $A^{56}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^{52}$ represents an oxygen atom, a sulfur atom, a methylene group or an imino group, but is preferably an oxygen atom.

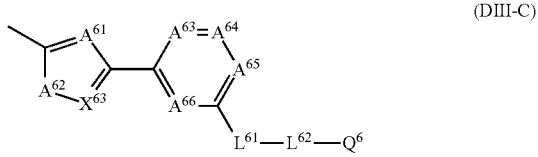

(DIII-C)

In formula (DIII-C), $A^{61}$, $A^{62}$, $A^{63}$, $A^{64}$, $A^{65}$ and $A^{66}$ each independently represent a methine group or a nitrogen atom. Preferably, at least one of $A^{61}$ and $A^{62}$ is a nitrogen atom; more preferably the two are both nitrogen atoms. Preferably, at least three of $A^{63}$, $A^{64}$, $A^{65}$ and $A^{66}$ are methine groups; more preferably, all of them are methine groups. When $A^{63}$, $A^{64}$, $A^{65}$ and $A^{66}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^{63}$ represents an oxygen atom, a sulfur atom, a methylene group or an imino group, but is preferably an oxygen atom.

$L^{41}$ in formula (DIII-A), $L^{51}$ in formula (DIII-B) and $L^{61}$ in formula (DIII-C) each independently represent —O—, —O—CO—, —CO—O—, —O—CO—O—, —S—, —NH—, —SO$_2$—, —CH$_2$—, —CH═CH— or —C≡C—; preferably —O—, —O—CO—, —CO—O—, —O—CO—O—, —CH$_2$—, —CH═CH— or —C≡C—; more preferably —O—, —O—CO—, —CO—O—, —O—CO—O— or —CH$_2$—. When above group has a hydrogen atom, then the hydrogen atom may be substituted with a substituent.

Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

$L^{42}$ in formula (DIII-A), $L^{52}$ in formula (DIII-B) and $L^{62}$ in formula (DIII-C) each independently represent a bivalent linking group selected from —O—, —S—, —C(═O)—, —NH—, —CH$_2$—, —CH═CH— and —C≡C—, and a group formed by linking two or more of these. The hydrogen atom in —NH—, —CH$_2$— and —CH═CH— may be substituted with a substituent. Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

Preferably, $L^{42}$, $L^{52}$ and $L^{62}$ each independently represent a bivalent linking group selected from —O—, —C(═O)—, —CH$_2$—, —CH═CH— and —C≡C—, and a group formed by linking two or more of these. Preferably, $L^{42}$, $L^{52}$ and $L^{62}$ each independently have from 1 to 20 carbon atoms, more preferably from 2 to 14 carbon atoms. Preferably, $L^{42}$, $L^{52}$ and $L^{62}$ each independently have from 1 to 16 (—CH$_2$—)'s, more preferably from 2 to 12 (—CH$_2$—)'s.

$Q^4$ in formula (DIII-A), $Q^5$ in formula (DIII-B) and $Q^6$ in formula (DIII-C) each independently represent a polymerizing group or a hydrogen atom. Their preferred ranges are the same as that of $Q^1$ in formula (DI-R).

Specific examples of the compounds of formulae (DI), (DII) and (DIII) include, but are not limited to, those shown below.

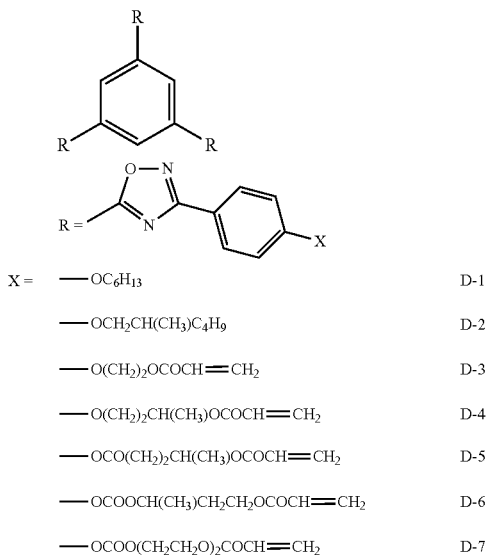

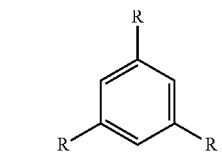

-continued

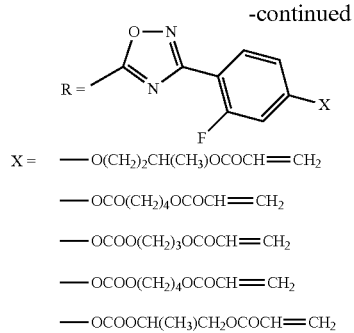

| X = | | |
|---|---|---|
| —O(CH$_2$)$_2$CH(CH$_3$)OCOCH=CH$_2$ | D-8 |
| —OCO(CH$_2$)$_4$OCOCH=CH$_2$ | D-9 |
| —OCOO(CH$_2$)$_3$OCOCH=CH$_2$ | D-10 |
| —OCOO(CH$_2$)$_4$OCOCH=CH$_2$ | D-11 |
| —OCOOCH(CH$_3$)CH$_2$OCOCH=CH$_2$ | D-12 |

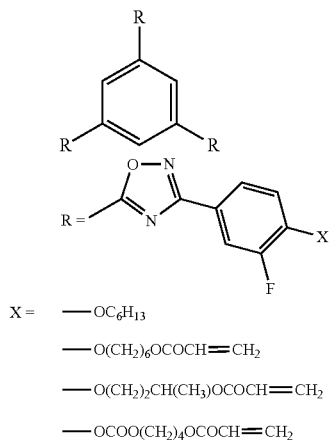

| X = | | |
|---|---|---|
| —OC$_6$H$_{13}$ | D-13 |
| —O(CH$_2$)$_6$OCOCH=CH$_2$ | D-14 |
| —O(CH$_2$)$_2$CH(CH$_3$)OCOCH=CH$_2$ | D-15 |
| —OCOO(CH$_2$)$_4$OCOCH=CH$_2$ | D-16 |

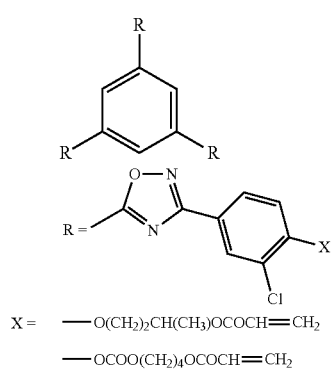

| X = | | |
|---|---|---|
| —O(CH$_2$)$_2$CH(CH$_3$)OCOCH=CH$_2$ | D-17 |
| —OCOO(CH$_2$)$_4$OCOCH=CH$_2$ | D-18 |

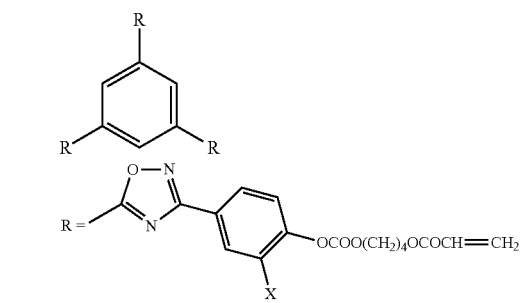

| X = | | |
|---|---|---|
| —Br | D-19 |
| —CH$_3$ | D-20 |
| —CF$_3$ | D-21 |

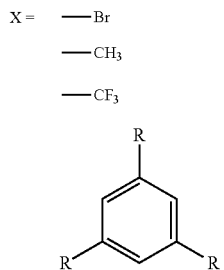

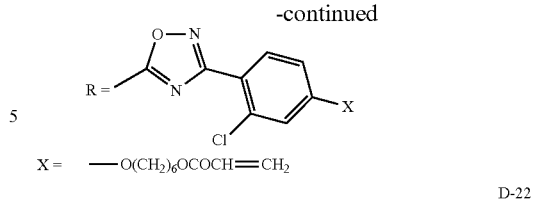

| X = | —O(CH$_2$)$_6$OCOCH=CH$_2$ | D-22 |
|---|---|---|

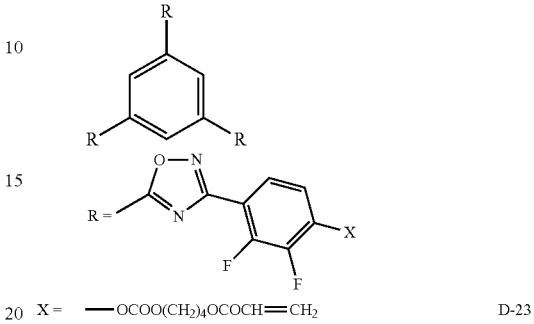

| X = | —OCOO(CH$_2$)$_4$OCOCH=CH$_2$ | D-23 |
|---|---|---|

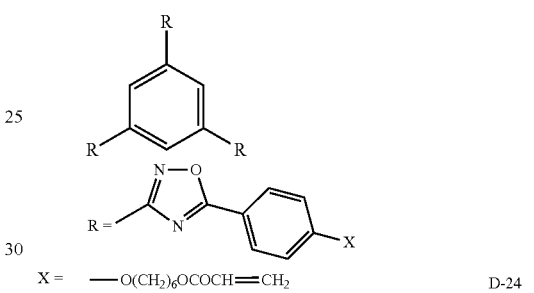

| X = | —O(CH$_2$)$_6$OCOCH=CH$_2$ | D-24 |
|---|---|---|

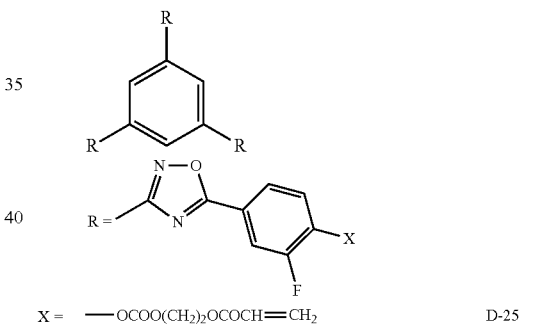

| X = | —OCOO(CH$_2$)$_2$OCOCH=CH$_2$ | D-25 |
|---|---|---|

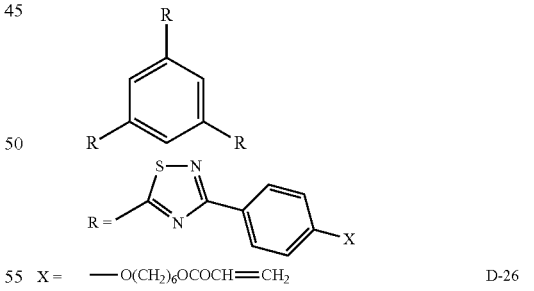

| X = | —O(CH$_2$)$_6$OCOCH=CH$_2$ | D-26 |
|---|---|---|

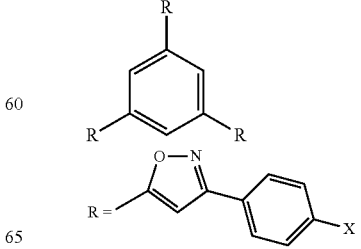

-continued
X= —OCO(CH₂)₃OCOCH=CH₂  D-27
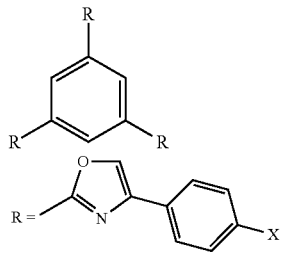
X= —O(CH₂)₆OCOCH=CH₂  D-28
—OCO(CH₂)₃OCOCH=CH₂  D-29
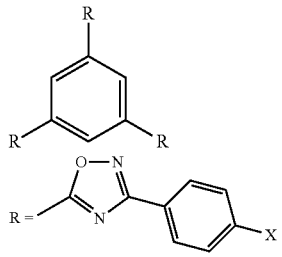
X= 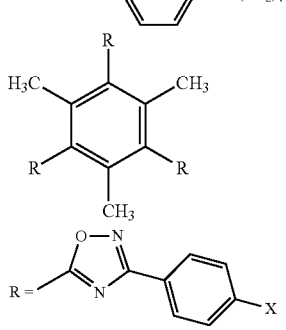  D-30
D-31
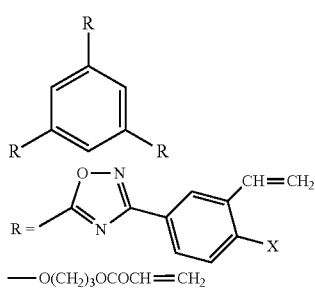
X= —O(CH₂)₂OCOCH=CH₂  D-32
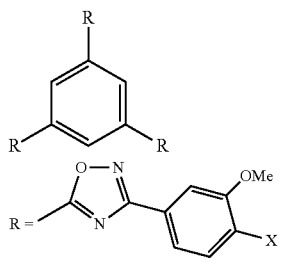
—O(CH₂)₃OCOCH=CH₂  D-33
-continued
—O(CH₂)₄OCOCH=CH₂  D-34
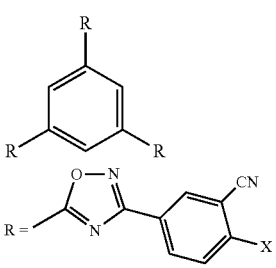
—O(CH₂)₄OCOCH=CH₂  D-35
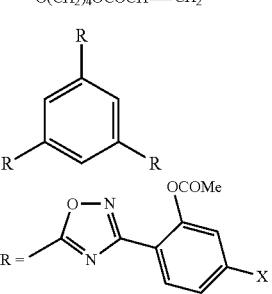
—O(CH₂)₃OCOCH=CH₂  D-36
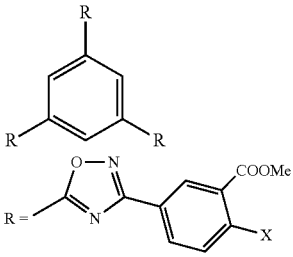
—O(CH₂)₄OCOCH=CH₂  D-37
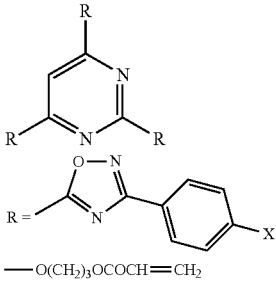
—O(CH₂)₃OCOCH=CH₂  D-38
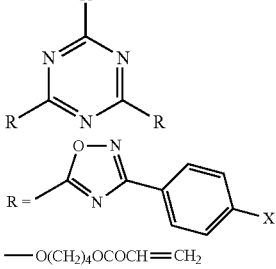
—O(CH₂)₄OCOCH=CH₂  D-39
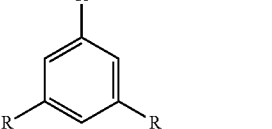

-continued

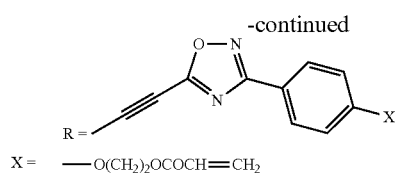

X = —O(CH₂)₂OCOCH=CH₂     D-40

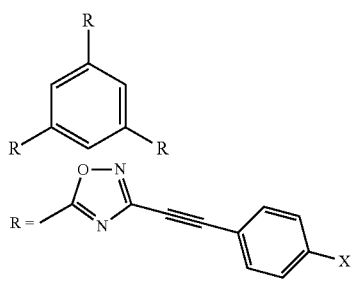

X = —O(CH₂)₂OCOCH=CH₂     D-41

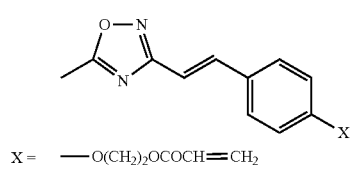

X = —O(CH₂)₂OCOCH=CH₂     D-42

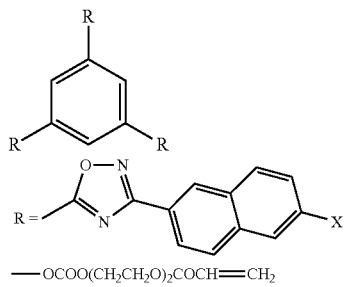

X = —OCOO(CH₂CH₂O)₂COCH=CH₂     D-43

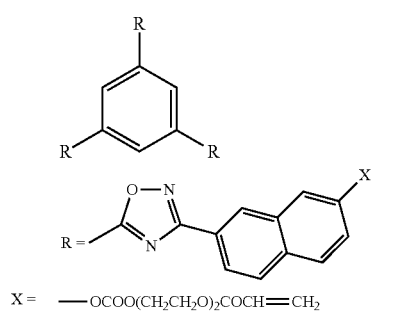

X = —OCOO(CH₂CH₂O)₂COCH=CH₂     D-44

Examples of the compound represented by formula (DIII) include, but are not limited to, those shown below.

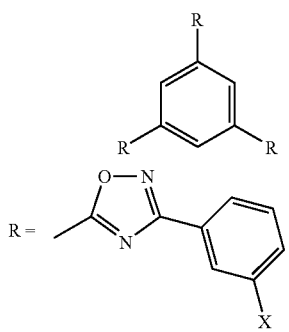

X = —OC₆H₁₃                          D3-1
—O(CH₂)₄OCOCH=CH₂                    D3-2
—O(CH₂)₄OCOC(CH₃)=CH₂                D3-3
—O(CH₂)₄—CH—CH₂ (epoxide)            D3-4
—OCO(CH₂)₄OCOCH=CH₂                  D3-5
—OCOO(CH₂)₅OCOCH=CH₂                 D3-6
—OCOO(CH₂)₆OCOCH=CH₂                 D3-7
—COOC₆H₁₃                            D3-8
—COO(CH₂)₂OCOCH=CH₂                  D3-9
—COO(CH₂)₃OCOCH=CH₂                  D3-10
—COO(CH₂)₄OCOCH=CH₂                  D3-11
—COO(CH₂)₅OCOCH=CH₂                  D3-12
—COO(CH₂)₆OCOCH=CH₂                  D3-13
—COO(CH₂)₇OCOCH=CH₂                  D3-14

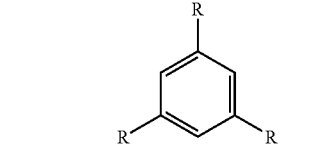

COO(CH₂)₃OCOCH=CH₂

X = —F          D3-15
—Br             D3-16
—CH₃            D3-17
—CF₃            D3-18
—COOCH₃         D3-19

The compounds of the formulae (DI), (DII) and (DII) for used in the invention may be produced according to any method.

According to the invention, as the liquid-crystal compound for used in the invention, only one kind of the compounds of the formulae (DI), (DII) and (DII), or two or more thereof may be used. One feature of the compound represented by the formula (DI), (DII) or (DII) resides in low-wavelength dependency of birefringence developed by the alignment thereof. Therefore, if its optical property is optimized for G light, of which wavelength is the middle of the visible-light wavelength range, its optical properties for R and B lights may be almost equally optimized; and, by using such a compound, it is possible to produce easily an optically anisotropic layer or the like having desired optical properties for any visible light. Although it may be difficult to align molecules of the compound represented by formula (DI), (DII) or (DII) in a hybrid alignment state with a low mean tilt angle (for example, equal to or lower than 40°), in the presence of the polymer mentioned above, the molecules may be aligned in a hybrid alignment state with a low mean tilt angle furthermore without any alignment defects (or with reduced alignment defects).

Further, at least one kind of discotic or rod-like liquid-crystal compounds having a different structure from the compounds of the formulae (DI), (DII) and (DII) may be used together with it. Using it in combination with a discotic liquid-crystal compound is preferable, and using it in combination with a liquid-crystal compound represented by the following formula (T) is more preferable. By using together with at least two kinds of discotic compounds, a tilt angle at the air surface can be reduced, and temperature dependency of the mean tilt angle is easy to be released.

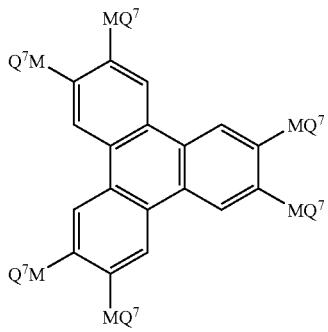

(T)

In the formula, M represents a bivalent linking group, which may be the same or different; $Q^7$ represents a polymerizable group or a hydrogen atom, which may be the same or different.

In the above formula, the bivalent linking group (M) is preferably an alkylene group, an alkenylene group, an arylene group, —CO—, —NH—, —O— and —S—, and a bivalent linking formed by linking two or more thereof. The bivalent linking group (M) is more preferably a bivalent linking group formed by linking at least two groups selected from an alkylene group, an alkenylene group, an arylene group, —CO—, —NH—, —O— and —S—. The bivalent linking group (M) is further preferably a bivalent linking group formed by linking of at least two groups selected from an alkylene group, an alkenylene group, an arylene group, —CO— and —O—. The number of the carbon atoms of the alkylene group is preferably 1 to 12, more preferably 2 to 12, and further more preferably 6 to 10. The alkylene group, the alkenylene group and the arylene group may have one or more substituents, for example, an alkyl group, a halogen atom, a cyano group, an alkoxy group and an acyloxy group. Specific examples of the bivalent linking group (M) are shown below. In the examples, left side bonds the triphenylene dicotic core (TD), and right side bonds the polymerizable group (Q). in the formula, AL means an alkylene group or an alkenylene group, and AR means an arylene group.

| | |
|---|---|
| -AL-CO—O-AL- | M1 |
| -AL-CO—O-AL-O— | M2 |
| -AL-CO—O-AL-O-AL- | M3 |
| -AL-CO—O-AL-O—CO— | M4 |
| —CO-AR-O-AL- | M5 |
| —CO-AR-O-AL-O— | M6 |
| —CO-AR-O-AL-O—CO— | M7 |
| —CO—NH-AL- | M8 |
| —NH-AL-O— | M9 |
| —NH-AL-O—CO— | M10 |
| —O-AL- | M11 |
| —O-AL-O— | M12 |
| —O-AL-O—CO— | M13 |
| —O-AL-O—CO—NH-AL- | M14 |
| —O-AL-S-AL- | M15 |
| —O—CO-AL-AR-O-AL-O—CO— | M16 |
| —O—CO-AR-O-AL-CO— | M17 |
| —O—CO-AR-O-AL-O—CO | M18 |
| —O—CO-AR-O-AL-O-AL-O—C | M19 |
| —O—CO-AR-O-AL-O-AL-O-AL-O—CO— | M20 |
| —S-AL- | M21 |
| —S-AL-O— | M22 |
| —S-AL-O—CO— | M23 |
| —S-AL-S-AL- | M24 |
| —S-AR-AL- | M25 |

$Q^7$ represents a polymerizable group or a hydrogen atom, the preferable range thereof is the same as $Q^1$ in formula (DI-R).

Specific examples of the compounds of formula (T) include, but are not limited to, those shown below.

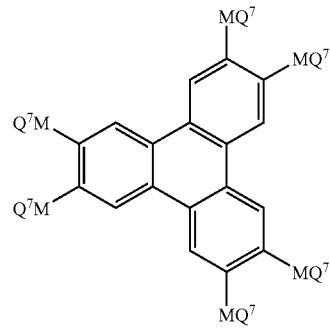

| | | |
|---|---|---|
| $MQ^7$ = | —$OC_6H_{13}$ | T-1 |
| | —$OCH_2CH(CH_3)C_4H_9$ | T-2 |
| | —$O(CH_2)_2OCOCH=CH_2$ | T-3 |
| | —$O(CH_2)_2CH(CH_3)OCOCH=CH_2$ | T-4 |
| | —$OCO(CH_2)_4OCOCH=CH_2$ | T-5 |
| | —$OCOOCH(CH_3)CH_2CH_2OCOCH=CH_2$ | T-6 |
| | —$OCOO(CH_2CH_2O)_2COCH=CH_2$ | T-7 |

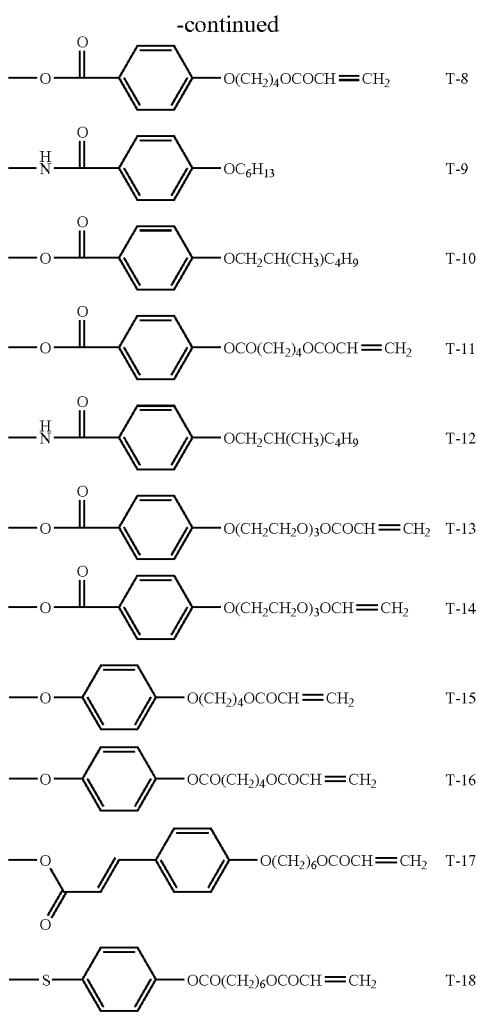

The compounds of the formula (T) for used in the invention may be produced according to any method.

The compound of the formula (T) is preferably added in the range of 1 to 20% by mass relative to the compound of the formula (DI), (DII) or (DIII), more preferably in the range of 3 to 20% by mass, and further more preferably in the range of 5 to 15% by mass.

Columnar phase and discotic nematic phase ($N_D$ phase) can be exemplified as the liquid crystal phase developed by the liquid crystalline compound used for preparing the optically anisotropic layer. Of these liquid crystal phases, the discotic nematic phase ($N_D$ phase) showing a desirable monodomain property is most preferable.

The liquid crystalline compound used for preparing the optically anisotropic layer preferably exhibits the liquid crystal phase within the range from 20° C. to 300° C., the range being more preferably from 40° C. to 280° C., and most preferably from 60° C. to 250° C. It is to be understood that examples of the liquid crystal phase developed at 20° C. to 300° C. also include any liquid crystal phases having the liquid-crystallinity temperature range which lies over 20° C. (for example, the range between 10° C. and 22° C.), and lies over 300° C. (for example, the range between 298° C. and 310° C.). The same is applicable to the ranges from 40° C. to 280° C. and from 60° C. to 250° C.

The composition of the invention is useful for producing optically anisotropic films. Upon producing an optically anisotropic film, the composition of the invention is preferably prepared as a curable composition. An additive, a curing method and the like upon preparing the curable composition will be described with reference to a production process of a retardation plate as an example.

[Retardation Plate]

The retardation plate of the invention comprises an optically anisotropic layer formed of the composition of the invention. In one embodiment, the retardation plate of the invention comprises a support, an alignment film formed on the support, and an optically anisotropic layer formed of the composition in which molecules are fixed in an alignment state predetermined by the alignment film.

The optical anisotropic layer (which may be referred to as a first optically anisotropic layer), the alignment film and the support (which may be referred to as a second optically anisotropic layer) will be described in detail below.

(1) Optically Anisotropic Layer (First Optically Anisotropic Layer)

The optically anisotropic layer is formed of a composition containing a liquid crystal compound and a polymer comprising a constitutional unit represented by formula (A) and a constitutional unit derived from a monomer having a fluoroaliphatic group. The composition is preferably a curable composition, and for example preferably contains a polymerization initiator. The composition may further contain various kinds of additives depending on necessity. The composition is preferably prepared as a coating composition, and the coating composition may be coated on a surface of an alignment film formed on a support, followed by aligning and fixing molecules of the liquid crystal compound, to form the optically anisotropic layer. The support may be removed after aligning and fixing them.

(1)-a Method of Layer Formation:

The optically-anisotropic layer may be formed by applying a coating liquid, which is prepared by dissolving a liquid-crystal compound and a polymer comprising the unit represented by formula (A) and the unit derived from a monomer having a fluoroaliphatic group(s) in a solvent capable of dissolving them, onto an alignment film formed on a support and aligned thereon. If possible, the layer may also be formed in a mode of vapor deposition, but is preferably formed according to such a coating method. The coating method may be any known method of curtain-coating, dipping, spin-coating, printing, spraying, slot-coating, roll-coating, slide-coating, blade-coating, gravure-coating or wire bar-coating. Next, the coating layer is dried at 25° C. to 130° C. to remove the solvent, whereupon the molecules of the liquid-crystal compound therein are aligned and fixed by irradiation with UV rays, and the intended optically-anisotropic layer is thus formed. UV rays are preferably used for irradiation with light for polymerization. The irradiation energy is preferably from 20 mJ/cm$^2$ to 50 J/cm$^2$, more preferably from 100 mJ/cm$^2$ to 800 mJ/cm$^2$. For promoting the optical polymerization, the light irradiation may be attained under heat. Thus formed, the thickness of the optically-anisotropic layer may vary, depending on the optimum retardation value in accordance with the use of the layer for optical compensation or the like, but is preferably from 0.1 to 10 μm, more preferably from 0.5 to 5 μm.

Preferably, molecules of the liquid-crystal compound are substantially uniformly aligned in the optically-anisotropic layer; more preferably, the molecules are fixed while substantially uniformly aligned therein; most preferably, the liquid-crystal compound is fixed through polymerization.

The ratio of the compound of formula (DI) or a polymer made of the compound of formula (DI) in the optically-anisotropic layer is preferably from 10 to 100% by mass, more preferably from 30 to 99% by mass, and even more preferably from 50 to 99% by mass.

(1)-b Other Materials for Use in Preparation of Optically-Anisotropic Layer:

Preferably, the liquid-crystal compound is fixed while kept aligned in the optically-anisotropic layer, in which it is desirable that the fixation of the liquid-crystal compound is attained through polymerization of the polymerizing group introduced into the compound. For this, the coating liquid for the layer preferably contains a polymerization initiator. Polymerization includes thermal polymerization with a thermal polymerization initiator, photopolymerization with a photopolymerization initiator, and EB curing with electronic beams. Of those, preferred are photopolymerization (photo-curing) and EB curing. Preferred examples of the polymerization initiator that generates a radical by the action of light given thereto are α-carbonyl compounds (as in U.S. Pat. Nos. 2,367,661, 2,367,670), acyloin ethers (as in U.S. Pat. No. 2,448,828,) α-hydrocarbon-substituted aromatic acyloin compounds (as in U.S. Pat. No. 2,722,512), polycyclic quinone compounds (as in U.S. Pat. Nos. 3,046,127, 2,951, 758), combination of triarylimidazole dimer and p-aminophenyl ketone (as in U.S. Pat. No. 3,549,367), acridine and phenazine compounds (as in JP-A 60-105667, U.S. Pat. No. 4,239,850) and oxadiazole compounds (as in U.S. Pat. No. 4,212,970), acetophenone compounds, benzoin ether compounds, benzyl compounds, benzophenone compounds, thioxanthone compounds. Examples of the acetophenone compound include, for example, 2,2-diethoxyacetophenone, 2-hydroxymethyl-1-phenylpropan-1-one, 4'-isopropyl-2-hydroxy-2-methyl-propiophenone, 2-hydroxy-2-methyl-propiophenone, p-dimethylaminoacetone, p-tert-butyldichloroacetophenone, p-tert-butyltrichloroacetopheone, p-azidobenzalacetophenone. Examples of the benzyl compound include, for example, benzyl, benzyl dimethyl ketal, benzyl β-methoxyethyl acetal, 1-hydroxycyclohexyl phenyl ketone. The benzoin ether compounds include, for example, benzoin, benzoin methyl ether, benzoin ethyl ether, benzoin n-propyl ether, benzoin isopropyl ether, benzoin n-butyl ether, and benzoin isobutyl ether. Examples of the benzophenone compound include benzophenone, methyl o-benzoylbenzoate, Michler's ketone, 4,4'-bisdiethylaminobenzophenone, 4,4'-dichlorobenzophenone. Examples of the thioxanthone compound include thioxanthone, 2-methylthioxanthone, 2-ethylthioxanthone, 2-isopropylthioxanthone, 4-isopropylthioxanthone, 2-chlorothioxanthone, and 2,4-diethylthioxanthone. Of those aromatic ketones serving as a light-sensitive radical polymerization initiator, more preferred are acetophenone compounds and benzyl compounds in point of their curing capability, storage stability and odorlessness. One or more such aromatic ketones may be used herein as a light-sensitive radical polymerization initiator, either singly or as combined depending on the desired performance of the initiator.

For the purpose of increasing the sensitivity thereof, a sensitizer may be added to the polymerization initiator. Examples of the sensitizer are n-butylamine, triethylamine, tri-n-butyl phosphine, and thioxanthone.

Plural types of the photopolymerization initiators may be combined and used herein, and the amount thereof is preferably from 0.01 to 20% by mass of the solid content of the coating liquid, more preferably from 0.5 to 5% by mass. For light irradiation for polymerization of the liquid-crystal compound, preferably used are UV rays.

The solvent to be used in preparing the coating liquid for the optically-anisotropic layer is preferably an organic solvent. Examples of the organic solvent are amides (e.g., N,N-dimethylformamide), sulfoxides (e.g., dimethylsulfoxide), heterocyclic compounds (e.g., pyridine), hydrocarbons (e.g., toluene, hexane), alkyl halides (e.g., chloroform, dichloromethane), esters (e.g., methyl acetate, butyl acetate), ketones (e.g., acetone, 2-butanone, methyl isobutyl ketone, cyclohexanone), ethers (e.g., tetrahydrofuran, 1,2-dimethoxyethane). Of those, preferred are alkyl halides and ketones. Two or more different types of organic solvents may be combined for use herein.

The solid concentration of the liquid-crystal compound and other additives in the composition of the invention is preferably from 0.1% by mass to 60% by mass, more preferably from 0.5% by mass to 50% by mass, even more preferably 2% by mass to 40% by mass.

(1)-c Alignment State:

When used in a OCB (Optically Compensatory Bend) liquid-crystal mode as a retardation plate, the optically-anisotropic layer formed with the composition of the invention is preferably such that its discotic nematic phase is in a hybrid alignment state. The term "Hybrid alignment" as referred to herein means that the a tilt angle of a liquid-crystal molecule (regarding discotic liquid crystal molecule, a tilt angle of a discotic plane of the molecule relative to the layer plane) in the layer continuously varies in the direction of the thickness of the film.

When applied onto a support (more preferably onto an alignment film), a liquid-crystal compound may express its liquid-crystal phase, for example, after heated thereon. Accordingly, in the interface adjacent to the support, the liquid-crystal compound may be aligned at a tilt angle to the support surface or to the coating film interface (when an alignment film is provided, this is the alignment film interface) (for example, when a discotic liquid-crystal compound is used, the tilt angle is an angle formed by the direction of the support surface and the direction of the disc face of the liquid-crystal compound), and in interface adjacent to air, the compound may be aligned at a tilt angle to the air interface.

In the invention, the mean tilt angle of the optically-anisotropic layer (for example, the angle formed by the direction of the support surface and the direction of the disc face of the discotic liquid-crystal compound) is preferably from 10 to 40°, more preferably from 15 to 35°.

(2) Alignment Film

An alignment film may be used upon producing the retardation plate of the invention. The alignment film may be formed, for example, through rubbing treatment of a compound (preferably polymer), oblique vapor deposition of an inorganic compound, formation of a microgrooved layer, or accumulation of an organic compound (e.g., ω-tricosanoic acid, dioctadecylmethylammonium chloride, methyl stearate) according to a Langmuir-Blodgett's method (LB film). Further, there are known other alignment films that may have an alignment function through impartation of an electric field or magnetic field thereto or through light irradiation thereto.

In principle, the polymer to be used for the alignment film has a molecular structure that has the function of aligning liquid-crystal molecules. Preferably, the polymer for use in the invention has crosslinking functional group (e.g., double bond)-having side chains bonded to the backbone chain thereof or has a crosslinking functional group having the function of aligning liquid-crystal molecules introduced into the side chains thereof, in addition to having the function of aligning liquid-crystal molecules. The polymer to be used for the alignment film may be a polymer that is crosslinkable by itself or a polymer that is crosslinkable with a crosslinking agent, or may also be a combination of the two.

Examples of the polymer are methacrylate polymers, styrene polymers, polyolefins, polyvinyl alcohols and modified polyvinyl alcohols, poly(N-methylolacrylamides), polyesters, polyimides, vinyl acetate polymers, carboxymethyl cellulose and polycarbonates, as in JPA No. hei 8-338913, [0022]. A silane coupling agent is also usable as the polymer. Preferably, the polymer is a water-soluble polymer (e.g., poly(N-methylolacrylamide), carboxymethyl cellulose, gelatin, polyvinyl alcohol, modified polyvinyl alcohol), more preferably gelatin, polyvinyl alcohol or modified polyvinyl alcohol, even more preferably polyvinyl alcohol or modified polyvinyl alcohol. Especially preferably, two different types of polyvinyl alcohols or modified polyvinyl alcohols having a different degree of polymerization are combined for use as the polymer.

Preferably, the degree of saponification of polyvinyl alcohol for use herein is from 70 to 100%, more preferably from 80 to 100%. Also preferably, the degree of polymerization of polyvinyl alcohol is from 100 to 5000.

The side chains having the function capable of aligning liquid-crystal molecules generally have a hydrophobic group as the functional group. Concretely, the type of the functional group may be determined depending on the type of the liquid-crystal molecules to be aligned and on the necessary alignment state of the molecules.

For example, the modified group of modified polyvinyl alcohol may be introduced into the polymer through copolymerization modification, chain transfer modification or block polymerization modification. Examples of the modified group include a hydrophilic group (e.g., carboxylic acid group, sulfonic acid group, phosphonic acid group, amino group, ammonium group, amido group, thiol group), a hydrocarbon group having from 10 to 100 carbon atoms, a fluorine atom-substituted hydrocarbon group, a thioether group, a polymerizing group (e.g., unsaturated polymerizing group, epoxy group, aziridinyl group), and an alkoxysilyl group (e.g., trialkoxy group, dialkoxy group, monoalkoxy group). Specific examples of such modified polyvinyl alcohol compounds are described, for example, in JPA No. 2000-155216, [0022] to [0145], and in JPA No. 2002-62426, [0018] to [0022].

When crosslinking functional group-having side chains are bonded to the backbone chain of an alignment film polymer, or when a crosslinking functional group is introduced into the side chains of a polymer having the function of aligning liquid-crystal molecules, then the polymer of the alignment film may be copolymerized with the polyfunctional monomer in an optically-anisotropic layer. As a result, not only between the polyfunctional monomers but also between the alignment film polymers, and even between the polyfunctional monomer and the alignment film polymer, they may be firmly bonded to each other in a mode of covalent bonding to each other. Accordingly, introducing such a crosslinking functional group into an alignment film polymer significantly improves the mechanical strength of the resulting retardation plate.

Preferably, the crosslinking functional group of the alignment film polymer contains a polymerizing group, like the polyfunctional monomer. Concretely, for example, those described in JPA No. 2000-155216, [0080] to [0100] are referred to herein.

Apart from the above-mentioned crosslinking functional group, the alignment film polymer may also be crosslinked with a crosslinking agent.

The crosslinking agent includes, for example, aldehydes, N-methylol compounds, dioxane derivatives, compounds capable of being active through activation of the carboxyl group thereof, active vinyl compounds, active halide compound, isoxazoles and dialdehyde starches. Two or more different types of crosslinking agents may be combined for use herein. Concretely, for example, the compounds described in JPA No. 2002-62426, [0023] to [0024] are employable herein. Preferred are aldehydes of high reactivity, and more preferred is glutaraldehyde.

Preferably, the amount of the crosslinking agent to be added to polymer is from 0.1 to 20% by mass of the polymer, more preferably from 0.5 to 15% by mass. Also preferably, the amount of the unreacted crosslinking agent that may remain in the alignment film is at most 1.0% by mass, more preferably at most 0.5% by mass. When the crosslinking agent in the alignment film is controlled to that effect, then the film ensures good durability with no reticulation even though it is used in liquid-crystal display devices for a long period of time and even though it is left in a high-temperature high-humidity atmosphere for a long period of time.

Basically, the alignment film may be formed by applying the alignment film-forming material of the above-mentioned polymer to a crosslinking agent-containing transparent support, then heating and drying it for crosslinking it and then optionally rubbing the thus-formed film. The crosslinking reaction may be effected in any stage after the film-forming material has been applied onto the transparent support, as so mentioned hereinabove. When a water-soluble polymer such as polyvinyl alcohol is used as the alignment film-forming material, then it is desirable that the solvent for the coating liquid is a mixed solvent of a defoaming organic solvent (e.g., methanol) and water. The ratio by mass of water/methanol is preferably (more than 0 to 99)/(100 to less than 1), more preferably (more than 0 to 91)/(less than 100 to 9). The mixed solvent of the type is effective for preventing the formation of bubbles in the coating liquid and, as a result, the surface defects of the alignment film and even the optically-anisotropic layer are significantly reduced.

For forming the alignment film, preferably employed is a spin-coating method, a dip-coating method, a curtain-coating method, an extrusion-coating method, a rod-coating method or a roll-coating method. Especially preferred is a rod-coating method. Also preferably, the thickness of the film is from 0.1 to 10 μm, after dried. The drying under heat may be effected, for example, at 20 to 110° C. For sufficient crosslinking, the heating temperature is preferably from 60 to 100° C., more preferably from 80 to 100° C. The drying time may be from 1 minute to 36 hours, but preferably from 1 to 30 minutes. The pH of the coating liquid is preferably so defined that it is the best for the crosslinking agent used. For example, when glutaraldehyde is used, the pH of the coating liquid is preferably from 4.5 to 5.5, more preferably pH 5.

The alignment film is provided on a support or on an undercoat layer. The alignment film may be formed by crosslinking the polymer layer as above, and then rubbing the surface of the layer.

A rubbing method having been widely employed as an orientation method of a liquid crystal of a liquid crystal display device may be used. Specifically, the surface of the film is rubbed in one direction with paper, gauze, felt, rubber or nylon or polyester fibers to attain orientation. In general, the film is rubbed several times with a cloth having fibers having uniform length and thickness implanted uniformly. A rubbing roll having a circularity, a cylindricity and a deflection (eccentricity) that are all 30 μm or less is preferably used. The wrap angle of the film on the rubbing roll is preferably from 0.1 to 90°. However, for example, the film may be wrapped at an angle of 360° or more to attain the rubbing treatment stably, as shown in JPA No. hei 8-160430. In the case where a film in a long strip form is rubbed, the film is preferably conveyed with a conveying device at a speed of from 1 to 100 m/min under a constant tension. The rubbing roll is preferably rotatable in a horizontal direction with respect to the film conveying direction for setting an arbitrary rubbing angle. The rubbing angle is preferably selected from a range of from 0 to 60°, and in the case where the film is used in a liquid crystal display device, the rubbing angle is preferably from 40 to 50°, and more preferably 45°.

After the liquid-crystal compound is aligned on the alignment film, if desired, the alignment film polymer and the polyfunctional monomer in the optically-anisotropic layer may be reacted, or the alignment film polymer may be crosslinked with a crosslinking agent. Preferably, the thickness of the alignment film is from 0.1 to 10 μm. A coating liquid prepared by dissolving the above-mentioned alignment film polymer in a solvent is applied onto the surface of a support, and then the solvent in the coating liquid is removed and dried at 25° C. to 140° C. to thereby form the intended alignment film. If possible, the film may also be formed in a mode of vapor deposition, but is preferably formed according to a coating process. The thickness of the alignment film thus formed is preferably from 0.01 to 5 μm, more preferably from 0.05 to 2 μm.

The solvent for use in preparing the alignment film-forming coating liquid includes, for example, water, alcohols (e.g., methanol, ethanol, isopropanol), amides (e.g., N,N-dimethylformamide), acetonitrile, acetone, methyl ethyl ketone, methyl isobutyl ketone, ethyl acetate; preferably water, alcohols and their mixed solvents. The concentration of the alignment film polymer in the coating liquid is preferably from 0.1% by mass to 40% by mass, more preferably from 0.5% by mass to 20% by mass, even more preferably from 2% by mass to 10% by mass. The viscosity of the coating liquid is preferably from 0.1 cp to 100 cp, more preferably from 0.5 cp to 50 cp.

The coating liquid may contain any other additives in addition to the above-mentioned alignment film polymer therein. For example, when the alignment film polymer is hardly soluble in a water-soluble solvent, then a basic compound (e.g., sodium hydroxide, lithium hydroxide, triethylamine) or an acid compound (e.g., hydrochloric acid, acetic acid, succinic acid) may be added thereto to promote its dissolution in the solvent.

The alignment film formed according to the above method is preferably rubbed on its surface thereby having a property of aligning liquid-crystal molecules. The rubbing treatment may be attained by rubbing the surface of the polymer-coated surface a few times with paper or cloth in one direction (generally in the machine direction). Apart from such rubbing treatment, the alignment film may also be processed for impartation of an electric field of a magnetic field thereto, thereby having a property of aligning liquid-crystal molecules. For making the alignment film have the property of aligning liquid-crystal molecules, preferred is the method of rubbing the alignment film in which the thus-rubbed polymer may have the intended property.

(3) Support (Second Optically Anisotropic Layer)

The optical compensation film of the invention preferably comprises a second optically anisotropic layer exhibiting optical anisotropy in addition to the first optically anisotropic layer.

The second optically anisotropic layer functions as a support for the first optically anisotropic layer and has a function of broadening the controllable range of the optical characteristics of the optical compensation film to improve the display characteristics of the liquid display device. In other words, the second optical anisotropic layer of the invention can be understood as the aforementioned support that has optical anisotropy.

The second optically anisotropic layer of the invention contains at least one sheet of a polymer film. The expression "the layer contains a polymer film" herein means not only that the layer is constituted only by the polymer, but also that the layer may further contain other substances in a range that does not impair the advantages of the invention. That is, the film mainly contains the polymer.

Specifically, the second optically anisotropic layer preferably has an Rth value of from 100 to 300 nm measured with light having a wavelength of 550 nm, and more preferably from 150 to 200 nm. The second optically anisotropic layer preferably has an Re value of from 30 to 60 nm, and more preferably from 35 to 50 nm. In the case where the Rth and Re values thereof are in the ranges, respectively, the display characteristics, such as the viewing angle characteristics, of the liquid display device can be advantageously improved.

The second optically anisotropic layer may be constituted by only one sheet of the polymer film or by two or more sheets of the polymer films. The Re and Rth values in the aforementioned ranges can be attained with only one sheet of the polymer film, and therefore, the second optically anisotropic layer is preferably constituted by one sheet of the polymer film.

The polymer to be employed in production of the second optically anisotropic layer is preferably selected from cellulose based polymers, more preferably from cellulose esters, and even more preferably from cellulose acylates. Using cellulose acylate is advantageous in terms of controlling optical properties.

Preferred are lower fatty acid esters of cellulose. The term "lower fatty acid" herein means fatty acid having 6 or smaller number of carbon atoms. The number of carbon atoms is preferably 2 (cellulose acetate), 3 (cellulose propionate) or 4 (cellulose butyrate). Cellulose acetate is particularly preferable. Also mixed aliphatic acid ester such as cellulose acetate propionate and cellulose acetate butyrate may be used.

Viscosity-average degree of polymerization (DP) of cellulose acetate (also referred to as acetyl cellulose) is preferably 250 or larger, and more preferably 290 or larger. The cellulose ester (cellulose acetate) used in the present invention may preferably have a narrow range of distribution in terms of Mw/Mn (Mw represents mass-average molecular weight, and Mn represents number-average molecular weight) measured by gel permeation chromatography. More specifically, Mw/Mn preferably falls in the range from 1.00 to 1.70, more preferably from 1.30 to 1.65, and still more preferably from 1.40 to 1.60.

The degree of acetylation of cellulose acetate is preferably 55.0 to 62.5%, and more preferably 59.0 to 61.5%. The degree of acetylation herein means an amount of attached acetic acid moiety per unit mass of cellulose. The degree of acetylation may be decided according to measurement and calculation specified by ASTM D-817-91 (method of testing cellulose acetate and so forth).

In general, hydroxyl groups at the 2-, 3- and 6-positions are not equally shared for ⅓ each of the total degree of distribution, wherein hydroxyl group at the 6-position tends to be less substituted. In the present invention, it is more preferable that the degree of substitution of hydroxyl groups at the 6-position is larger than that at the 2- and 3-positions. The degree of substitution by the acetyl groups at the 6-position is preferably from 30% to 40%, more preferably from 31% to 40%, and even more preferably from 32 to 40% with respect to the total degree of substitution. And the degree of substitution by the acetyl groups at the 6-position of cellulose acetate is preferably 0.88 or more.

Cellulose acylates and producing methods thereof which can be employed in the invention are described in detail in Hatsumei Kyokai Disclosure Bulletin 2001-1745, pp. 9, published by Japan Institute of Invention and Innovation, Mar. 15, 2001.

One exemplary method for controlling retardation of a cellulose acetate film is applying an external force to the film, in particular, stretching the film. A retardation enhancer may be added to a cellulose acylate film for controlling retardation thereof. The retardation enhancer is preferably selected from aromatic compounds having two or more aromatic rings therein. The amount of the aromatic compound in the film is preferably from 0.01 to 20% by mass with respect to the amount of the polymer. Plural types of aromatic compounds may be used. Examples of the aromatic ring in the aromatic compound include not only aromatic hydrocarbon rings but also aromatic hetero rings.

The second optically anisotropic film is preferably a cellulose acetate film. The cellulose acetate film preferably has a hygroscopic expansion coefficient of $30 \times 10^{-5}$/% RH or less, more preferably $15 \times 10^{-5}$% RH or less, and further preferably $10 \times 10^{-5}$/% RH or less.

The hygroscopic expansion coefficient is preferably as small as possible, but is generally a value of $1.0 \times 10^{-5}$/% RH or more. The hygroscopic expansion coefficient referred herein means the variation of the length of the specimen where the relative humidity is changed under a constant temperature. By controlling the hygroscopic expansion coefficient, increase in transmittance in a frame form (light leakage due to distortion) of the optical compensation film can be prevented from occurring with the optical compensation function thereof maintained.

The hygroscopic expansion coefficient can be measured in the following manner. A specimen having a width of 5 mm and a length of 20 mm cut out from the polymer film is fixed at one end thereof and suspended in an atmosphere of 25° C. and 20% RH ($R_0$). A weight of 0.5 g is attached to the other end of the specimen, which is then allowed to stand for 10 minutes, and the length ($L_0$) of the specimen is measured. The humidity is increased to 80% RH ($R_1$) with a temperature of 25° C. maintained, and then the length ($L_1$) of the specimen is measured. The hygroscopic expansion coefficient is calculated by the following expression. The measurement is carried out for 10 specimens for one kind of the polymer film, and the average value is designated as the measured value.

$$\text{(hygroscopic expansion coefficient (\% } RH\text{))} = ((L_1 - L_0 / L_0)/(R_1 - R_0)$$

For decreasing the dimensional change due to moisture absorption of a cellulose acetate film, a hydrophobic compound is preferably added to the cellulose acetate film. The hydrophobic compound may be in the form of fine particles. The hydrophobic compound is preferably selected from a plasticizer and a deterioration preventing agent. The hydrophobic compound preferably has a hydrocarbon group (an aliphatic group or an aromatic group) as the hydrophobic group.

The addition amount of the hydrophobic group is preferably from 0.01 to 10% by mass based on the polymer solution (dope) prepared.

For decreasing the dimensional change due to moisture absorption of the polymer film, it is also possible to decrease the free volume in the polymer film. For example, the free volume is decreased by decreasing the remaining solvent amount in the solvent cast method described later. The polymer film is preferably dried under conditions that provide a remaining solvent amount of from 0.01 to 1.00% by mass based on the polymer film.

Examples of the additives for the polymer film include an ultraviolet ray preventing agent, a releasing agent, an antistatic agent, a deterioration preventing agent (such as an antioxidant, a peroxide decomposing agent, a radical inhibitor, a metal inactivating agent, an oxygen scavenger and an amine) and an infrared ray absorbent.

Regarding multi-layered polymer films, the type(s) and amount(s) of the additive(s) in each layer may be same with or different from those in other layer.

Additives which can be employed in the invention are described in detail in Hatsumei Kyokai Disclosure Bulletin 2001-1745, pp. 16-22, published by Japan Institute of Invention and Innovation, Mar. 15, 2001. The mount of an additive in the film is generally from 0.001 to 25% by mass.

The cellulose acylate film is preferably produced according to a solvent-casting process. According to the solvent-casting process, a solution (dope) which is prepared by dissolving polymer material in an organic solvent is used.

The organic solvent preferably contains ether having 3 to 12 carbon atoms, ketone having 3 to 12 carbon atoms, ester having 3 to 12 carbon atoms, or halogenated hydrocarbon having 1 to 6 carbon atoms. The ether, ketone and ester may have cyclic structures. Any compounds having two or more functional groups of these ether, ketone and ester (that is, —O—, —CO— and —COO—) may be adoptable as the organic solvent.

The organic solvent may have also other functional groups such as alcoholic hydroxyl group. As for any organic solvents, having two or more species of functional group, it is good enough that the number of carbon atoms falls in any specified range of compounds having any of these functional groups.

Examples of the ether having 3 to 12 carbon atoms include diisopropyl ether, dimethoxymethane, dimethoxyethane, 1,4-dioxane, 1,3-dioxolane, tetrahydrofuran, anisole and phenetol. Examples of the ketone having 3 to 12 carbon atoms include acetone, methyl ethyl ketone, diethyl ketone, diisobutylketone, cyclohexanone and methyl cyclohexanone. Examples of the ester having 3 to 12 carbon atoms include ethyl formate, propyl formate, pentyl formate, methyl acetate, ethyl acetate and pentyl acetate.

Examples of the organic solvent having two species of more functional group include 2-ethoxyethyl acetate, 2-methoxy ethanol and 2-butoxy ethanol. The number of carbon atoms of the halogenated hydrocarbon is preferably 1 or 2, and most preferably 1. Halogen in the halogenated hydrocarbon is preferably chlorine. For the case where the hydrogen atoms of the halogenated hydrocarbon are substituted by halogen, a ratio of substitution by halogen preferably falls in the range from 25 to 75 mol %, more preferably from 30 to 70 mol %, still more preferably from 35 to 65 mol %, and most preferably from 40 to 60 mol %. Methylene chloride is a representative halogenated hydrocarbon. Two or more species of organic solvents may be used in a mixed manner.

The cellulose acetate solution may be prepared by any general method. The general method herein means treatment at a temperature of 0° C. or above (normal temperature or higher temperatures). Preparation of the solution may be carried out by adopting methods and apparatuses for preparing dope in general solvent cast process. In the general method, halogenated hydrocarbon (in particular methylene chloride) may preferably used as the organic solvent. Amount of cellulose acetate is preferably adjusted as being contained to as much as 10 to 40% by mass, and more preferably 10 to 30% by mass, in the resultant cellulose acetate solution. The organic solvent (main solvent) may be added with arbitrary additives described later. The solution may be prepared by stirring cellulose acetate and an organic solvent at normal temperature (0 to 40° C.). A high concentration solution may be stirred under pressure or heating conditions. More specifically, cellulose acetate and an organic solvent are placed in a pressure vessel, the vessel is tightly closed, and the mixture is stirred under pressure while being heated to a range of temperature not lower than the boiling point under normal pressure of the solvent, so as to keep the solvent unboiled. The heating temperature is normally 40° C. or above, preferably 60 to 200° C., and more preferably 80 to 110° C.

The individual components may be placed in the vessel as being preliminarily mixed. Alternatively, they may be placed into the vessel sequentially. The vessel is preferably composed so as to allow stirring. The vessel may be pressurized as being injected by an inert gas such as nitrogen gas. Alternatively, elevation of vapor pressure under heating may be available. Still alternatively, the vessel is tightly closed, and then added with the individual components under pressure. Heating is preferably given from the external of the vessel. For example, a jacket-type heating apparatus may be adoptable. Alternatively, a plate heater may be placed outside the vessel, a piping may be attached thereto, and a liquid medium may be allowed to circulate therethrough so as to heat the entire vessel. Stirring is preferably effected by using a stirring propeller provided inside the vessel. The stirring propeller is preferably as long as reaching close to the vessel wall. The stirring propeller is preferably provided with a scraper blade for refreshing liquid film formed on the vessel wall. The vessel may be provided also with measurement instruments such as a pressure gauge, thermometer and so forth. The individual components may be dissolved into the solvent within the vessel. The prepared dope may be taken out from the vessel after being cooled, or may be cooled using a heat exchanger or the like after being taken out.

The solution may be prepared also by the cooled solubilization method. By the cooled solubilization method, cellulose acetate may be solubilized also into an organic solvent into which cellulose acetate cannot readily be dissolved by general methods of dissolution.

The cooled solubilization method is preferable also for solvents allowing cellulose acetate to dissolve therein by the general methods, because a homogeneous solution may rapidly be obtained.

In the cooled solubilization method, first, cellulose acetate is gradually added to an organic solvent under stirring at room temperature. The amount of cellulose acetate is preferably adjusted to 10 to 40% by mass of the mixture. The amount of cellulose acetate is more preferably adjusted to 10 to 30% by mass. Alternatively, the mixture may further be added with arbitrary additives described later.

Next, the mixture is cooled to −100 to −10° C. (preferably −80 to −10° C., more preferably −50 to −20° C., and most preferably −50 to −30° C.). The cooling may be carried out typically in a diethylene glycol solution (−30 to −20° C.) cooled on a dry ice-methanol bath (−75° C.). Under such cooling, a mixture of cellulose acetate and the organic solvent solidifies. Rate of cooling is preferably 4° C./min or faster, more preferably 8° C./min or faster, and most preferably 12° C./min or faster. Faster rate of cooling is more preferable, wherein theoretical upper limit may be 10000° C./sec, technical upper limit may be 1000° C./sec, and practical upper limit may be 100° C./sec.

The rate of cooling herein is a value obtained by dividing difference between the temperature at the start of cooling and the temperature finally reached by the cooling, by length of time ranging from the start of cooling up to when the final temperature of cooling is reached.

A homogeneous solution may be obtained in this way. Operations of cooling and heating may be repeated if the dissolution is insufficient. Whether the dissolution is sufficient or not may be judged by visual observation of appearance of the solution.

In the cooled solubilization method, a sealable vessel is preferably used in order to avoid contamination by moisture due to dewing in the process of cooling.

In the process of cooling and heating, pressurizing in the process of cooling and reducing pressure in the process of heating may shorten the time for solubilization. A pressure-proof vessel is preferably used so as to allow pressurizing and reduction in pressure. For example, a 20%-by-mass solution of cellulose acetate having a degree of acetylation of 60.9% and a viscosity-average degree of polymerization of 299, dissolved in methyl acetate by the cooled solubilization method was found to have a quasi-phase transition point between sol state and gel state at around 33° C., when measured by differential scanning calorimetry (DSC), showing a uniform gel state at and below the temperature. It is therefore necessary to keep this solution at or above the quasi-phase transition point, and preferably at a temperature approximately 10° C. higher than a gel phase transition temperature.

It is, however, to be noted that the quasi-phase transition temperature may vary depending on the degree of acetylation and viscosity-average degree of polymerization of cellulose acetate, concentration of the solution, and organic solvent to be adopted.

As described previously, the cellulose acetate film is preferably produced from the prepared cellulose acetate solution (dope) according to the solvent cast method.

For the purpose of producing the cellulose acetate film used as the support of the optical compensation sheet, the dope is preferably added with the above-described retardation enhancer. The dope is cast on a drum or band, from which the solvent is vaporized off to thereby form the film. The dope before being cast is preferably adjusted in the concentration thereof so that the solid content falls in the range from 18 to 35%. Surfaces of the drum and the band are preferably finished to a mirror-like state. Methods of casting and drying in the solvent cast method are described in patent specifications of U.S. Pat. Nos. 2,336,310, 2,367,603, 2,492,078, 2,492,977, 2,492,978, 2,607,704, 2,739,069 and 2,739,070, British Patent Nos. 640731 and 736892, Examined Japanese Patent Publication Nos. S45-4554 and S49-5614, Japanese Laid-Open Patent Publication Nos. S60-176834, S60-203430 and S62-115035.

The dope is preferably cast on the drum or the band having a surface temperature of 10° C. or lower. The cast solution is preferably dried under air blow for 2 seconds or longer after the casting.

Alternatively, the obtained film may be separated from the drum or the band, and the residual solvent may be vaporized by drying under hot air blow, while sequentially varying the temperature thereof from 100 to 160° C.

This method is described in Examined Japanese Patent Publication No. H5-17844, by which the length of time from casting to separation may desirably be shortened. In order to carry out this method, the dope may necessarily be gellated at the surface temperature of the drum and the band in the process of casting.

The casting may be carried out so as to form two layers using thus-prepared cellulose acetate solution (dope), and make them into a film. In this case, the cellulose acetate film may preferably be produced by the solvent cast process. The dope is cast onto the drum or the band, from which the solvent is vaporized off to thereby form the film. The dope before being cast is preferably adjusted in the concentration thereof so that the solid content falls in the range from 10 to 40%. Surfaces of the drum and the band are preferably finished to a mirror-like state.

For the case where two or more layers of cellulose acetate solution are cast, a plurality of cellulose acetate solutions may be cast, wherein the film may be produced by stacking the solutions containing cellulose acetate, cast respectively from a plurality of casting ports provided at intervals in the direction of feeding of the support. The methods typically described in Japanese Laid-Open Patent Publication Nos. S61-158414, H1-122419, and H11-198285 may be applicable.

Alternatively, the film may be produced also by casting the cellulose acetate solutions from two casting ports. The methods typically described in Examined Japanese Patent Publication No. 60-27562, Japanese Laid-Open Patent Publication Nos. S61-94724, S61-947245, S61-104813, 561-158413, and H6-134933 may be applicable.

Alternatively, a method of forming a cellulose acetate film by casting, described in Japanese Laid-Open Patent Publication No. S56-162617, by which flow of a high-viscosity cellulose acetate solution is wrapped by a low-viscosity cellulose acetate solution, and the high- and low-viscosity cellulose acetate solutions are extruded at the same time.

Alternatively, the film may be produced also by using two casting ports, wherein a film formed on a support using a first casting port is separated off, and a second casting is carried out on the surface of the film, which had been brought into contact with the surface of support. For example, a method described in Examined Japanese Patent Publication No. S44-20235 may be exemplified.

The cellulose acetate solutions to be cast may be same or different. In order to give functions to a plurality of cellulose acetate layers, the cellulose acetate solutions correspondent to the functions may be cast from the individual casting ports.

The cellulose acetate solutions may also be cast together with other functional layers (for example, adhesive layer, dye layer, antistatic layer, anti-halation layer, ultraviolet absorbing layer, and polarizer layer).

In the conventional single-layer liquid process, it has been necessary to extrude a high-concentration, high-viscosity cellulose acetate solution in order to achieve a necessary thickness of the film. However, this process has often suffered from a problem of causing granulation failure and flatness failure, due to poor stability of the cellulose acetate solution such as producing solid matters.

As a solving means for this problem, a plurality of cellulose acetate solutions may be cast from the casting ports, and thereby not only high-viscosity solutions may be extruded onto the support at the same time, and the flatness may consequently be improved so as to produce a film having a good surface condition, but also the drying load may be reduced by virtue of use of dense cellulose acetate solutions, and thereby the production speed of the film may be improved.

In order to improve the mechanical characteristics, addition of a plasticizer to a cellulose acetate film may be carried out.

Phosphate ester or carboxylate ester may be used as the plasticizer.

Examples of the phosphate ester include triphenyl phosphate (TPP) and tricresyl phosphate (TCP). Representatives of the carboxylate ester include phthalate ester and citrate ester.

Examples of the phthalate ester include dimethyl phthalate (DMP), diethyl phthalate (DEP), dibutyl phthalate (DBP), dioctyl phthalate (DOP), diphenyl phthalate (DPP) and diethyl hexyl phthalate (DEHP).

Examples of the citrate ester include triethyl O-acetylcitrate (OACTE) and tributyl O-acetylcitrate (OACTB).

Examples of other carboxylate esters include butyl oleate, methyl acetyl ricinolate, dibutyl sebacate, and various trimeritate esters.

The phthalate ester-base plasticizers (DMP, DEP, DBP, DOP, DPP, DEHP) are preferably used. DEP and DPP are particularly preferable.

Amount of addition of the plasticizer may preferably be 0.1 to 25% by mass of cellulose ester, more preferably 1 to 20% by mass, and most preferably 3 to 15% by mass.

The cellulose acetate film may preferably be subjected to surface treatment.

Specific methods may be exemplified by corona discharge, treatment, glow discharge treatment, flame treatment, acid treatment, alkali treatment, and ultraviolet irradiation. Surface treatments which can be employed in the invention are described in detail in Hatsumei Kyokai Disclosure Bulletin 2001-1745, pp. 30-32, published by Japan Institute of Invention and Innovation, Mar. 15, 2001.

An alkali-saponification treatment may be subjected to a cellulose acetate film as follows. A cellulose acetate film is dipped in a saponification solution, or a saponification solution is applied to a surface of the film. Preferred is the latter. Examples of the coating method include dip coating, curtain coating, extrusion coating, bar coating and E-type coating. Alkali used for preparing the saponification solution is preferably selected from hydroxides of alkali metal (e.g., potassium and sodium). The concentration of hydroxide ion in the solution is preferably from 0.1 to 3 N.

Wettability to the cellulose acetate film or stability of the alkali-treatment liquid may be improved by employing a wettability-rich solvent in preparing the liquid or adding any surfactant or wetting agent (e.g., diols and glycerin) thereto.

Examples of the wettability-rich solvent to the film include alcohols (e.g., isopropyl alcohol, n-butanol, methanol and ethanol).

Additives to be added to the alkali treatment liquid are described in JPA No. 2002-82226 and International Publication Pamphlet No. WO02/46809.

In place of or addition to the surface treatment, an undercoating layer may be formed on the polymer.

The undercoating layer may be formed according to a method described in JPA No. hei 7-333433.

Multi-layered undercoating may be formed on the film. For example, a multi-layered undercoating may be formed as follows. As a first undercoating, a polymer layer having both of hydrophobic and hydrophilic groups is formed on a surface of the film, and, as a second undercoating, a polymer layer having a hydrophilic group, which well-adheres an alignment layer, is formed on the first undercoating. Such undercoatings may be produce according to a method described in JPA No. hei 11-248940.

[Polarizing Plate]

According to the invention, the first or second optically anisotropic layer may be stick to a surface of a linear polarizing film (referred to as "polarizing film" hereinafter) to form a polarizing plate, and then the polarizing plate may be used in various applications.

The linear polarizing film may be selected from coating-type polarizing films as typified by Optiva Inc., iodine-based polarizing films and dichroic-dye based polarizing films. Iodine or dichroic dye molecules are oriented in binder so as to have a polarizing capability. Iodine or dichroic dye molecules may be oriented along with binder molecules, or iodine molecules may aggregate themselves in the same manner of liquid crystal and be aligned in a direction.

Generally, commercially available polarizing films are produced by soaking a stretched polymer film in a solution of iodine or dichroic dye and impregnating the polymer film with molecules of iodine or dichroic dye.

Generally, molecules of iodine or dichroic dye may enter into a polymer film from the surface of the film and may be dispersed in the area about 4 μm in thickness from the surface of the film (about 8 μm in thickness from both of two surfaces of the film). And in order to obtain sufficient polarizing ability, it is required to use a polarizing film having a thickness not less than 10 μm. The penetrance degree can be adjusted within a preferred range by iodide or dichroic dye concentration of the solution, temperature of the solution or soaking time.

The thickness of is not greater than those of commercially available polarizing films (about 30 μm), more desirably not greater than 25 μm and much more desirably not greater than 20 μm. When a polarizing film having a thickness not greater than 20 μm is used in a 17-inch liquid-crystal display, no light leakage may be observed.

The polarizing film may comprise crosslinked binder. Self-crosslinkable polymers may be used as binder. The polarizing film may be produced by carrying out reaction between functional groups of polymer with light, heat or variation of pH. Crosslinking agents, which are compounds having high reaction-activities, may be used.

Crosslinking reactions may be carried out by heating a coating liquid comprising polymer or a mixture of polymer and a crosslinking agent after being applied to a substrate. The heating step may be carried out at any time by the end of the process for producing the polarizing film as long as a final product having good durability can be obtained.

Polymer to be used in the polarizing film as a binder may be either of a polymer intrinsically crosslinkable itself, or a polymer crosslinkable by a crosslinking agent.

Examples of the polymer include polymers such as polymethyl methacrylate, polyacrylates, polymethacrylates, polystyrene, polyvinyl alcohol and modified polyvinyl alcohol, poly(N-methylol acrylamide), polyvinyltoluene, chlorosulfonated polyethylene, nitrocellulose, chlorinated polyolefin, polyester, polyimide, poly(vinyl acetate), polyethylene, carboxy methylcellulose, polypropylene, and polycarbonate; and copolymers thereof (e.g., acrylate/methacrylate copolymer, styrene/maleimide copolymer, styrene/vinyltoluene copolymer, and vinyl acetate/vinyl chloride copolymer). Silane coupling agents are also employable.

Among these polymers, water-soluble polymers (e.g., poly(N-methylol acrylamide), carboxymethyl cellulose, gelatin, polyvinyl alcohol and modified polyvinyl alcohol) are preferred. Gelatin, polyvinyl alcohol and modified polyvinyl alcohol are more preferred, and polyvinyl alcohol and modified polyvinyl alcohol are even more preferred.

The degree of saponification of the modified or non-modified polyvinyl alcohol to be used in the invention is preferably 70 to 100%, more preferably from 80 to 100%, and even more preferably from 95 to 100%. The degree of polymerization of the polyvinyl alcohol to be used in the invention is preferably from 100 to 5000.

Examples of the modified polyvinyl alcohol include those modified by copolymerization, chain transfer, or block polymerization. Examples of modifier group involved in the modification by copolymerization include —COONa, —Si(OX)$_3$ where X is a hydrogen atom or alkyl), —N(CH$_3$)$_3$·Cl, —C$_9$H$_{19}$, —COO, —SO$_3$Na and —C$_{12}$H$_{25}$. Examples of modifier group involved in the modification by chain transfer include —COONa, —SH and —SC$_{12}$H$_{25}$. The degree of polymerization of the modified polyvinyl alcohol to be used in the invention is preferably from 100 to 3000. Preferable examples of the modified polyvinyl to be used in the invention include those described in JPA Nos. hei 8-338913 and hei 9-152509. Among those, non-modified or modified polyvinyl alcohols of which degree of saponification is from 85 to 95% are especially preferred. Any combination of two ore more types of non-modified or modified polyvinyl alcohols is employable.

Examples of the crosslinking agent are described in U.S. reissued Pat. No. 23,297. Boron compounds such as boric acid or pyroborate can be used as a crosslinking agent. The amount of the crosslinking agent is desirably from 0.1 to 20% by mass and more desirably from 0.5 to 15% by mass with respect to the mass of binder. When the amount falls within the range, good alignment ability of molecules of iodine and dichroic dye and good moisture-heat resistance can be obtained. The polarizing film may contain some amount of unreacted crosslinking agents after end of crosslinking reaction. The amount of residual crosslinking agent in the polarizing film is desirably not greater than 1.0% by mass and more desirably not greater than 0.5% by mass. When the amount falls within the range, the polarization degree may not lower even if the polarizing film is used for a long period or is left under a high-humidity and high-temperature atmosphere for a long period.

Examples of dichroic dye include azo dyes, stilbene dyes, pyrazolone dyes, triphenylmethane dyes, quinoline dyes, oxazine dyes, thiazine dyes and anthraquinone dyes. The dichroic dye is desirably selected from water-soluble dyes.

The dichroic dye desirably has a hydrophilic group such as sulfo, amino or hydroxy.

More specific Examples of dichroic dye include C. I. Direct•Yellow 12, C. I. Direct•Orange 39, C. I. Direct•Orange 72, C. I. Direct•Red 39, C. I. Direct•Red 79, C. I. Direct•Red 81, C. I. Direct•Red 83, C. I. Direct•Red 89, C. I. Direct•Violet 48, C. I. Direct•Blue 67, C. I. Direct•Blue 90, C. I. Direct•Green 59 and C. I. Acid-Red 37.

Dichroic dyes to be used in the invention are described in detail in JPA Nos. hei 1-161202, hei 1-172906, hei 1-172907, hei 1-183602, hei 1-248105, hei 1-265205 and hei 7-261024.

Dichroic dye may be used as a free acid or a salt (e.g., salts of alkali metal, ammonium salts and amine salts). Various colored polarizing films may be prepared by using two or more types of dichroic dyes.

The polarizing film is prepared by stretching a polymer film in the long direction, MD direction, or in other words according to a stretching method, or by staining a polymer film with iodine or dichroic dye, or in other words according to rubbing method.

According to the stretching method, the stretching ratio is desirably from 2.5 to 3.0 and more desirably from 3.0 to 10.0. the stretching process may be carried out under dried atmosphere, pr in other words according to a dry stretching. Or the stretching process may be carried out while being dipped in water, or in other words according to a wet stretching. For the dry stretching, the stretching ratio is desirably from 2.5 to 5.0, and for the wet stretching, the stretching ratio is desirably from 3.0 to 10.0. The stretching process may be divided into plural steps including an obliquely stretching step. Dividing into plural steps, it is possible to stretch uniformly even if the stretching ratio is high. Before an obliquely stretching step, a stretching in a width-direction or a stretching in a length-direction may be carried out slightly (with a degree preventing shrinkage in a width direction).

In terms of productivity, stretching may be carried out obliquely in a direction 10 to 80 degree relative to the MD direction of a polymer film. Such stretching may be carried out in a manner of a tenter stretching employing biaxial-stretching steps at a left side and a right side respectively.

The biaxial-stretching may be carried out according to a usual film formation process.

For a biaxial stretching, a left side and a right side of a film is stretched at a different ratio respectively, and, thus, the film may be required to have different thicknesses at the left and right sides respectively before being stretched. According to a flow-casting method, it is possible to give a difference in a flowing amount of a binder solution at a left side and a right side by forming a taper on a die.

The stretching direction may be decided depending on its application. Generally, the stretching direction is set at the direction of 45° relative to the MD direction.

Preferably, on both surfaces of a polarizing film, protective films are disposed, and, as one of the protective films, an optical compensation film, comprising the first and second optically anisotropic layers, is disposed. Examples of such lamination include a protective film/a polarizing film/the second optically anisotropic layer/the first optically anisotropic layer, and a protective film/a polarizing film/the second optically anisotropic layer/alignment layer/the second optically anisotropic layer. Preferably, a surface of the second optically anisotropic layer may be stick to a surface of a polarizing film; alternatively, a surface of the first optically anisotropic layer may be stick to a surface of a polarizing film. The surfaces may be stick to each other with adhesive. Examples of the adhesive include polyvinyl alcohol based polymers (e.g., modified polyvinyl alcohols having acetoacetyl group, sulfonic acid group, carboxyl group or oxyalkylene group) and solutions of boron compounds. Among these, polyvinyl alcohol based polymers are preferred.

The thickness of the dried adhesive layer is preferably from 0.01 to 10 μm, and more preferably from 0.05 to 5 μm.

To a surface of the polarizing plate, a light-diffusion film or an anti-glare film may be stick.

<Light-Diffusion Film and Anti-Glare Film>

FIG. 1 is a frame format of a cross-section of a representative embodiment of a light-diffusion film.

A light-diffusion film 101 shown in FIG. 1 comprises a transparent base film 102 and a light-diffusion layer containing transparent polymer 140 and first and second transparent fine particles dispersed in the polymer 140.

It is to be noted that an embodiment employing two types of transparent fine particles, having a refraction index different from each other, of which particle-size distribution is different from each other will be described in detail hereinafter, however, a same type of transparent fine particles, having a same refraction index, of which particle-size distribution is different from each other, or one type of transparent fine particles may be also employed. The first transparent fine particle 141 may be selected from transparent polymer particles such as silica fine particles (for example, fine particles having a mean particle size of 1.0 μm and a refraction index of 1.51); and the second transparent fine particle 142 may be selected from transparent polymer fine particles such as polystyrene beads (for example, fine particles having a mean particle size of 3.5 μm and a refractive index of 1.61).

A light-diffusion property is ascribable to the difference between refractive indices of transparent fine particles (141 and 142) and transparent polymer (140). The difference of refractive index is preferably from 0.02 to 0.15. The embodiment wherein the difference of refractive index is equal to or more than 0.02 may achieve light-diffusion more effectively; and the embodiment wherein the difference of refractive index is equal to or less than 0.15 may not achieve too light-diffusion and therefore reduce blushing as a whole of the film itself. The difference of refractive index is more preferably from 0.03 to 0.13, and even more preferably from 0.04 to 0.10.

The polarizing plate to be used in a liquid crystal display device may have an anti-reflection layer on its viewed surface. The anti-reflection layer may also function as a protective film.

In terms of reduction of colorant in the oblique direction, the inner haze of the anti-reflection layer is preferably equal to or more than 50%. The anti-reflection layer to be used in the invention is described in detail in JPA Nos. 2001-33783, 2001-343646 and 2002-328228.

The retardation plate can be used as an elliptical polarizing plate by combining with a polarizing film. The retardation plate can also be used in combination with a polarizing film and applied to a transmission, reflection or semi-transmission liquid crystal display device to enhance the viewing angle. An elliptical polarizing plate and a liquid crystal display device utilizing the retardation plate will be described below.

[Elliptical Polarizing Plate]

An elliptical polarizing plate can be produced by laminating the retardation plate and a polarizing film. An elliptical polarizing plate capable of enhancing a viewing angle of a liquid crystal display device can be provided by utilizing the retardation plate. Examples of the polarizing film include an iodine polarizing film, a dye polarizing film using a dichroic dye, and a polyene polarizing film. The iodine polarizing film and the dye polarizing film are generally produced by using a polyvinyl alcohol film. The polarizing axis of the polarizing film corresponds to the direction perpendicular to the stretching direction of the film.

The polarizing film is laminated on the side of the optically anisotropic layer of the retardation plate. A protective film is preferably provided on the surface of the retardation plate opposite to the side where the polarizing film is laminated. The protective film is preferably a transparent protective film having a light transmittance of 80% or more. As the transparent protective film, a cellulose ester film is generally used, and a triacetyl cellulose film is preferably used. The cellulose ester film is preferably produced by a solvent cast method. The protective film preferably has a thickness of from 20 to 500 μm, and more preferably from 50 to 200 μm.

[Liquid Crystal Display Device]

The retardation plate of the invention contributes to enhancement of a viewing angle of a liquid crystal display device. The liquid crystal display device generally comprises a liquid crystal cell, a polarizing element and a retardation plate (optical compensation sheet). The polarizing element generally contains a polarizing film and a protective film, and the polarizing film and the protective film may be those described for the elliptical polarizing plate. A retardation plate (an optical compensation sheet) to be used for a TN-mode liquid crystal cell is described in detail in JPA No. hei 6-214116, U.S. Pat. Nos. 5,583,679 and 5,646,703, and German Patent Publication No. 3911620A1. A retardation plate to be used for an IPS- or FDC-mode liquid crystal cell is described in detail in JPA No. hei 10-54982. A retardation plate to be used for an OCB- or HAN-mode liquid crystal cell is described in detail in U.S. Pat. No. 5,805,253 and International Publication No. WO96/37804 Pamphlet. A retardation plate to be used for a STN-mode liquid crystal cell is described in detail in JPA No. hei 9-26572. A retardation plate to be used for a VA-mode liquid crystal cell is described in detail in Japanese Patent Publication No. 2866372.

In the invention, liquid crystal cells employing various modes may be produced referring to the descriptions in the above mentioned publications. The retardation plate may be employed in various liquid crystal display devices employing a TN (Twisted Nematic), IPS (In-Plane Switching), FDC (Ferroelectric liquid Crystal), OCB (Optically Compensatory Bend), STN (Super Twisted Nematic), VA (Vertically Aligned) or HAN (Hybrid Aligned Nematic) mode. The retardation plate may function more effectively for optical compensation of a TN (Twisted Nematic) or OCB (Optically Compensatory Bend) mode.

EXAMPLES

Paragraphs below will more specifically describe the present invention referring to Examples. Any materials, reagents, amount and ratio of use and operations shown in Examples may appropriately be modified without departing from the spirit of the present invention. It is therefore understood that the present invention is by no means limited to specific Examples below.

Synthesis Example 1

Synthesis of Compound D3-12

The compound D3-12 was synthesized according to the following scheme 1 by the same method as Example 11 disclosed in WO2006/098489A1, pp. 72-73 and the compound D-227 disclosed in the same publication, p. 77.

Scheme 1

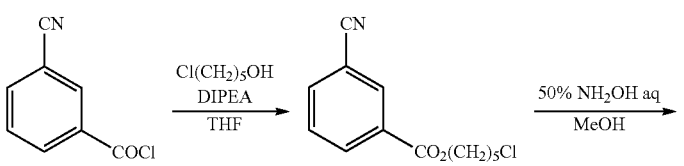

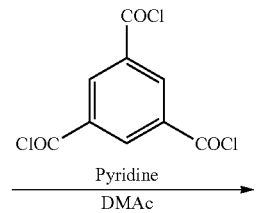

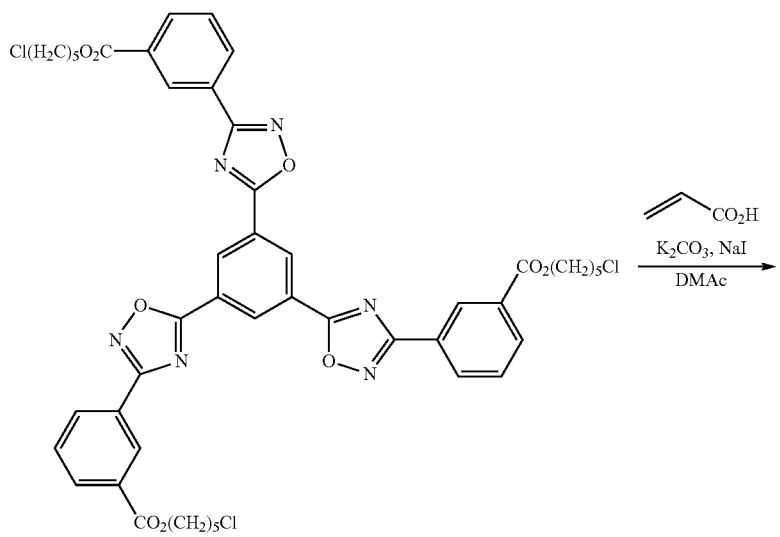

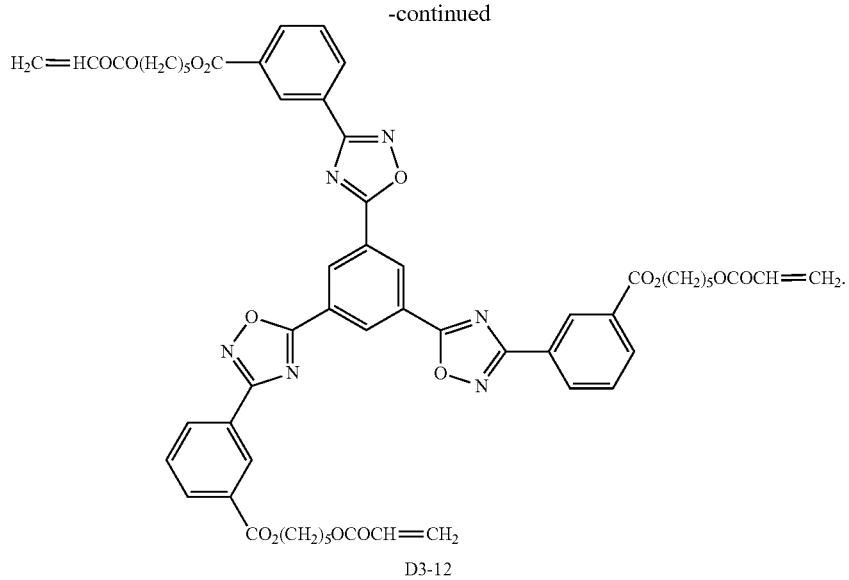

D3-12

The NMR spectrum of the resulting compound D3-12 was as follows.

$^1$H-NMR (solvent: CDCl$_3$), standard substance: tetramethylsilane) δ (ppm): 1.60 (6H, m), 1.80-1.90 (12H, m), 4.25 (6H, t), 4.45 (6H, t), 5.80 (3H, dd), 6.15 (3H, dd), 6.40 (3H, dd), 7.65 (3H, t), 8.25 (3H, d), 8.45 (3H, d), 8.90 (3H, s), 9.30 (3H, s).

The resulting compound 3D-12 was measured for phase transition temperatures by observing the textures thereof with a polarizing microscope. As a result, when the temperature was increased, a crystalline phase was changed to a discotic nematic liquid crystalline phase at about 86° C., and was changed to an isotropic liquid phase when exceeding 142° C. It was thus found that the compound D3-12 exhibited a discotic nematic phase within a range of from 86 to 142° C.

Synthesis Example 2

Synthesis of Monomer A-6'

Monomer A-6'

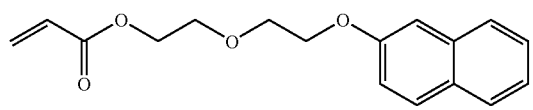

The monomer A-6' was synthesized according to the following scheme 2.

Scheme 2

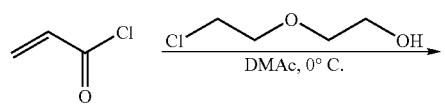

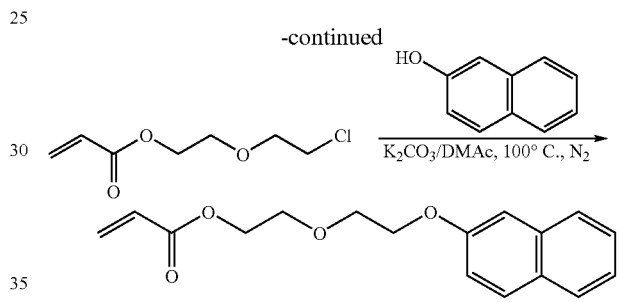

300 g (2.41 mol) of ethylene glycol mono-2-chloroethyl ether (available from Tokyo Kasei Kogyo Co., Ltd.) and 2 g of nitrobenzene as a polymerization inhibitor were dissolved in 1,000 mL of ethyl acetate, to which 295 mL (3.65 mol) of acrylic chloride was added dropwise over 3 hours under stirring and cooling with an ice bath, followed by further stirring for 3 hours. After completing the reaction, water was added to the reaction mixture, which was then extracted with ethyl acetate, and the resulting organic layer was washed with a saturated saline and dried over sodium sulfate. The solvent was then removed from the organic layer to obtain a product in an oily form (416 g, rough yield: 97%).

302 g (1.69 mol) of the resulting product was dissolved in 1,500 mL of N,N-dimethylacetamide (DMAc), to which 360 g (2.60 mol) of anhydrous potassium carbonate and 187.4 g (1.30 mol) of 2-naphthol (available from Wako Pure Chemical Industries, Ltd.) were added and dissolved therein, and the reaction mixture was heated to 90° C. and stirred for 5 hours under a nitrogen atmosphere. After completing the reaction, the reaction mixture was purified by silica gel column chromatography and then recrystallized from a mixed solvent of hexane/ethyl acetate (3/1) to obtain a monomer 1. The monomer 1 will be referred to as the monomer A-6' hereinafter (150 g, yield: 40%).

The NMR spectrum of the resulting monomer A-6' was as follows.

$^1$H-NMR (solvent: CDCl$_3$), standard substance: tetramethylsilane) δ (ppm): 3.83 (2H, t), 3.92 (2H, t), 4.25 (2H, t), 4.37 (2H, t), 5.86 (1H, dd), 6.15 (1H, dd), 6.42 (1H, dd), 7.1-7.2 (2H, m), 7.32 (1H, t), 7.43 (1H, t), 7.75 (3H, m).

Synthesis Example 3

Synthesis of Monomer A-9'

Monomer A-9'

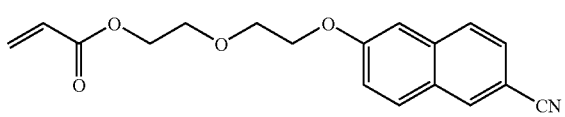

The same procedures as in Synthesis Example 2 were carried out except that 25 g of 6-cyano-2-naphthol (available from Sigma Aldrich Japan, Inc.) was used instead of 2-naphthol (available from Wako Pure Chemical Industries, Ltd.) used in Synthesis Example 2, so as to obtain 30 g of 4-(2'-acryloyloxyethoxy)naphthalene nitrile. The resulting compound will be referred to as the monomer A-9' hereinafter (yield: 50%).

The NMR spectrum of the resulting monomer A-9' was as follows.

$^1$H-NMR (solvent: CDCl$_3$), standard substance: tetramethylsilane) δ (ppm): 3.85 (2H, t), 3.95 (2H, t), 4.27 (2H, t), 4.37 (2H, t), 5.80 (1H, dd), 6.14 (1H, dd), 6.40 (1H, dd), 7.17 (1H, d), 7.29 (1H, dd), 7.55 (1H, dd), 7.7-7.8 (2H, m), 8.12 (1H, d).

Synthesis Example 4

Synthesis of Monomer A-7'

Monomer A-7'

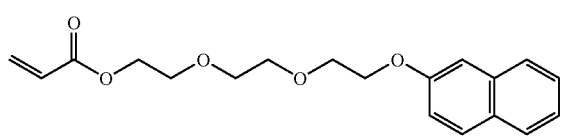

The same procedures as in Synthesis Example 2 were carried out except that 2-(2-(2-chloroethoxy)ethoxy)ethanol (available from Tokyo Kasei Kogyo Co., Ltd.) was used instead of ethylene glycol mono-2-chloroethyl ether (available from Tokyo Kasei Kogyo Co., Ltd.) used in Synthesis Example 2, so as to obtain the monomer A-7' (total yield: 75%).

The NMR spectrum of the resulting monomer A-7' was as follows.

$^1$H-NMR (solvent: CDCl$_3$), standard substance: tetramethylsilane) δ (ppm): 3.60-3.80 (4H, m), 3.93 (2H, t), 4.25 (2H, t), 4.32 (2H, t), 5.82 (1H, dd), 6.14 (1H, dd), 6.40 (1H, dd), 7.1-7.2 (2H, m), 7.30 (1H, t), 7.42 (1H, t), 7.72 (3H, m).

Synthesis Example 5

Synthesis of Monomer A-8

Monomer A-8'

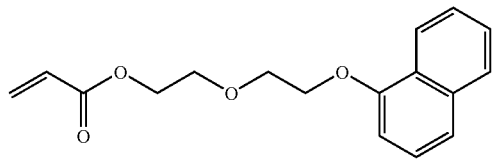

The same procedures as in Synthesis Example 2 were carried out except that 21.6 g of 1-naphthol was used instead of 2-naphthol (available from Wako Pure Chemical Industries, Ltd.) used in Synthesis Example 2, so as to obtain 20 g of the monomer A-8' (total yield: 50%).

The NMR spectrum of the resulting monomer A-8' was as follows.

$^1$H-NMR (solvent: CDCl$_3$), standard substance: tetramethylsilane) δ (ppm): 3.88 (2H, t), 4.00 (2H, t), 4.32 (2H, t), 4.38 (2H, t), 5.80 (1H, dd), 6.14 (1H, dd), 6.42 (1H, dd), 6.82 (1H, d), 7.35 (1H, t), 7.40-7.50 (3H, m), 7.80 (1H, d), 8.28 (1H, d).

Synthesis Example 6

Synthesis of Polymer AD-1

The polymer AD-1 was synthesized according to the following scheme.

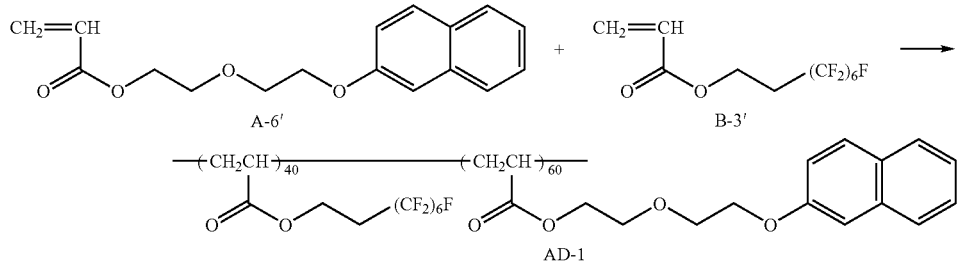

5 g of MEK was placed in a 100-mL three-neck flask and heated to 78° C. under a nitrogen stream at a flow rate of 35 mL/min. The monomers A-6' (9.6 g) and B-3' (6.4 g) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to a methanol-water mixed solution (800 mL) under stirring, and the polymer thus deposited was separated by centrifugation and then dried. Thus, 10.5 g of the polymer (AD-1) used in the invention was obtained. The polymer had Mn of 12,000 and Mw/Mn of 2.25 as measured with GPC (polystyrene standard). The numerals attached to the constitutional units in the scheme each represents the constitutional ratios thereof in terms of percent by mass (which is hereinafter the same for the polymers synthesized in Examples).

Polymers (AD-2) to (AD-5), having a polymerization ratio different from that of Polymer (AD-1), were prepared in the same manner as Synthesis Example 6.

Synthesis Example 7

Synthesis of Polymer AD-7

The polymer AD-7 was synthesized according to the following scheme.

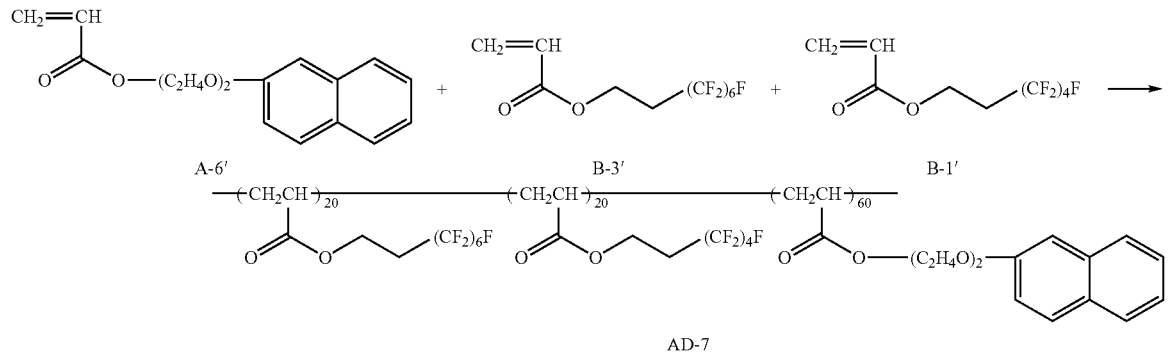

AD-7

5 g of MEK was placed in a 100-mL three-neck flask and heated to 78° C. under a nitrogen stream at a flow rate of 35 ml/min. The monomers A-6' (9.6 g), B-3' (3.2 g) and B-1' (3.2 g) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to a methanol-water mixed solution (800 mL) under stirring, and the polymer thus deposited was separated by centrifugation and then dried. Thus, 13 g of the polymer (AD-7) used in the invention was obtained. The polymer had Mn of 10,900 and Mw/Mn of 2.04 as measured with GPC (polystyrene standard).

Polymers (AD-6) to (AD-8), having a polymerization ratio different from that of Polymer (AD-5), were prepared in the same manner as Synthesis Example 7.

Polymers (AD-9) to (AD-11), having a molecular weight different from that of Polymer (AD-5), were prepared in the same manner as Synthesis Example 7, except that the amount of the radical-polymerization initiator was increased or decreased.

Synthesis Example 8

Synthesis of Polymer AD-12

The polymer AD-12 was synthesized according to the following scheme.

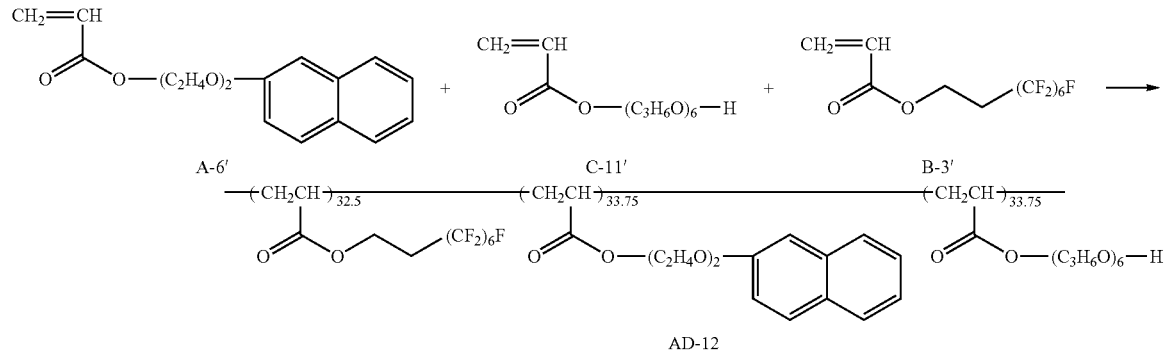

AD-12

4 g of MEK was placed in a 100-mL three-neck flask and heated to 78° C. under a nitrogen stream at a flow rate of 35 mL/min. The monomers A-6' (5.4 g), B-3' (5.2 g) and C-11' (5.4 g, Blemmer AP-400, produced by NOF Corp.) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to 800 mL of a methanol-water mixed solution (10/90 by volume) under stirring, and the polymer thus deposited was separated by centrifugation and then dried. Thus, 13.8 g of the polymer (AD-12) used in the invention was obtained. The polymer had Mn of 11,000 and Mw/Mn of 2.14 as measured with GPC (polystyrene standard).

Polymer (AD-13), having a polymerization ratio different from that of Polymer (AD-12), was prepared in the same manner as Synthesis Example 8.

Synthesis Example 9

Synthesis of Polymer AD-14

The polymer AD-14 was synthesized according to the following scheme.

4 g of MEK was placed in a 100-mL three-neck flask and heated to 78° C. under a nitrogen stream at a flow rate of 35 mL/min. The monomers A-6' (2.4 g), B-3' (4.8 g) and C-19' (7.2 g, NK Ester AMP20G, produced by Shin-nakamura Chemical Corp.) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to 800 mL of a methanol-water mixed solution (10/90 by volume) under stirring, and the polymer thus deposited was separated by centrifugation and then dried. Thus, 12.7 g of the polymer (AD-14) used in the invention was obtained. The polymer had Mn of 16,700 and Mw/Mn of 3.00 as measured with GPC (polystyrene standard).

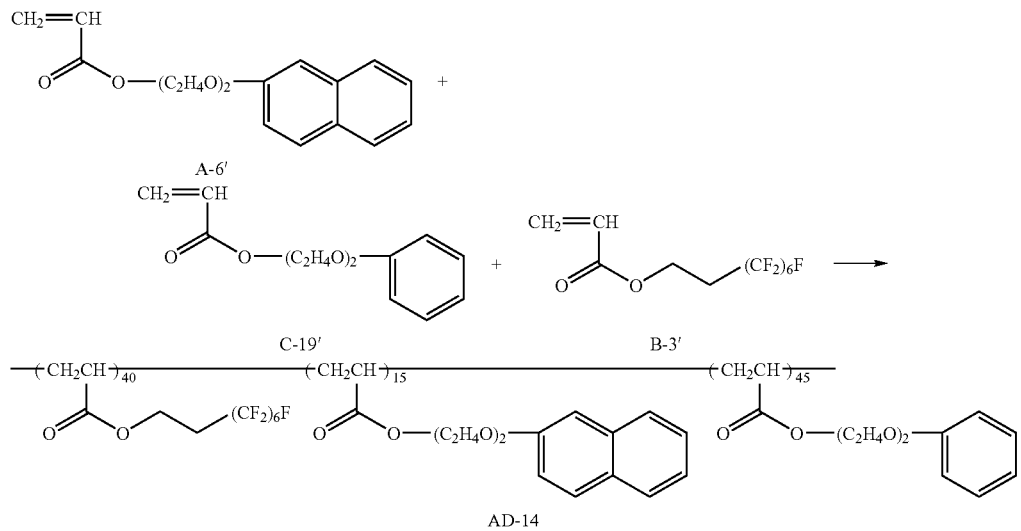

Synthesis Example 10

Synthesis of Polymer AD-15

The polymer AD-15 was synthesized according to the following scheme.

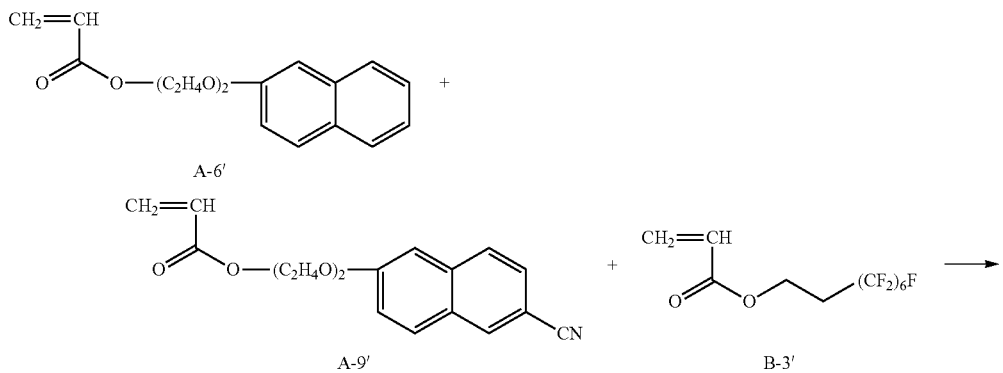

-continued

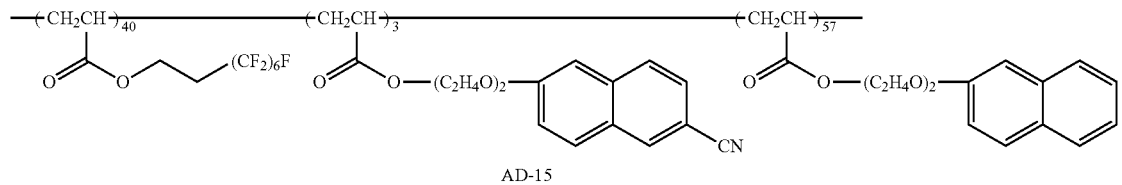

AD-15

4 g of MEK was placed in a 100-mL three-neck flask and heated to 78° C. under a nitrogen stream at a flow rate of 35 mL/min. The monomers A-6' (9.12 g), A-9' (0.48 g) and B-3' (6.4 g) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to 800 mL of a methanol-water mixed solution (10/90 by volume) under stirring, and the polymer thus deposited was separated by centrifugation and then dried. Thus, 13.0 g of the polymer (AD-15) used in the invention was obtained. The polymer had Mn of 14,700 and Mw/Mn of 2.98 as measured with GPC (polystyrene standard).

Synthesis Example 11

Synthesis of Polymer AD-16

The polymer AD-16 was synthesized according to the following scheme.

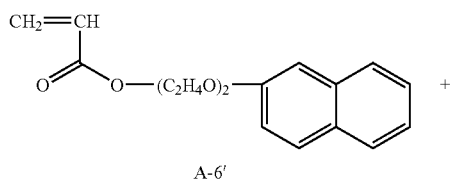

A-6'

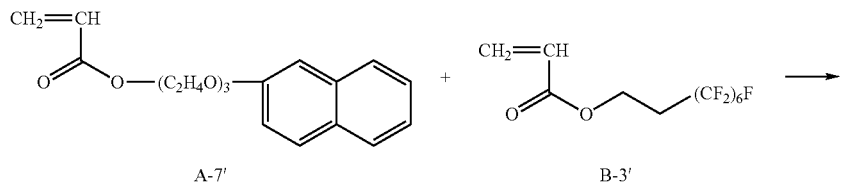

A-7'  B-3'

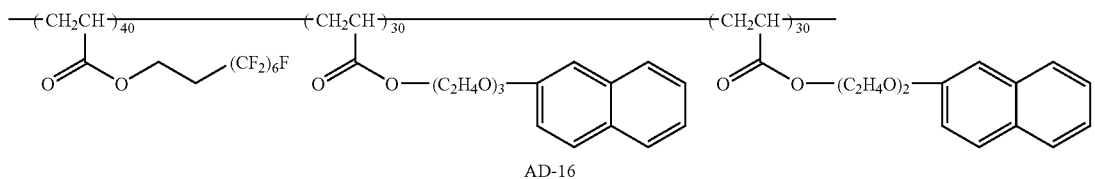

AD-16

4 g of MEK was placed in a 100-mL three-neck flask and heated to 78° C. under a nitrogen stream at a flow rate of 35 mL/min. The monomers A-6' (4.8 g), A-7' (4.8 g) and B-3' (6.4 g) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to 800 mL of a methanol-water mixed solution (10/90 by volume) under stirring, and the polymer thus deposited was separated by centrifugation and then dried. Thus, 13.7 g of the polymer (AD-16) used in the invention was obtained. The polymer had Mn of 16,300 and Mw/Mn of 2.93 as measured with GPC (polystyrene standard).

Synthesis Example 12

Synthesis of Polymer AD-17

The polymer AD-17 was synthesized according to the following scheme.

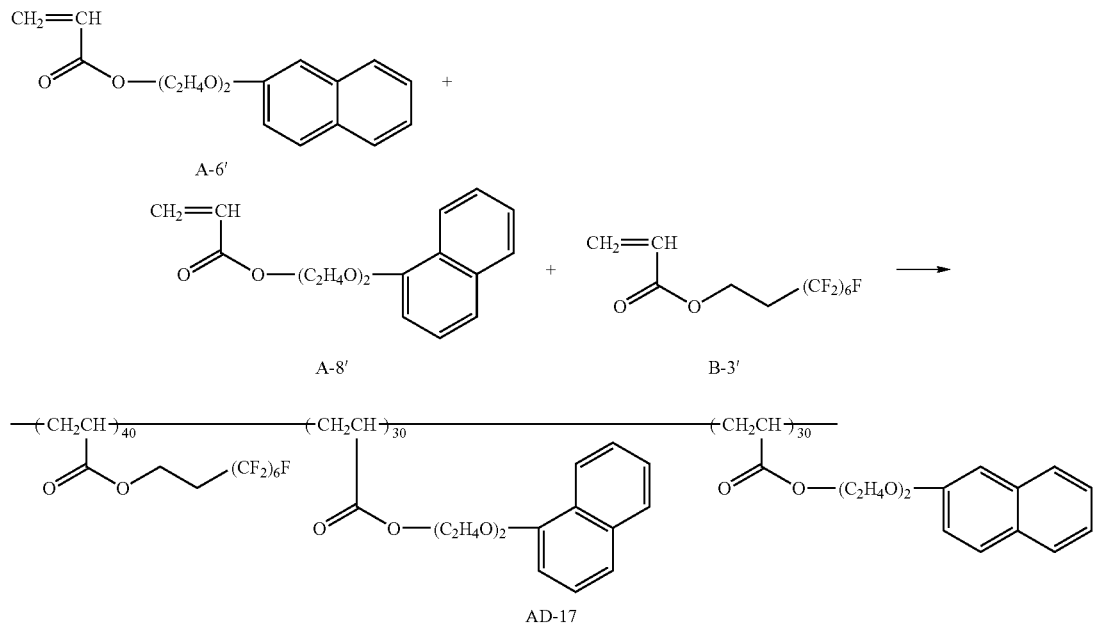

4 g of MEK was placed in a 100-mL three-neck flask and heated to 78° C. under a nitrogen stream at a flow rate of 35 mL/min. The monomers A-6' (4.8 g), A-8' (4.8 g) and B-3' (6.4 g) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to 800 mL of a methanol-water mixed solution (10/90 by volume) under stirring, and the polymer thus deposited was separated by centrifugation and then dried. Thus, 12.5 g of the polymer (AD-17) used in the invention was obtained. The polymer had Mn of 13,000 and Mw/Mn of 2.30 as measured with GPC (polystyrene standard).

Synthesis Example 13

Synthesis of Polymer AD-18

The polymer AD-18 was synthesized according to the following scheme.

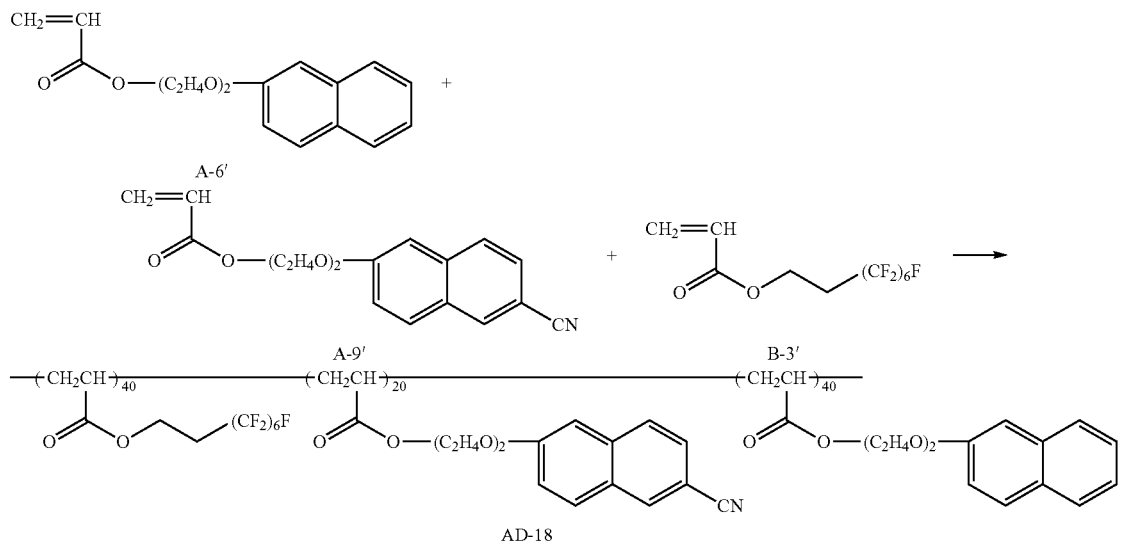

4 g of MEK was placed in a 100-mL three-neck flask and heated to 78° C. under a nitrogen stream at a flow rate of 35 mL/min. The monomers A-6' (6.4 g), A-9' (3.2 g) and B-3' (6.4 g) and a solution of a polymerization initiator (600 mg of V-601, produced by Wako Pure Chemical Industries, Ltd.) in 8 g of MEK were added dropwise thereto over 3 hours. After completing the dropwise addition, the reaction was continued for 4 hours at the same temperature. Thereafter, the reaction system was cooled to room temperature and then added slowly to 800 mL of a methanol-water mixed solution (10/90 by volume) under stirring, and the polymer thus deposited was separated by centrifugation and then dried. Thus, 13.7 g of the polymer (AD-18) used in the invention was obtained. The polymer had Mn of 12,500 and Mw/Mn of 2.40 as measured with GPC (polystyrene standard).

Example 1

Preparation of Composition (LM-1) of the Invention

The liquid crystal compound (1) (D3-12), the liquid crystal compound (2) (T-8), the polymer used in the invention (AD-1), Irgacure 907 (available from Ciba Specialty Chemicals Co., Ltd.) as a photopolymerization initiator and diethylthioxanthone as a photosensitizer were weighed according to the following formulation and dissolved in methyl ethyl ketone to prepare a composition (LM-1) of the invention.

| Formulation of Composition (LM-1) | |
| --- | --- |
| Liquid crystal composition (1) (D3-12) | 91 parts by mass |
| Liquid crystal composition (2) (T-8) | 9 parts by mass |
| Polymer used in the invention (AD-1) | 1.0 part by mass |
| Irgacure 907 (available from Ciba Specialty Chemicals Co., Ltd.) | 3.0 parts by mass |
| Diethylthioxanthone | 1.0 part by mass |
| Methyl ethyl ketone | 250 parts by mass |

Example 2

Preparation of Compositions LM-2 to LM-17

The same procedures as in Example 1 were carried out except that the polymer (AD-1) added to the liquid crystal compound (1) (D3-12) and the liquid crystal compound (2) (T-8) was changed to the polymers shown in Table 2 below, so as to prepare the compositions (LM-2) to (LM-17) of the invention.

Example 3

Preparation of Composition (LM-18) of the Invention

The liquid crystal compound (1) (D3-12), the polymer used in the invention (AD-18), Irgacure 907 (available from Ciba Specialty Chemicals Co., Ltd.) as a photopolymerization initiator and diethylthioxanthone as a photosensitizer were weighed according to the following formulation and dissolved in methyl ethyl ketone to prepare a composition (LM-18) of the invention.

| Formulation of Composition (LM-18) | |
| --- | --- |
| Liquid crystal composition (1) (D3-12) | 100 parts by mass |
| Polymer used in the invention (AD-18) | 1.0 part by mass |
| Irgacure 907 (available from Ciba Specialty Chemicals Co., Ltd.) | 3.0 parts by mass |
| Diethylthioxanthone | 1.0 part by mass |
| Methyl ethyl ketone | 250 parts by mass |

Comparative Example 1

Preparation of Comparative Compositions LH-1 to LH-4

The comparative composition LH-1 was prepared in the same manner as in the preparation of the composition (LM-1) of the invention in Example 1 except that the polymer (AD-1) was not added. The comparative composition LH-2 was prepared in the same manner as in the preparation of the composition (LM-18) of the invention in Example 3 except that the polymer (AD-1) was not added. The comparative compositions (LH-3) and (LH-4) were prepared in the same manner as in the preparation of the composition (LM-1) of the invention in Example 1 and the composition (LM-18) of the invention in Example 3, respectively, except that the polymer ADH-1 shown below (which was synthesized according to Example of JPA No. 2006-16599 mentioned above) was used instead of the polymer (AD-1).

| | Composition | Liquid Crystal Compound (1) | Liquid Crystal Compound (2) | Polymer |
| --- | --- | --- | --- | --- |
| Example 1 | LM-1 | D3-12 | T-8 | AD-1 |
| Example 2 | LM-2 | D3-12 | T-8 | AD-2 |
| | LM-3 | D3-12 | T-8 | AD-3 |
| | LM-4 | D3-12 | T-8 | AD-4 |
| | LM-5 | D3-12 | T-8 | AD-5 |
| | LM-6 | D3-12 | T-8 | AD-6 |
| | LM-7 | D3-12 | T-8 | AD-7 |
| | LM-8 | D3-12 | T-8 | AD-8 |
| | LM-9 | D3-12 | T-8 | AD-9 |
| | LM-10 | D3-12 | T-8 | AD-10 |
| | LM-11 | D3-12 | T-8 | AD-11 |
| | LM-12 | D3-12 | T-8 | AD-12 |
| | LM-13 | D3-12 | T-8 | AD-13 |
| | LM-14 | D3-12 | T-8 | AD-14 |
| | LM-15 | D3-12 | T-8 | AD-15 |
| | LM-16 | D3-12 | T-8 | AD-16 |

|  | Composition | Liquid Crystal Compound (1) | Liquid Crystal Compound (2) | Polymer |
| --- | --- | --- | --- | --- |
|  | LM-17 | D3-12 | T-8 | AD-17 |
| Example 3 | LM-18 | D3-12 | — | AD-18 |
| Comparative | LH-1 | D3-12 | T-8 | — |
| Example 1 | LH-2 | D3-12 | — | — |
|  | LH-3 | D3-12 | T-8 | ADH-1 |
|  | LH-4 | D3-12 | — | ADH-1 |

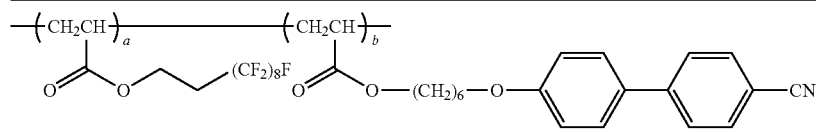

ADH-1 a/b = 26/74 (by mol), a/b = 34/66 (by mass)
Mn = 16000, Mw/Mn = 2.51

Example 4

Production of Retardation Plate (RM-1) of the Invention

Production of Second Optically Anisotropic Layer (Transparent Support)

The following components were placed in a mixing tank and dissolved in each other by stirring under heating to prepare a cellulose acetate solution.

| Formulation of Cellulose Acetate Solution | |
| --- | --- |
| Cellulose acetate (acetylation degree: 60.9%) | 100 parts by mass |
| Triphenyl phosphate | 7.8 parts by mass |
| Biphenyldiphenyl phosphate | 3.9 parts by mass |
| Methylene chloride | 300 parts by mass |
| Methanol | 45 parts by mass |

Preparation of Retardation Increasing Agent Solution 4 parts by mass of cellulose acetate (linter) having an acetylation degree of 60.9%, 25 parts by mass of the retardation increasing agent (A) represented by the following formula, 0.5 part by mass of silica fine particles (average particle diameter: 20 nm), 80 parts by mass of methylene chloride and 20 parts by mass of methanol were placed in another mixing tank and stirred under heating to prepare a retardation increasing agent solution.
Retardation Increasing Agent

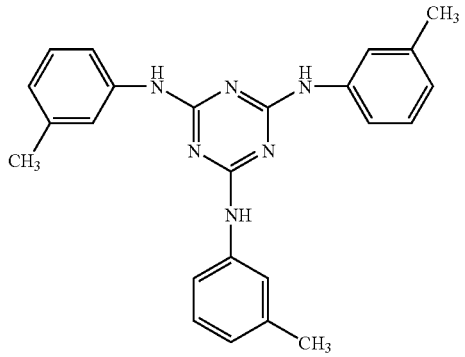
(A)

18.5 parts by mass of the retardation increasing agent was mixed with 470 parts by mass of the aforementioned cellulose acetate solution, and the mixture was sufficiently stirred to prepare a dope. The mass proportion of the retardation increasing agent with respect to the cellulose acetate was 3.5% by mass.

Thereafter, a film having a remaining solvent amount of 35% by mass was released from the band and then stretched transversally to a stretching ratio of 38% at a temperature of 140° C. with a tenter. The film was released from the cramps and then dried at 130° C. for 45 minutes to produce a cellulose acetate film as the second optically anisotropic layer. The second optically anisotropic layer thus produced had a remaining solvent amount of 0.2% by mass and a thickness of 88 μm.

<Saponification Treatment of Second Optically Anisotropic Layer>

A 1.5N isopropyl alcohol solution of potassium hydroxide was coated on one surface of the second optically anisotropic layer thus produced in an amount of 25 mL/m$^2$, and after allowing to stand at 25° C. for 5 seconds, and the film was washed with flowing water and the surface of the film was dried by blowing air at 25° C. Thus, only one surface of the second optically anisotropic layer was saponified.

Formation of Alignment film

The alignment film coating composition having the following formulation was coated on the saponified surface of the second optically anisotropic layer with a #18 wire bar coater in an amount of 31 mL/m$^2$, and then dried with hot air at 100° C. for 120 seconds.

The film thus formed was subjected to a rubbing treatment in a direction at an angle of 45° with respect to the stretching direction of the second optically anisotropic layer (which was substantially perpendicular to the retardation axis). The resulting alignment film had a thickness of 0.5 μm. The rubbing direction of the alignment film was in parallel to the casting direction of the transparent support.

| [Formulation of Alignment film Coating Composition] | |
|---|---|
| Modified polyvinyl alcohol (B) represented by the following formula | 10 parts by mass |
| Water | 371 parts by mass |
| Methanol | 119 parts by mass |
| Glutaric acid aldehyde (crosslinking agent) | 0.5 part by mass |

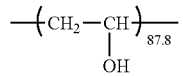

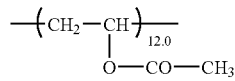

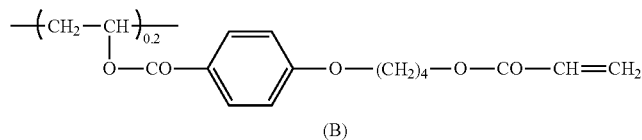

(B)

(Formation of Optically Anisotropic Layer)

The composition (LM-1) of the invention as a coating composition was coated with a wire bar on the rubbing-treated surface of the alignment film thus produced. The film having the optically anisotropic layer coated was oriented in a constant-temperature oven at 110° C. and irradiated with an ultraviolet ray of 200 mJ/cm² at that temperature to fix the orientation state of the optically anisotropic layer, and then the film was cooled to room temperature to provide a retardation plate (RM-1) of the invention. The optically anisotropic layer thus formed had a thickness of about 1.0 μm.

Example 5

Production of Retardation Plates (RM-2) to (RM-17) of the Invention

The retardation plates (RM-2) to (RM-17) were produced in the same manner as in Example 4 except that the compositions (LM-2) to (LM-17) were used instead of the composition (LM-1).

Example 6

Production of Retardation Plate (RM-18) of the Invention

The retardation plate (RM-18) was produced in the same manner as in Example 4 except that the composition (LM-18) was used.

Comparative Example 2

Production of Comparative Retardation Plates (RH-1), (RH-2), (RH-3) and (RH-4)

The retardation plates (RH-1) to (RH-4) were produced in the same manner as in Example 4. except that the compositions (LH-1) to (LH-4) were used instead of the composition (LM-1).

| | Retardation Plate | Composition |
|---|---|---|
| Example 4 | RM-1 | LM-1 |
| Example 5 | RM-2 | LM-2 |
| | RM-3 | LM-3 |
| | RM-4 | LM-4 |
| | RM-5 | LM-5 |
| | RM-6 | LM-6 |
| | RM-7 | LM-7 |
| | RM-8 | LM-8 |
| | RM-9 | LM-9 |
| | RM-10 | LM-10 |
| | RM-11 | LM-11 |
| | RM-12 | LM-12 |
| | RM-13 | LM-13 |
| | RM-14 | LM-14 |
| | RM-15 | LM-15 |
| | RM-16 | LM-16 |
| | RM-17 | LM-17 |
| Example 6 | RM-18 | LM-18 |
| Comparative Example 2 | RH-1 | LH-1 |
| | RH-2 | LH-2 |
| | RH-3 | LH-3 |
| | RH-4 | LH-4 |

[Evaluation of Retardation Plates]
(Measurement of Mean Tilt Angle)

The Re value (589 nm) of the retardation plate produced was measured by making light having a wavelength of 589 nm incident in the normal line direction thereof in KOBRA 21ADH (produced by Oji Scientific Instruments, Inc.). The retardation was then measured by making light having a wavelength of 589 nm incident in a direction tilted by +40° with respect to the normal line direction of the film with the in-plane retardation axis as the tilt axis, and also measured by making light having a wavelength of 589 nm incident in a direction tilted by −40° with respect to the normal line direction of the film. The tilt angle $\theta_1$ on one surface of the optically anisotropic layer and the tilt angle $\theta_2$ on the other surface thereof were calculated by fitting to make the calculated retardation values of the optically anisotropic layer depending on angle agree with the measured values with $\theta_1$ and $\theta_2$ as parameters.

The mean tilt angle was obtained as an average value of $\theta_1$ and $\theta_2$ (($\theta_1+\theta_2$)/2).

(Observation of Alignment State)

An ultrathin section of the cross section of the retardation plate was produced with a microtome and was observed with a polarizing microscope. It was thus confirmed that in the retardation plates RM-1 to RM-11 of Examples and the retardation plates RH-1 and RH-2 of Comparative Examples, the liquid crystal molecules were in hybrid orientation in the optically anisotropic layer. In the retardation plates RH-3 and RH-4 of Comparative Examples, the liquid crystal molecules were in horizontal orientation (mean tilt angle: ca.) 0° in the optically anisotropic layer.

(Temperature Dependency of Mean Tilt Angle)

The retardation plates were produced in the same manner as above except that the optically anisotropic layer was heated to 80° C. after orientation, and the orientation state was then fixed with an ultraviolet ray. The retardation plates were measured for the mean tilt angle in the same manner as above, and the difference between the mean tilt angle where the orientation state was fixed at 110° C. and the mean tilt angle where the orientation was fixed at 80° C. was obtained as temperature dependency of mean tilt angle.

The results obtained are shown in Table 4 below.

TABLE 4

|  | Retardation Plate | Mean Tilt Angle (110° C.) | Mean Tilt Angle (80° C.) | Mean Tilt Angle (Temp.-Dependency) | Alignment state *1 |
|---|---|---|---|---|---|
| Example 7 | RM-1 | 35° | 34° | 1° | Hybrid Alignment |
|  | RM-2 | 36° | 35° | 1° | Hybrid Alignment |
|  | RM-3 | 37° | 37° | 0° | Hybrid Alignment |
|  | RM-4 | 38° | 37° | 1° | Hybrid Alignment |
|  | RM-5 | 39° | 37° | 2° | Hybrid Alignment |
|  | RM-6 | 26° | 25° | 1° | Hybrid Alignment |
|  | RM-7 | 38° | 37° | 1° | Hybrid Alignment |
|  | RM-8 | 39° | 39° | 0° | Hybrid Alignment |
|  | RM-9 | 38° | 38° | 0° | Hybrid Alignment |
|  | RM-10 | 37° | 36° | 1° | Hybrid Alignment |
|  | RM-11 | 36° | 36° | 0° | Hybrid Alignment |
|  | RM-12 | 39° | 39° | 0° | Hybrid Alignment |
|  | RM-13 | 30° | 33° | 3° | Hybrid Alignment |
|  | RM-14 | 30° | 29° | 1° | Hybrid Alignment |
|  | RM-15 | 29° | 30° | 1° | Hybrid Alignment |
|  | RM-16 | 17° | 19° | 2° | Hybrid Alignment |
|  | RM-17 | 20° | 21° | 1° | Hybrid Alignment |
|  | RM-18 | 28° | 29° | 1° | Hybrid Alignment |
| Comparative Example 3 | RH-1 | about 44° | about 44° | about 0° | Hybrid Alignment |
|  | RH-2 | about 44° | about 43° | about 1° | Hybrid Alignment |
|  | RH-3 | about 0° | about 0° | about 0° | Homogenous Alignment |
|  | RH-4 | about 0° | about 0° | about 0° | Homogenous Alignment |

*1: Alignment State (Observation of the cross section of the retardation plate)

It is understandable from the results shown in Table 4 that the retardation plates (RM-1) to (RM-18) of the invention had mean tilt angles controlled to a range of from 10 to 40°, as compared to the retardation plates (RH-1) and (RH-2) of Comparative Examples. It is also understandable that the mean tilt angles thereof suffered less temperature dependency. It is further understandable that the retardation plates (RH-3) and (RH-4) of Comparative Example were in the homogenous alignment state, whereas the retardation plates (RM-1) to (RM-18) of the invention were in the hybrid alignment state.

It is understandable from the results that a hybrid alignment state with a low tilt angle could be obtained by orienting molecules of a discotic liquid crystal compound in the presence of the polymer comprising the unit represented by formula (A) and the unit derived from a monomer having a fluoroaliphatic group, and the tilt angle suffered less fluctuation depending on temperature, whereby a retardation plate having intended optical characteristics could be stably obtained.

INDUSTRIAL APPLICABILITY

According to the invention, a composition, a polymer and a tilt angle controlling agent can be provided that are useful for producing stably an optically anisotropic layer contributing to optical compensation of a liquid crystal display device. According to the invention, in particular, an mean tilt angle of a discotic liquid crystal compound in hybrid orientation can be controlled precisely in a range of from 10 to 40°, and further in a range of from 10 to 30°.

According to the invention, a retardation plate that is useful for optical compensation of a liquid crystal display device, and a process for producing the retardation plate are provided.

CROSS-REFERENCE TO RELATED APPLICATIONS

This application claims benefit of priority under 35 USC 119 to Japanese Patent Application No. 2007-064952 filed Mar. 13, 2007.

The invention claimed is:

1. A composition comprising:
   at least one liquid crystal compound, and
   at least one polymer comprising a constitutional unit represented by a following formula (A) and a constitutional unit derived from a monomer having a fluoroaliphatic group(s):

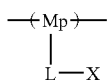

(A)

wherein Mp represents a trivalent group constituting fully or partially a polymer main chain; L represents a single bond or a divalent linking group; and X represents a substituted or non-substituted aromatic condensed ring group.

2. The composition of claim 1, wherein X in formula (A) represents a substituted or non-substituted $C_{5-30}$ aromatic condensed-ring group.

3. The composition of claim 1, wherein X in formula (A) is a substituted or non-substituted $C_{10-20}$ naphthyl group.

4. The composition of claim 1, wherein Mp in formula (A) is a group represented by formula Mp-1 or Mp-2; and L in formula (A) represents a divalent linking group selected from the group consisting of —O—, —NR$^{a11}$— (where R$^{a11}$ is a hydrogen atom or $C_{1-10}$ aliphatic hydrocarbon group), —S—, —C(=O)—, —S(=O)$_2$— and a $C_{1-20}$ substituted or non-substituted alkylene group, or the group consisting of any groups formed by linking at least two or more selected from the former group with each other;

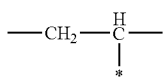

Mp-1

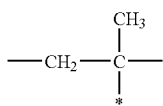

Mp-2 where "*" indicates the position at which the group bonds to L in formula (A).

5. The composition of claim 1, wherein the unit derived from the monomer having a fluoroaliphatic group(s) is a unit represented by formula (B) shown below:

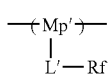

(B)

where Mp' represents a trivalent group forming a main chain partially; L' represents a single bond or a bivalent linking group; and Rf represents a substituent having at least one fluorine atom therein.

6. The composition of claim 1, wherein the at least one liquid crystal compound is a discotic liquid crystal compound.

7. The composition of claim 1, wherein the at least one liquid crystal compound is a compound represented by formula (DI) shown below:

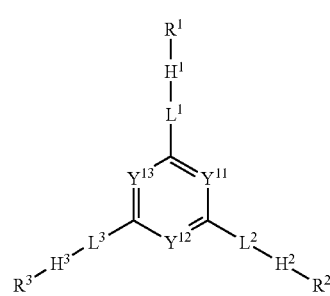

(DI)

where $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent following formula (DI-A) or (DI-B); and $R^1$, $R^2$ and $R^3$ each independently represent following formula (DI-R):

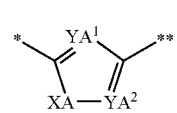

(DI-A)

where, in formula (DI-A), YA$^1$ and YA$^2$ each independently represent a methine group or a nitrogen atom; XA represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$:

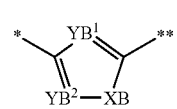

(DI-B)

where, in formula (DI-B), YB$^1$ and YB$^2$ each independently represent a methine group or a nitrogen atom; XB represents an oxygen atom, a sulfur atom, a methylene group or an imino group; * indicates the position at which the formula bonds to any of $L^1$ to $L^3$; and ** indicates the position at which the formula bonds to any of $R^1$ to $R^3$:

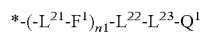

*-(-L$^{21}$-F$^1$)$_{n1}$-L$^{22}$-L$^{23}$-Q$^1$     (DI-R))

where, in formula (DI-R), * indicates the position at which the formula bonds to $H^1$, $H^2$ or $H^3$ in formula (DI); $F^1$ represents a bivalent linking group having at least one cyclic structure; $L^{21}$ represents a single bond or a bivalent linking group; n1 indicates an integer of from 0 to 4; $L^{22}$ represents —O—, —O—CO—, —CO—O—, —O—CO—O—, —S—, —NH—, —SO$_2$—, —CH$_2$—, —CH=CH— or —C≡C—, provided that, when the group has a hydrogen atom, the hydrogen atom may be substituted with a substituent; $L^{23}$ represents a bivalent linking group selected from —O—, —S—, —C(=O)—, —SO$_2$—, —NH—, —CH$_2$—, —CH=CH— and —C≡C—, and a group formed by linking two or more of these, provided that, when the group has a hydrogen atom, the hydrogen atom may be substituted with a substituent; and $Q^1$ represents a polymerizing group or a hydrogen atom.

8. The composition of claim 1, wherein the at least one liquid crystal compound is a compound represented by formula (DII) or (DIII) shown below:

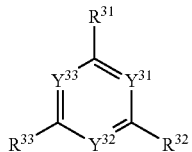
(DII)

where, in formula (DII), $Y^{31}$, $Y^{32}$ and $Y^{33}$ each independently represent a methine group or a nitrogen atom; $R^{31}$, $R^{32}$ and $R^{33}$ each independently represent following formula (DII-R):

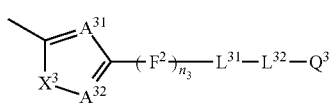
(DII-R)

where, in formula (DII-R), $A^{31}$ and $A^{32}$ each independently represent a methine group or a nitrogen atom; $X^3$ represents an oxygen atom, a sulfur atom, a methylene group or an imino group; $F^2$ represents a bivalent cyclic linking group having a 6-membered cyclic structure; n3 indicates an integer of from 1 to 3; $L^{31}$ represents —O—, —O—CO—, —O—CO—O—, —O—CO—O—, —S—, —NH—, —SO$_2$—, —CH$_2$—, —CH=CH— or —C≡C—, provided that, when the group has a hydrogen atom, the hydrogen atom may be substituted with a substituent; $L^{32}$ represents a bivalent linking group selected from —O—, —S—, —C(=O)—, —SO$_2$—, —NH—, —CH$_2$—, —CH=CH— and —C≡C—, and a group formed by linking two or more of these, provided that, when the group has a hydrogen atom, the hydrogen atom may be substituted with a substituent; and $Q^3$ represents a polymerizing group or a hydrogen atom;

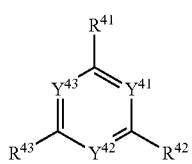
(DIII)

where, in formula (DIII), $Y^{41}$, $Y^{42}$ and $Y^{43}$ where, in formula (DIII), each independently represent a methine group or a nitrogen atom; $R^{41}$, $R^{42}$ and $R^{43}$ each independently represent following formula (DIII-A), (DIII-B) or (DIII-C):

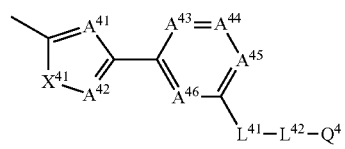
(DIII-A)

where, in formula (DIII-A), $A^{41}$, $A^{42}$, $A^{43}$, $A^{44}$, $A^{45}$ and $A^{46}$ each independently represent a methine group or a nitrogen atom; $X^{41}$ represents an oxygen atom, a sulfur atom, a methylene group or an imino group; $L^{41}$ represents —O—, —O—CO—, —CO—O—, —O—CO—O—, —S—, —NH—, —SO$_2$—, —CH$_2$—, —CH=CH— or —C≡C—, provided that, when the group has a hydrogen atom, then the hydrogen atom may be substituted with a substituent; $L^{42}$ represents a bivalent linking group selected from —O—, —S—, —C(=O)—, —SO$_2$—, —NH—, —CH$_2$—, —CH=CH— and a group formed by linking two or more of these, provided that, when the group has a hydrogen atom, then the hydrogen atom may be substituted with a substituent; and $Q^4$ represents a polymerizing group or a hydrogen atom:

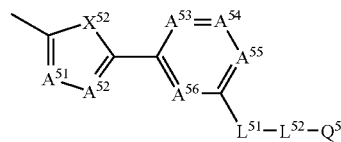
(DIII-B)

where, in formula (DIII-B), $A^{51}$, $A^{52}$, $A^{53}$, $A^{54}$, $A^{55}$ and $A^{56}$ each independently represent a methine group or a nitrogen atom; $X^{52}$ represents an oxygen atom, a sulfur atom, a methylene group or an imino group; $L^{51}$ represents —O—, —O—CO—, —CO—O—, —O—CO—O—, —S—, —NH—, —SO$_2$—, —CH$_2$—, —CH=CH— or provided that, when the group has a hydrogen atom, then the hydrogen atom may be substituted with a substituent; $L^{52}$ represents a bivalent linking group selected from —O—, —S—, —C(=O)—, —SO$_2$—, —NH—, —CH$_2$—, —CH=CH— and —C≡C—, and a group formed by linking two or more of these, provided that, when the group has a hydrogen atom, then the hydrogen atom may be substituted with a substituent; and $Q^5$ represents a polymerizing group or a hydrogen atom:

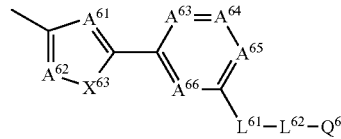
(DIII-C)

where, in formula (DIII-C), $A^{61}$, $A^{62}$, $A^{63}$, $A^{64}$, $A^{65}$ and $A^{66}$ each independently represent a methine group or a nitrogen atom; $X^{63}$ represents an oxygen atom, a sulfur atom, a methylene group or an imino group; $L^{61}$ represents —O—, —O—CO—O—, —CO—O—, —O—CO—O—, —S—, —NH—, —SO$_2$—, —CH$_2$—, —CH=CH— or —C≡C—, provided that, when the group has a hydrogen atom, then the hydrogen atom may be substituted with a substituent; $L^{62}$ represents a bivalent linking group selected from —O—, —S—, —C(=O)—, —SO$_2$—, —NH—, —CH$_2$—, —CH=CH— and —C≡C—, and a group formed by linking two or more of these, provided that, when the group has a hydrogen atom, then the hydrogen atom may be substituted with a substituent; and Q$^6$ represents a polymerizing group or a hydrogen atom.

9. The composition of claim 7, comprising a first liquid crystal compound represented by formula (DI) and a second liquid crystal compound other than that represented by formulae (DI).

10. The composition of claim 9, wherein the second compound is a compound represented by formula (T) shown below:

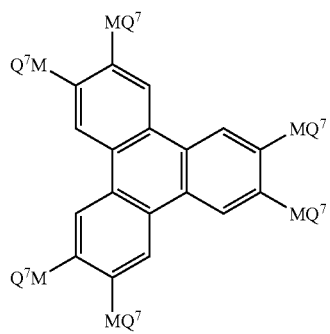

(T)

where M represents a bivalent linking group, which may be the same or different; and Q$^7$ represents a polymerizable group or a hydrogen atom, which may be the same or different.

11. A retardation plate comprising an optically anisotropic layer formed of a composition of claim 1.

12. A liquid crystal display device comprising a retardation plate as set forth in claim 11.

13. A method of producing a retardation plate comprising forming an optically anisotropic layer by using a composition of claim 1.

14. An agent for controlling tilt angles, which is a polymer comprising a constitutional unit represented by formula (A) and a constitutional unit derived from a monomer having a fluoroaliphatic group(s):

(A)

where Mp represents a trivalent group forming a main chain fully or partially; L represents a single bond or a bivalent linking group; and X represents a substituted or non-substituted aromatic condensed-ring group.

15. The composition of claim 8, comprising a first liquid crystal compound represented by formula (DII) or (DIII) and a second liquid crystal compound other than that represented by formulae (DII) and (DIII).

16. The composition of claim 15, wherein the second compound is a compound represented by formula (T) shown below:

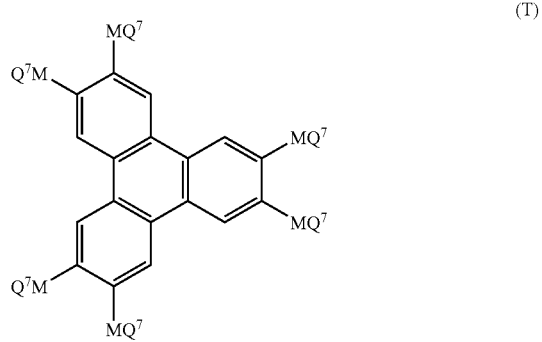

(T)

where M represents a bivalent linking group, which may be the same or different; and Q$^7$ represents a polymerizable group or a hydrogen atom, which may be the same or different.

* * * * *